(12) United States Patent
Biolchi et al.

(10) Patent No.: US 12,485,164 B2
(45) Date of Patent: Dec. 2, 2025

(54) MENINGOCOCCUS VACCINES

(71) Applicant: GLAXOSMITHKLINE BIOLOGICALS SA, Rixensart (BE)

(72) Inventors: Alessia Biolchi, Siena (IT); Brunella Brunelli, Siena (IT); Marzia Monica Giuliani, Siena (IT); Vega Masignani, Siena (IT)

(73) Assignee: GLAXOSMITHKLINE BIOLOGICALS SA, Rixensart (BE)

( * ) Notice: Subject to any disclaimer, the term of this patent is extended or adjusted under 35 U.S.C. 154(b) by 0 days.

(21) Appl. No.: 18/329,701

(22) Filed: Jun. 6, 2023

(65) Prior Publication Data

US 2023/0414736 A1    Dec. 28, 2023

Related U.S. Application Data

(62) Division of application No. 15/319,665, filed as application No. PCT/EP2015/066229 on Jul. 16, 2015, now Pat. No. 11,707,513.

(30) Foreign Application Priority Data

Jul. 17, 2014 (EP) ..................................... 14177563

(51) Int. Cl.
| | | |
|---|---|---|
| A61K 39/095 | (2006.01) | |
| A61K 39/00 | (2006.01) | |
| A61K 39/116 | (2006.01) | |
| C07K 14/22 | (2006.01) | |

(52) U.S. Cl.
CPC ............ *A61K 39/095* (2013.01); *A61K 39/00* (2013.01); *A61K 39/116* (2013.01); *C07K 14/22* (2013.01); *A61K 2039/70* (2013.01); *C07K 2319/00* (2013.01)

(58) Field of Classification Search
None
See application file for complete search history.

(56) References Cited

U.S. PATENT DOCUMENTS

| | | |
|---|---|---|
| 10,392,424 B2 | 8/2019 | Bottomley et al. |
| 11,021,522 B2 | 6/2021 | Bottomley et al. |
| 11,066,450 B2 | 7/2021 | Bottomley et al. |
| 2007/0020624 A1 | 1/2007 | Rubenfield et al. |
| 2007/0027309 A1 | 2/2007 | Weinstock et al. |
| 2008/0063665 A1 | 3/2008 | Oster et al. |
| 2017/0008933 A1 | 1/2017 | Bottomley et al. |
| 2017/0226161 A1 | 8/2017 | Bottomley et al. |
| 2018/0214531 A1 | 8/2018 | Biolchi et al. |
| 2021/0253617 A1 | 8/2021 | Hoelzl et al. |
| 2021/0253647 A1 | 8/2021 | Bottomley et al. |

FOREIGN PATENT DOCUMENTS

| | | |
|---|---|---|
| CN | 102816217 A | 12/2012 |
| CN | 102917730 A | 2/2013 |
| CN | 106795208 A | 5/2017 |
| JP | 2006-521782 A | 9/2006 |
| JP | 2013537884 A | 10/2013 |
| JP | 2017-502625 A | 2/2015 |
| JP | 6687597 B2 | 4/2020 |
| WO | 2001/52885 A1 | 7/2001 |
| WO | 2004048404 A2 | 6/2004 |
| WO | 2006/024954 A2 | 3/2006 |
| WO | 2007/060548 A2 | 5/2007 |
| WO | 2008/079372 A2 | 7/2008 |
| WO | 2011051893 A1 | 5/2011 |
| WO | 2011/110634 A1 | 9/2011 |
| WO | 2011/126863 A1 | 10/2011 |
| WO | 2012032169 A1 | 3/2012 |
| WO | 2013079970 A1 | 6/2013 |
| WO | 2013/186753 A1 | 12/2013 |
| WO | 2014030003 A1 | 2/2014 |
| WO | 2015/128480 A1 | 9/2015 |
| WO | 2016008960 A1 | 1/2016 |

OTHER PUBLICATIONS

Mar. 10, 2016 (Mar. 10, 2016), "N. meningitidis M1239 mature truncated mutant fHbp protein L 126R, Seo 56.", retrieved from EBI accession No. GSP:BCL30511 Database accession No. BCL30511; & Database Geneseq [Online].
Mar. 10, 2016 (Mar. 10, 2016), "N. meningitidis 2996 mature truncated mutant fHbp protein L 123R, Seo 54.", retrieved from EBI accession No. GSP:BCL30509 Database accession No. BCL30509; & Database Geneseq [Online].
Mar. 10, 2016 (Mar. 10, 2016), "Neisseria meningitidis mutant fHbp fusion protein sequence B, Seo Id 30.", retrieved from EBI accession No. GSP:BCL30485 Database accession No. BCL30485.
"Assessment report Bexsero; (common name "Meningococcal group B Vaccine (rDNA, component, adsorbed)") by the European Medicines Agency (Committee for Medicinal Products for Human Use (CHMP)); Procedure No. Emea/H/C/002333", Nov. 15, 2012, Retrieved from the Internet: URL: http://www.ema.europa.eu/docs/en_GB/document_library/EPAR _-_ Public_assessment_report/human/002333/WC500137883.PDF [Retrieved on Dec. 8, 2014].
Intellectual Property Office of Singapore, Written Opinion dated Jan. 26, 2018 for Singapore Appl. No. 11201610945P (based on Int'l. Appl. No. PCT/EP2015/066229 filed Jul. 16, 2015); 8 pages.
International Search Report and Written Opinion for Application No. PCT/EP2015/066228 dated Aug. 26, 2015, by the European Patent Office as International Searching Authority, 14 total pages.
International Search Report and Written Opinion for Application No. PCT/EP2015/066229 dated Jan. 10, 2015, by the European Patent Office as International Searching Authority, 15 total pages.
Beernink, et al., A meningococcal factor H binding protein mutant that eliminates factor H binding enhances protective antibody responses to vaccination, 2011 J. Immunol. 186(6):3606-3614.

(Continued)

*Primary Examiner* — S. Devi

(57) ABSTRACT

Meningococcal vaccines can be improved by including multiple alleles or variants of fHbp, in order to provide broader coverage of the diversity which is known for this protein, and/or by reducing the quantity of an OMV component in each dose.

9 Claims, 6 Drawing Sheets

Specification includes a Sequence Listing.

(56) References Cited

OTHER PUBLICATIONS

Beernink, et al., "Fina Antigenic Specificity and Cooperative Bactericidal Activity of Monoclonal Antibodies Directed at the Meningococcal Vaccine Candidate for Factor H-Binding Protein" Infection and Immunity 76(9):4232-4240.

Beernink, Peter, et al., "The Effect of Human Factor H on Immunogenicity of Meningococcal Native Outer Membrane Vesicle Vaccines with Over-Expressed Factor H Binding Protein", PLOS Pathogens, vol. 8, No. 5, May 10, 2012, 9 pages.

Beernink & Granoff, The modular architecture of meningococcal factor H-binding protein, 2009 Microbiology 155:2873-2883.

Beernink Peter T et al: "Impaired immunogenicity of a meningococcal factor H-binding protein vaccine engineered to eliminate factor h binding" Clinical and Vaccine Immunology, American Society for Microbiology, Washington, DC, US, vol. 17, No. 7, Jul. 1, 2010 (Jul. 1, 2010), pp. 1074-1078.

Beernink et al., Rapid Genetic Grouping of Factor H-Binding Protein (Genome-Derived Neisserial Antigen 1870), a Promising Group B Meningococcal Vaccine Candidate, 2006 Clinical and Vaccine Immunology 13(7): 758-763.

Bork "Powers and Pitfalls in Sequence Analysis: the 70% hurdle", 2000 Genome Research 10(4): 398-400.

Bowie et al., "Deciphering the message in protein sequences: tolerance to amino acid substitutions", 1990 Science 247(4948):1306-1310.

Brehony, et al., Variation of the factor H-binding protein of Neisseria meningitidis, 2009, Microbiology 155:4155-4169 at p. 4161.

Burgess et al., "Possible Dissociation of the Heparin-binding and Mitogenic Activities of Heparin-binding (Acidic Fibroblast) Growth Factor-1 from Its Receptor-binding Activities by Site-directed Mutagenesis of a Single Lysine Residue", 1990 J. of Cell. Bio. 111(5):2129-2138.

Esposito Susanna et al., "A phase II randomized controlled trial of a multicomponent meningococcal serogroup B vaccine, 4CMenB, in infants (II).", Human Vaccines & Immunotherapeutics Jul. 2014, vol. 10, No. 7, Jul. 11, 2014 (Jul. 11, 2014), pp. 2005-2014.

Giuntini et al., "Monoclonal Antibodies to Meningococcal Factor H Binding Protein with Overlapping Epitopes and Discordant Functional Activity", PLOS ONE, vol. 7, No. 3; pp. e34272-e34272 (2012).

Greenspan and Di Cera, "Defining epitopes: it's not as easy as it seems", 1999, Nature Biotechnology 17: 936-937.

Granoff, Dan, et al., "Chapter 21 Section Two: Licensed vaccines—Meningococcal vaccines", Vaccines (6th edition), Jan. 1, 2013, pp. 388-418.

Granoff, Dan, et al., "Does Binding of Complement Factor H to the Meningococcal Vaccine Antigen, Factor H Binding Protein, Decrease Protective Serum Antibody Responses?", Clinical and Vaccine Immunology, vol. 20, No. 8, Jun. 5, 2013, pp. 1099-1107.

Jacobsson et al., "Prevalence and sequence variations of the genes encoding the five antigens included in the novel 5CVMB vaccine covering group B meningococcal disease", Vaccine, 27:10; pp. 1579-1584 (2009).

Johnson et al., Design and Evaluation of Meningococcal Vaccines through Structure-Based Modification of Host and Pathogen Molecules 2012 PLoS Pathogen 8(10):e1002981; 13 total pages.

Koeberling, Oliver, et al., "Meningococcal outer membrane vesicle vaccines derived from mutant strains engineered to express factor H binding proteins from antigenic variant groups 1 and 2", Clinical and Vaccine Immunology, American Society for Microbiology, Washinton, DC, US, vol. 16, No. 2, Feb. 1, 2009, pp. 156-162.

Lazar et al. "Transforming Growth Factor αx: Mutation of Aspartic Acid 47 and Leucine 48 Results in Different Biological Activities" 1988 Molecular and Cellular Biology 8(3):1247-1252.

Lucidarme, J. sequence entitled "Factor H-binding protein" published as UniProtKB Accession No. D3JZH2, dated Mar. 23, 2010, available at http://www.uniprot.org/uniprot/D3JZH2.txt?version=1.

Lucidarme, J. sequence entitled "Factor H-binding protein" published as UniProtKB Accession No. D3JZI3, dated Mar. 23, 2010, available at http://www.uniprot.org/uniprot/D3JZI3.txt?version=1.

McGuinness et al., Lancet 337:514-517, 1991.

McGuinness et al., Mol. Microbiol. 7:505-514, 1993.

Masignani et al., Vaccination against Neisseria meningilidis Using Three Variants of the Lipoprolein GNA1870 2003 J. Exp. Med 197(6): 789-799.

Murphy, E. sequence entitled "Factor H binding protein variant A93_001" published as UniProtKB Accession No. G9I6U8, dated Feb. 22, 2012, available at http://www.uniprot.org/uniprot/G9I6U8.txt?version= 1.

Muriel C Schneider et al.: "Neisseria meningitidis recruits factor H using protein mimicry of host carbohydrates", Nature, Nature Publishing Group, United Kingdom, vol. 458, No. 7240, Apr. 16, 2009 (Apr. 16, 2009), pp. 890-893.

Pajon et al: "Design of Meningococcal Factor H Binding Protein Mutant Vaccines That Do Not Bind Human Complement Factor H", Infection and Immunity, vol. 80, No. 8, May 21, 2012 (May 21, 2012), pp. 2667-2677.

Peng Shi-ze, et al., Expression and Immunological Analysis of Recombinant Nessaria Meningitis Group B Recombinant fHBP Fusion Protein, China Biotechnology, 2010, p. 28-33, vol. 31(5) (English Language Abstract).

Romanelli, et al. sequence entitled "Factor H binding protein" published as UniProtKB Accession No. L0GFA3, dated Mar. 6, 2013, available at http://www.uniprot.org/uniprot/LOGFA3.txt?version=1.

Romanelli, et al. sequence entitled "Factor H binding protein" published as UniProtKB Accession No. LoGGE0, dated Mar. 6, 2013, available at http://www.uniprot.org/uniprot/LOGGEO.txt?version=1.

Rossi Raffaella et al: "Meningococca factor H-binding protein vaccines with decreased binding to human complement factor H have enhanced immunogenicity in human factor H transgenic mice", Vaccine, vol. 31, No. 46, 2013, pp. 5451-5457.

Rudinger J. In: Peptide Hormones. (Ed) JA Parsons, University Park Press, pp. 1-7, 1976.

Schneider, MC, et al., Neisseria meningitidis recruits factor H using protein mimicry of host carbohydrates, 2009 Nature 458(7240): 890-893.

Skolnick et al., Trends in Biotechnology 18: 34-39, 2000.

Snape, et al., "Immunogenicity of two investigational serogroup B meningococcal vaccines in the first year of life: a randomized comparative trial", Pediatr Infect Dis J, 29(11), pp. e71-9, Nov. 2010 (Nov. 2010).

Van Der Veen et al: "Nonfunctional Variant 3 Factor H Binding Proteins as Meningococcal Vaccine Candidates", Infection and Immunity, vol. 82, No. 3, Dec. 30, 2013 (Dec. 30, 2013), pp. 1157-1163.

Zlotnick, G. W.; sequence described as "Neisseria ORF2086 subfamily A protein" corresponding to Seq Id No. 6 of international patent application publication WO2008079372; sequence published as Geneseq Accession No. ASQ06840, dated Sep. 4, 2008.

The sequence available as UniProtKB Accession No. L0GGE0, entitled Factor H binding protein, submitted Mar. 6, 2013, available at http://www.uniprot.org/uniprol/L0GGE0.txt?version=1.

The sequence available as UniProtKB Accession No. L0GFA3, entitled Factor H binding protein, submitted Mar. 6, 2013, available at http://www.uniprot.org/uniprol/L0GFA3.txt?version=1.

Select prosecution papers of U.S. Appl. No. 11/066,450 B2.

European Patent Office, office action received for corresponding EP Appl. No. 15 707 351.1 (published as EP3110442), dated Aug. 8, 2017, 5 total pages.

European Patent Office, priority search results and written opinion received for corresponding EP Appl. No. 14 15 7399, dated Sep. 18, 2014. (8 pages).

European Patent Office as International Searching Authority, International Search Report and Written Opinion for International Appl. No. PCT/EP2015/054174 (published as WO 2015128480), dated Sep. 3, 2015, 11 total pages.

(56) References Cited

OTHER PUBLICATIONS

European Patent Office, priority search results and written opinion received for corresponding EP Appl. No. 14 17 7566, dated Nov. 21, 2014. (16 pages).

Mar. 10, 2016 (Mar. 10, 2016), "N. meningitidis mature truncated mutant fHbp protein S32V/L 126R, SEO 44.", retrieved from EBI accession No. GSP:BCL30499 Database accession No. BCL30499; & Database Geneseq [Online].

Mar. 10, 2016 (Mar. 10, 2016), "N. meningitidis mature truncated mutant fHbp protein S32V/L 123R, SEO 45.", retrieved from EBI accession No. GSP:BCL30500 Database accession No. BCL30500; & Database Geneseq [Online].

Mikayama, et al., Nov. 1993, Proc. Natl. Acad. Sci. USA, vol. 90: 10056-10060.

Murphy E., et al., "Sequence Diversity of the Factor H Binding Protein Vaccine Candidate in Epidemiologically Relevant Strains of Serogroup B Neisseria Meningitidis," Journal of Infectious Diseases, 2009, vol. 200, pp. 379-389.

Peeters, et al., "Phase I clinical trial with a hexavalent PorA containing meningococcal outer membrane vesicle vaccine", Vaccine, vol. 14, No. 10, pp. 1009-1015, 1996.

Vermont, C.L., et al., "Cross-Reactivity of Antibodies agaisnt PorA after Vaccination with a Meningococcal B Outer Membrane Vesicle Vaccine", Infection and Immunity, Apr. 2003, p. 1650-1655.

Fig. 2

MENINGOCOCCUS VACCINES

CROSS-REFERENCE TO RELATED APPLICATIONS

This application is a Divisional Application of U.S. Ser. No. 15/319,665, (U.S. Pat. No. 11,707,513), filed Dec. 16, 2016, which is the § 371 U.S. National Phase entry of Int'l App No. PCT/EP2015/066229 filed Jul. 16, 2015, which claims priority to Application No. EP 14177563.5, filed in the European Patent Office Jul. 17, 2014, all of which are incorporated herein by reference in their entireties.

INCORPORATION-BY-REFERENCE OF SEQUENCE LISTING OR TABLE

The instant application contains a Sequence Listing which has been submitted electronically in XML file format and is incorporated herein by reference in its entirety. Said XML copy, created on Sep. 7, 2023, is named VN56308D1_US_XML_Seq_List_7Sept2023.xml and is 73,728 bytes in size.

TECHNICAL FIELD

This invention is in the field of meningococcal vaccination.

BACKGROUND

*Neisseria meningitidis* is a Gram-negative encapsulated bacterium which colonises the upper respiratory tract of approximately 10% of human population. Conjugate vaccines are available against serogroups A, C, W135 and Y, but the only vaccine which is available for protecting against serogroup B in general is the BEXSERO™ product which was approved in 2013. This product includes four main immunogenic components: the factor H binding protein, 'fHbp'; the heparin binding protein, NHBA; Neisserial adhesin A, NadA; and outer membrane vesicles (OMVs).

SUMMARY OF THE INVENTION

An aspect of the present invention is an immunogenic composition comprising a fusion polypeptide comprising all three of v1, v2 and v3 meningococcal fHbp, in combination with one or more of (i) a NHBA polypeptide (ii) a NadA polypeptide and/or (iii) meningococcal outer membrane vesicles.

A further aspect of the invention is an immunogenic composition comprising meningococcal outer membrane vesicles in combination with one or more of (i) a NHBA polypeptide (ii) a NadA polypeptide and/or (iii) a fusion polypeptide comprising all three of v1, v2 and v3 meningococcal fHbp; where the outer membrane vesicles (OMVs) are present at a concentration between 5-30 μg/ml. Particularly the fusion polypeptide comprising all three of v1, v2 and v3 meningococcal fHbp is a stabilised and/or fHbp non-binding fusion polypeptide. Yet more particularly, the v1 fHbp comprises a mutation at position R41, for example an R41S mutation. Still yet more particularly, the v2 and v3 fHbp polypeptides comprise one or more stabilising and/or factor H (fH) non-binding mutations at the following positions numbered according to the full length sequences (SEQ ID NOs: 1 & 3) and also according to the ΔG sequences (SEQ ID NOs: 8 & 9):

|    |              |            | Stabilising | fH non-binding |
|----|--------------|------------|-------------|----------------|
| v2 | SEQ ID NO: 1 | Ser-58     | Leu-149     | Glu-266        |
|    | SEQ ID NO: 8 | Ser-32     | Leu-123     | Glu-240        |
| v3 | SEQ ID NO: 3 | Ser-63     | Leu-157     | Glu-274        |
|    | SEQ ID NO: 9 | Ser-32     | Leu-126     | Glu-243        |

A further aspect of the present invention is an immunogenic composition comprising a fusion polypeptide having an amino acid sequence of formula $NH_2$-A-[-X-L]$_3$-B—COOH, where each X is a different variant fHbp sequence, L is an optional linker amino acid sequence, A is an optional N terminal amino acid sequence, and B is an optional C terminal amino acid sequence.

A further aspect of the present invention is a method for protecting a mammal, such as a human, against a meningococcal infection, comprising administering an immunogenic composition according to the invention.

BRIEF DESCRIPTION OF THE DRAWINGS

FIG. 2 provides a schematic of stabilising and factor H (fH) non-binding mutations introduced into the v1, v2 and v3 fHbp polypeptides to produce 731 S and 731 SNB fusion proteins.

DETAILED DESCRIPTION

Figure 1:
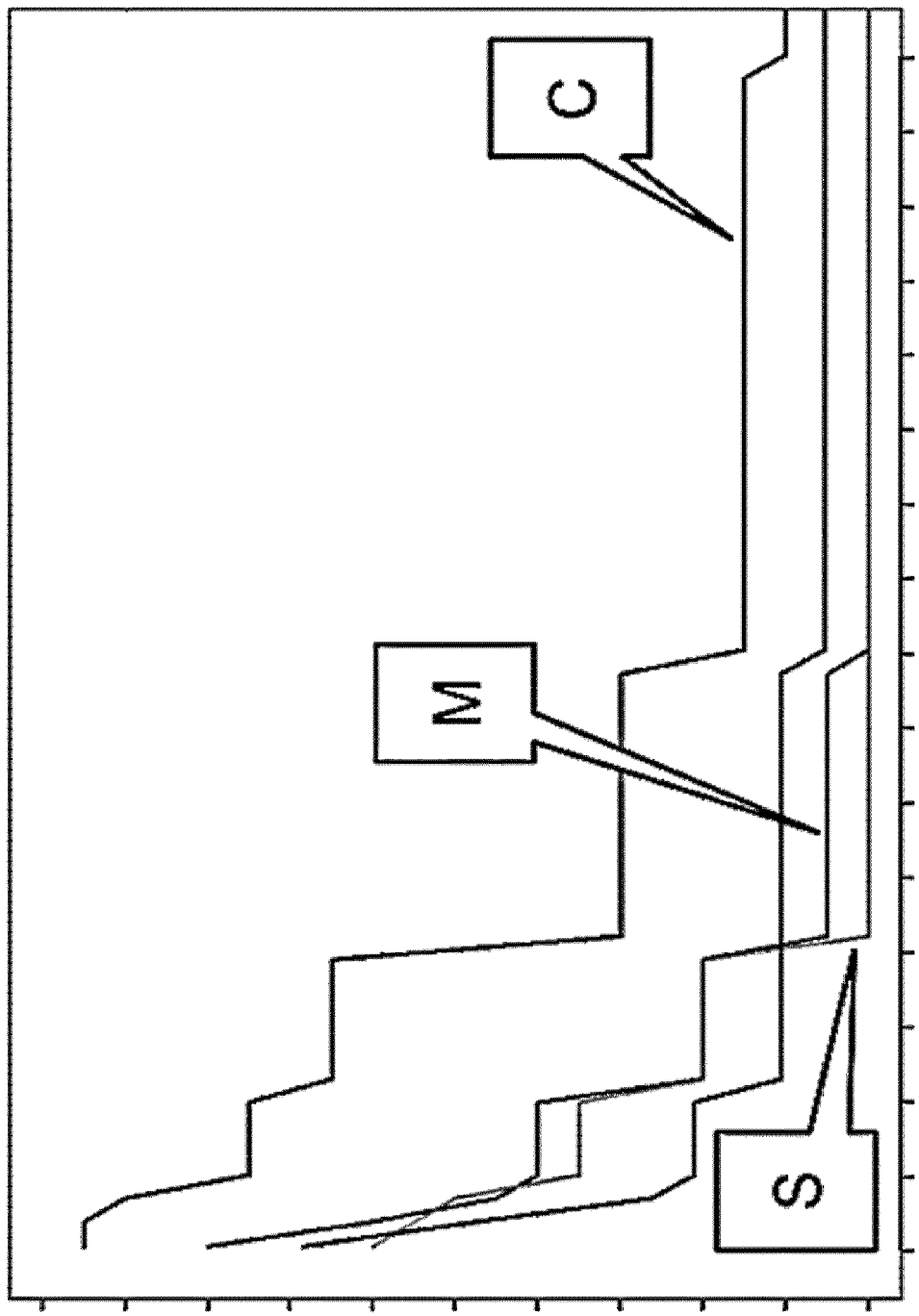
FIG. 1 shows a RCD curve, with proportion on the y-axis (0.0 to 1.0) and SBA titer on the x-axis (0 to 256, in steps of 16). The top curve is group C; the group which reaches 0.0 soonest is S.
Figure 3A:
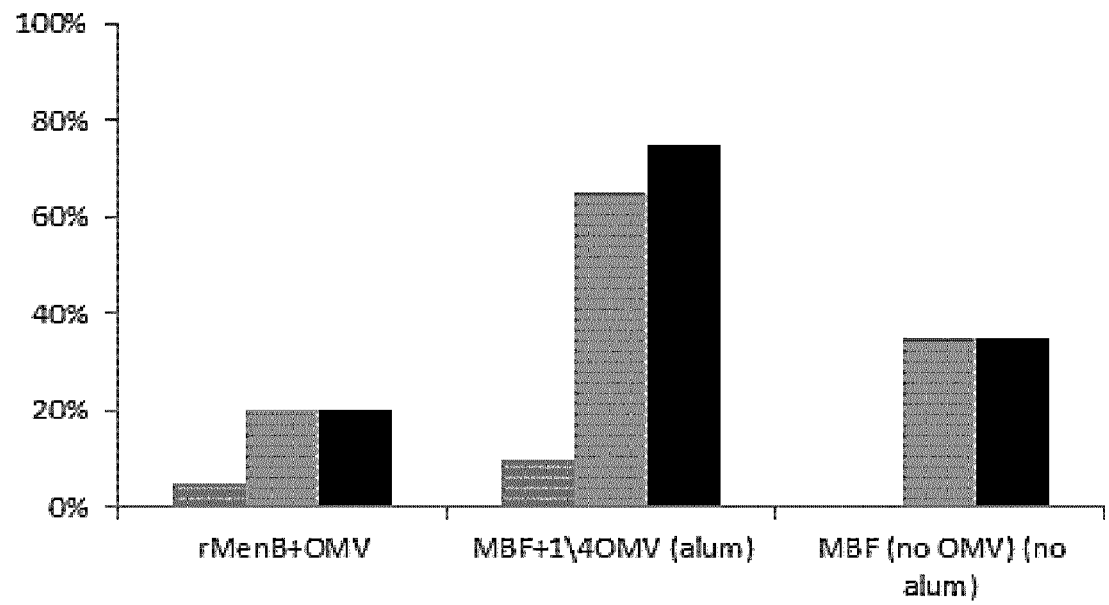
FIG. 3(*a*)-(*g*) demonstrates that compositions comprising the 741-231 fusion (SEQ ID NO:10) and ¼OMV elicits higher GMTs than BEXSERO™ against seven strains tested (3a=v2, 3b=v2, 3c=v3, 3d=v3, 3e=v2, 3f=v2, 3g=v3).
Figure 3B:
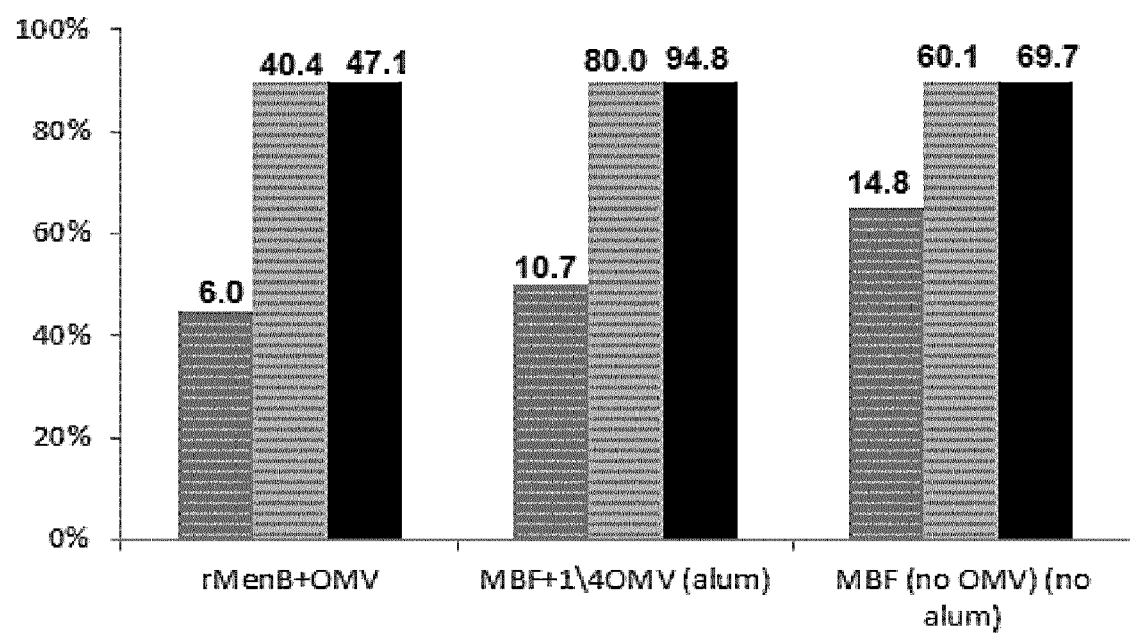
Figure 3C:
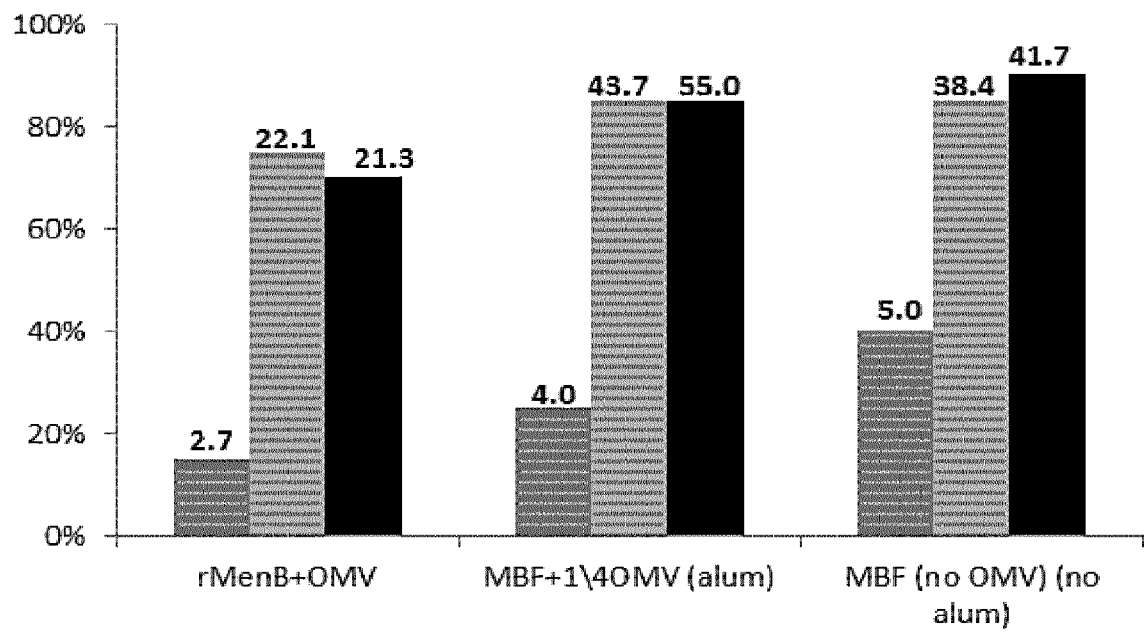
Figure 3D:
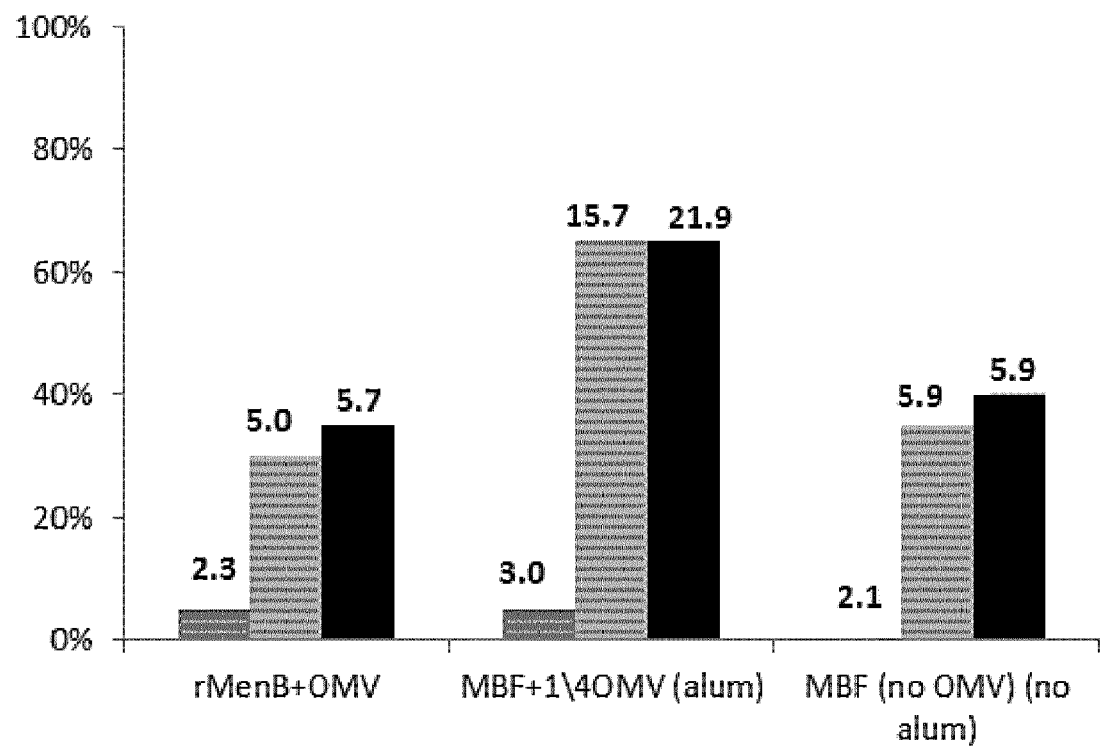
Figure 3E:
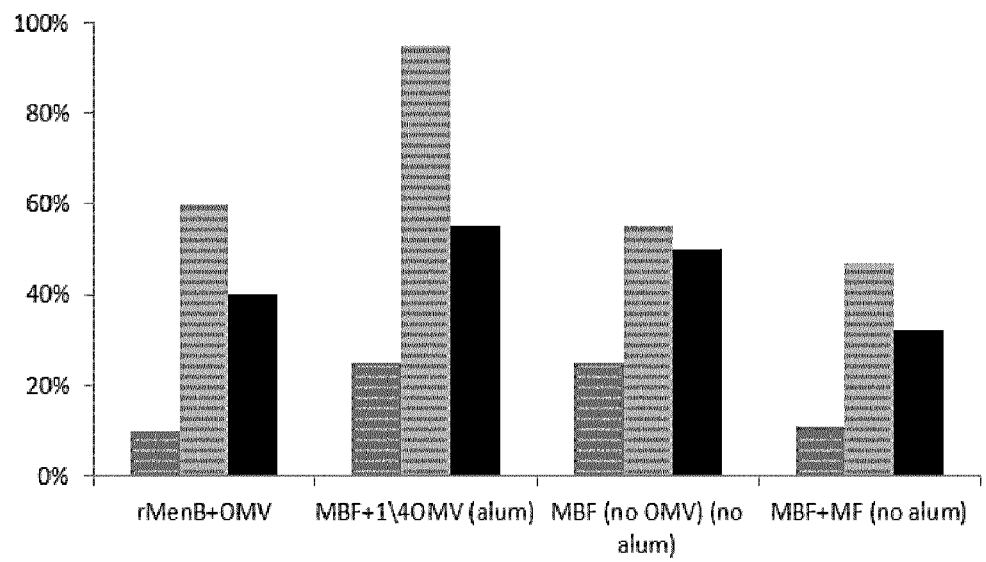
Figure 3F:
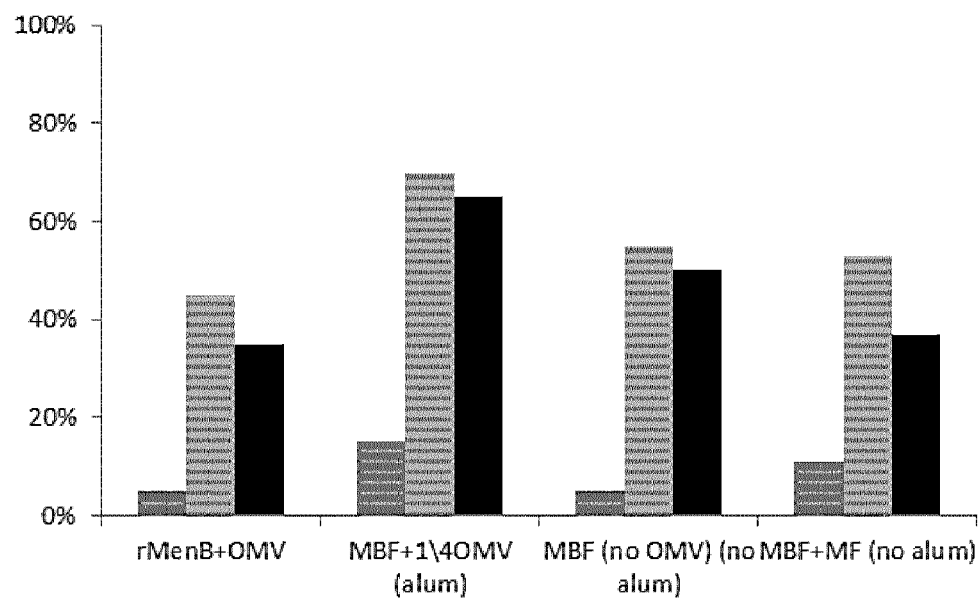
Figure 3G:
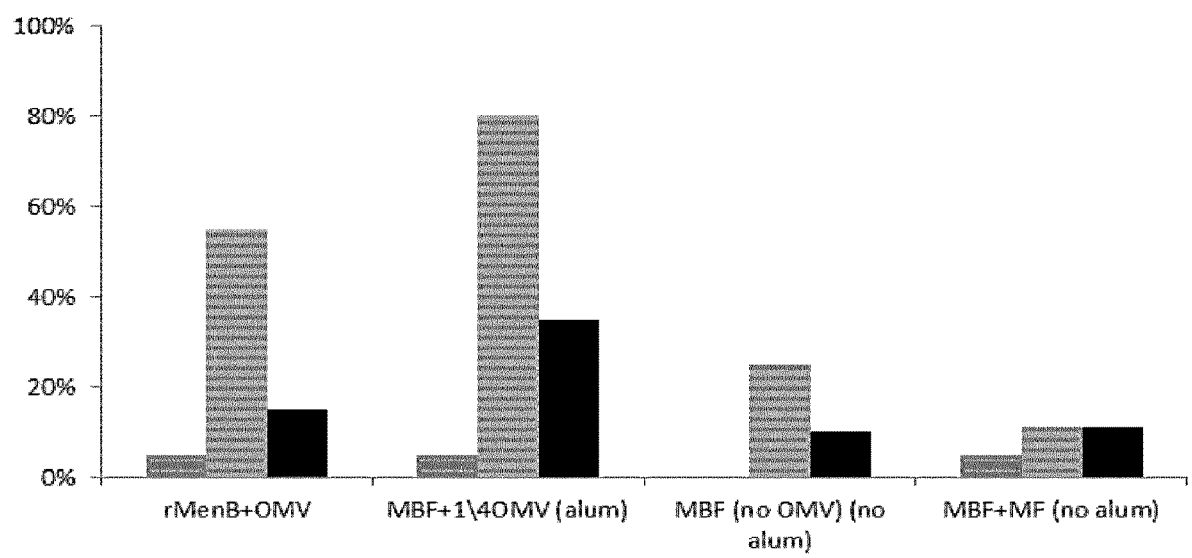

To enhance the BEXSERO™ product it would be advantageous to further enhance the coverage of BEXSERO™ against diverse meningococcal strains (in case of potential shifts and mutations as the vaccine's use spreads) and also to reduce the rare occurrences of fever which are sometimes seen when the vaccine is co-administered with routine infant vaccines [1]. With these aims the inventors have modified BEXSERO™ in two ways: (i) to include multiple alleles or variants of fHbp, in order to provide broader coverage of the diversity which is known for this protein; and (ii) to reduce the quantity of the OMV component in each dose. As shown herein, these two modifications indeed lead to an improvement in the vaccine.

Thus, in a first embodiment the invention provides an immunogenic composition comprising a fusion polypeptide comprising all three of v1, v2 and v3 meningococcal fHbp, in combination with one or more of (i) a NHBA polypeptide (ii) a NadA polypeptide and/or (iii) meningococcal outer membrane vesicles.

Furthermore, in a second embodiment the invention provides an immunogenic composition comprising meningococcal outer membrane vesicles in combination with one or more of (i) a NHBA polypeptide (ii) a NadA polypeptide and/or (iii) a fusion polypeptide comprising all three of v1, v2 and v3 meningococcal fHbp; wherein the outer membrane vesicles are present at a concentration between 5-301.1 g/ml.

Similarly, combining both of these embodiments, the invention provides an immunogenic composition comprising a (i) a fusion polypeptide comprising all three of v1, v2 and v3 meningococcal fHbp, (ii) a NHBA polypeptide (iii) a NadA polypeptide and (iv) 5-30 μg/ml meningococcal outer membrane vesicles.

Factor H Binding Protein (fHbp)

A composition of the invention may include an immunogenic fHbp polypeptide. The BEXSERO™ product includes a fHbp polypeptide, and fHbp has also been known as '741' (SEQ ID NO: 2536 in ref 2; SEQ ID 1 herein), 'NMB1870', 'GNA1870' [3-5], 'P2086', 'LP2086' or 'ORF2086' [6-8]. The 3D structure of this protein is known [9,10], and the protein has two β-barrels connected by a short linker. Many publications have reported on the protective efficacy of this protein in meningococcal vaccines e.g. see references 11-15. This protein is expressed in lipidated form in multiple strains across all serogroups. fHbp sequences have been grouped into three variants [3] (referred to herein as v1, v2 and v3), and it has been found in general that serum raised against a given variant is bactericidal against strains which express that variant, but is not active against strains which express one of the other two variants i.e. there is intra-variant cross-protection, but not inter-variant cross-protection (except for some v2 and v3 cross-reactivity).

To increase inter-variant cross-reactivity the fHbp sequence has been engineered to contain specificities for all three variants [16]. Instead of following this approach, however, the invention utilises a fusion polypeptide which comprises all three of v1, v2 and v3 meningococcal fHbp.

The value of i may be selected from 80, 85, 86, 87, 88, 89, 90, 91, 92, 93, 94, 95, 96, 97, 98, 99 or more. It is preferably 90 (i.e. the amino acid sequence has at least 90% identity to SEQ ID NO: 7) and is more preferably 95.

The fragment of (ii) will generally be at least 7 amino acids long e.g. 8, 10, 12, 14, 16, 18, 22, 24, 26, 28, 30, 32, 24, 26, 28, 40, 45, 50, 55, 60, 65, 70, 75, 80 or more contiguous amino acids from SEQ ID NO: 7. The fragment will typically include at least one epitope from SEQ ID NO: 7. Epitope identification and mapping is established for fHbp [12; 17-21]. Sharing at least 30 contiguous amino acids with SEQ ID NO: 7 will be typical, and usually a v1 fHbp amino acid sequence will include several (e.g. 2, 3, 4, 5 or more) fragments from SEQ ID NO: 7.

Overall, a v1 fHbp amino acid sequence can have at least i % sequence identity to and include several fragments of SEQ ID NO: 7.

A v1 fHbp sequence generally includes at least one amino acid sequence which is not present in SEQ ID NO: 2 and/or at least one amino acid sequence which is not present in SEQ ID NO: 3.

A polypeptide used with the invention and including a v1 sequence can, after administration to a suitable host mammal (such as a mouse or a human), elicit antibodies which

```
v1 fHbp
Full-length fHbp from strain MC58 in v1 has the following amino
acid sequence (SEQ ID NO: 1):
MNRTAFCCLSLTTALILTACSSGGGGVAADIGAGLADALTAPLDHKDKGLQSLTLDQSVRKNEKL

KLAAQGAEKTYGNGDSLNTGKLKNDKVSRFDFIRQIEVDGQLITLESGEFQVYKQSHSALTAFQT

EQIQDSEHSGKMVAKRQFRIGDIAGEHTSFDKLPEGGRATYRGTAFGSDDAGGKLTYTIDFAAKQ

GNGKIEHLKSPELNVDLAAADIKPDGKRHAVISGSVLYNQAEKGSYSLGIFGGKAQEVAGSAEVK

TVNGIRHIGLAAKQ
```

The mature lipoprotein lacks the first 19 amino acids of SEQ ID NO: 1 (underlined; provides SEQ ID NO: 4, beginning with Cys-20). The BEXSERO™ product includes a 'ΔG' form of v1 fHbp in which the full-length sequence is truncated up to residue 26 (i.e. to remove the poly-glycine stretch beginning instead with Val-27), giving SEQ ID NO: 7.

A v1 meningococcal fHbp used with the invention will comprise an amino acid sequence (i) with at least i % sequence identity to SEQ ID NO: 7, and/or (ii) comprising a fragment of SEQ ID NO: 7.

can recognise a wild-type meningococcal polypeptide consisting of SEQ ID NO: 4. These antibodies will include some antibodies which do not recognise a v2 or a v3 polypeptide (e.g. will not recognise a wild-type meningococcal polypeptide consisting of SEQ ID NO: 5 and a wild-type meningococcal polypeptide consisting of SEQ ID NO: 6), although they may also include some antibodies which cross-react with v2 and/or v3 polypeptides. The antibodies are ideally bactericidal against a meningococcal strain which expresses a v1 fHbp e.g. against the MC58 strain (see below).

```
v2 fHbp
Full-length fHbp from strain 2996 in v2 has the following amino
acid sequence (SEQ ID NO: 2):
MNRTAFCCLSLTAALILTACSSGGGGVAADIGAGLADALTAPLDHKDKSLQSLTLDQSVRKNEKL

KLAAQGAEKTYGNGDSLNTGKLKNDKVSREDFIRQIEVDGQLITLESGEFQIYKQDHSAVVALQI

EKINNPDKIDSLINQRSFLVSGLGGEHTAFNQLPDGKAEYHGKAFSSDDAGGKLTYTIDFAAKQG

HGKIEHLKTPEQNVELAAAELKADEKSHAVILGDTRYGSEEKGTYHLALFGDRAQEIAGSATVKI

GEKVHEIGIAGKQ
```

The mature lipoprotein lacks the first 19 amino acids of SEQ ID NO: 2 (underlined; provides SEQ ID NO: 5), and the ΔG form of SEQ ID NO: 2 lacks the first 26 amino acids (SEQ ID NO: 8).

A v2 meningococcal fHbp used with the invention will comprise an amino acid sequence (i) with at least j % sequence identity to SEQ ID NO: 8, and/or (ii) comprising a fragment of SEQ ID NO: 8.

The value of j may be selected from 80, 85, 86, 87, 88, 89, 90, 91, 92, 93, 94, 95, 96, 97, 98, 99 or more. It is preferably 90 (i.e. the amino acid sequence has at least 90% identity to SEQ ID NO: 8) and is more preferably 95.

The fragment of (ii) will generally be at least 7 amino acids long e.g. 8, 10, 12, 14, 16, 18, 20, 22, 24, 26, 28, 30, 32, 24, 26, 28, 40, 45, 50, 55, 60, 65, 70, 75, 80 or more contiguous amino acids from SEQ ID NO: 8. The fragment will typically include at least one epitope from SEQ ID NO: 8. Epitope identification and mapping is established for fHbp (see above). Sharing at least 30 contiguous amino acids with SEQ ID NO: 8 will be typical, and usually a v2 fHbp amino acid sequence will include several (e.g. 2, 3, 4, 5 or more) fragments from SEQ ID NO: 8.

Overall, a v2 fHbp amino acid sequence can have at least j % sequence identity to and include several fragments of SEQ ID NO: 8.

A v2 fHbp sequence generally includes at least one amino acid sequence which is not present in SEQ ID NO: 1 and/or at least one amino acid sequence which is not present in SEQ ID NO: 3.

A polypeptide used with the invention and including a v2 sequence can, after administration to a suitable host mammal (such as a mouse or a human), elicit antibodies which can recognise a wild-type meningococcal polypeptide consisting of SEQ ID NO: 5. These antibodies will include some antibodies which do not recognise a v1 or a v3 polypeptide (e.g. will not recognise a wild-type meningococcal polypeptide consisting of SEQ ID NO: 4 and a wild-type meningococcal polypeptide consisting of SEQ ID NO: 6), although they may also include some antibodies which cross-react with v1 and/or v3 polypeptides. The antibodies are ideally bactericidal against a meningococcal strain which expresses a v2 fHbp e.g. against the M2091 strain (see below).

The fragment of (ii) will generally be at least 7 amino acids long e.g. 8, 10, 12, 14, 16, 18, 22, 24, 26, 28, 30, 32, 24, 26, 28, 40, 45, 50, 55, 60, 65, 70, 75, 80 or more contiguous amino acids from SEQ ID NO: 9. The fragment will typically include at least one epitope from SEQ ID NO: 9. Epitope identification and mapping is established for fHbp (see above). Sharing at least 30 contiguous amino acids with SEQ ID NO: 9 will be typical, and usually a v3 fHbp amino acid sequence will include several (e.g. 2, 3, 4, 5 or more) fragments from SEQ ID NO: 9.

Overall, a v3 fHbp amino acid sequence can have at least k % sequence identity to and include several fragments of SEQ ID NO: 9.

A v3 fHbp sequence generally includes at least one amino acid sequence which is not present in SEQ ID NO: 1 and/or at least one amino acid sequence which is not present in SEQ ID NO: 2.

A polypeptide used with the invention and including a v3 sequence can, after administration to a suitable host mammal (such as a mouse or a human), elicit antibodies which can recognise a wild-type meningococcal polypeptide consisting of SEQ ID NO: 6. These antibodies will include some antibodies which do not recognise a v1 or a v2 polypeptide (e.g. will not recognise a wild-type meningococcal polypeptide consisting of SEQ ID NO: 4 and a wild-type meningococcal polypeptide consisting of SEQ ID NO: 5), although they may also include some antibodies which cross-react with v1 and/or v2 polypeptides. The antibodies are ideally bactericidal against a meningococcal strain which expresses a v3 fHbp e.g. against the M01-240355 strain (see below).

Fusion Polypeptide

The invention utilises a fusion polypeptide which comprises all three of v1, v2 and v3 meningococcal fHbp. As a result, the fusion polypeptide can include at least one epitope from each of SEQ ID NOs: 7, 8, and 9 and, after administration to a host mammal, can elicit antibodies which can recognise all three of (i) a wild-type meningococcal polypeptide consisting of SEQ ID NO: 4, (ii) a wild-type meningococcal polypeptide consisting of SEQ ID NO: 5, and (iii) a wild-type meningococcal polypeptide consisting of SEQ ID NO: 6. These antibodies are ideally bactericidal against a meningococcal strain which expresses a v1 fHbp, v3 fHbp
Full-length fHbp from strain M1239 in v3 has the following amino acid sequence (SEQ ID NO: 3):

```
MNRTAFCCLSLTTALILTACSSGGGGSGGGGVAADIGTGLADALTAPLDHKDKGLKSLTLEDSI

PQNGTLTLSAQGAEKTFKAGDKDNSLNTGKLKNDKISREDFVQKIEVDGQTITLASGEFQIYKQN

HSAVVALQIEKINNPDKTDSLINQRSFLVSGLGGEHTAFNQLPGGKAEYHGKAFSSDDPNGRLHY

SIDFTKKQGYGRIEHLKTLEQNVELAAAELKADEKSHAVILGDTRYGSEEKGTYHLALFGDRAQE

IAGSATVKIGEKVHEIGIAGKQ
```

The mature lipoprotein lacks the first 19 amino acids of SEQ ID NO: 3 (underlined; provides SEQ ID NO: 6), and the ΔG form of SEQ ID NO: 3 lacks the first 31 amino acids (SEQ ID NO: 9).

A v3 meningococcal fHbp used with the invention will comprise an amino acid sequence (i) with at least k % sequence identity to SEQ ID NO: 9, and/or (ii) comprising a fragment of SEQ ID NO: 9.

The value of k may be selected from 80, 85, 86, 87, 88, 89, 90, 91, 92, 93, 94, 95, 96, 97, 98, 99 or more. It is preferably 90 (i.e. the amino acid sequence has at least 90% identity to SEQ ID NO: 9) and is more preferably 95.

a meningococcal strain which expresses a v2 fHbp, and also a meningococcal strain which expresses a v3 fHbp (e.g. against each of the MC58, M2091, and M01-240355 strains).

With reference to the definitions given above, where relevant, for the fusion polypeptide it is preferred that i=j=k.

In general a fHbp fusion polypeptide of the invention has an amino acid sequence of formula:

$$NH_2\text{-A-[-X-L-]}_3\text{-B—COOH}$$

wherein each X is a different variant fHbp sequence, L is an optional linker amino acid sequence, A is an optional N-terminal amino acid sequence, and B is an optional C-terminal amino acid sequence.

The three X moieties are a v1, v2, and v3 sequence as discussed above. These can be present in any order from N- to C-terminus i.e. v1-v2-v3, v1-v3-v2, v2-v1-v3, v2-v3-v1, v3-v1-v2, or v3-v2-v1. The most preferred order is v2-v3-v1.

For each instance of [—X-L-], linker amino acid sequence -L- may be present or absent. Linker amino acid sequence(s) -L- will typically be short (e.g. 20 or fewer amino acids i.e. 19, 18, 17, 16, 15, 14, 13, 12, 11, 10, 9, 8, 7, 6, 5, 4, 3, 2, 1). Examples include short peptide sequences which facilitate cloning, poly-glycine linkers (i.e. $Gly_n$ where n=2, 3, 4, 6, 7, 8, 9, 10 or more), and histidine tags (i.e. $His_n$ where n=3, 4, 5, 6, 7, 8, 9, 10 or more). Other suitable linker amino acid sequences will be apparent to those skilled in the art. One useful linker is GSGGGG (SEQ ID NO: 22), with the Gly-Ser dipeptide being formed from a BamHI restriction site, thus aiding cloning and manipulation. Another useful linker is SEQ ID NO: 23, which can optionally be preceded by a Gly-Ser dipeptide (SEQ ID NO: 24, from BamHI) or a Gly-Lys dipeptide (SEQ ID NO: 25, from HindIII).

-A- is an optional N-terminal amino acid sequence. This will typically be short (e.g. 40 or fewer amino acids i.e. 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1). Examples include leader sequences to direct protein trafficking. If $X_1$ lacks its own N-terminus methionine, -A- may provide such a methionine residue in the translated polypeptide (e.g. -A- is a single Met residue). The Met may be to the N-terminus of a linker sequence such as SEQ ID NO: 23 (i.e. SEQ ID: 26), or at the N-terminus of a short sequence (e.g. SEQ ID NO: 27).

—B— is an optional C-terminal amino acid sequence. This will typically be short (e.g. 40 or fewer amino acids i.e. 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1). Examples include sequences to direct protein trafficking, short peptide sequences which facilitate cloning or purification (e.g. comprising histidine tags i.e. $His_n$ where n=3, 4, 5, 6, 7, 8, 9, 10 or more), or sequences which enhance polypeptide stability. Other suitable C-terminal amino acid sequences will be apparent to those skilled in the art. One suitable —B— moiety is SEQ ID NO: 28, in which the Leu-Glu upstream of the histidine tag arises from a XhoI restriction site.

One fusion polypeptide suitable for use with the invention comprises SEQ ID NO: 10. According to the above formula, in SEQ ID NO: 10 -A- is SEQ ID NO: 26, $X_1$ is a v2 fHbp sequence (SEQ ID NO: 8), -$L_1$- is SEQ ID NO: 24, $X_2$ is a v3 fHbp sequence (SEQ ID NO: 9), -$L_2$- is SEQ ID NO: 22, $X_3$ is a v1 fHbp sequence (SEQ ID NO: 7), and $L_3$ and B are absent. The three fHbp sequences in SEQ ID NO: 10 are underlined below:

```
MGPDSDRLQQRRVAADIGAGLADALTAPLDHKDKSLQSLTLDQSVRKNEKLKLAAQGAEKTYGNG
DSLNTGKLKNDKVSRFDFIRQIEVDGQLITLESGEFQIYKQDHSAVVALQIEKINNPDKIDSLIN
QRSFLVSGLGGEHTAFNQLPDGKAEYHGKAFSSDDAGGKLTYTIDFAAKQGHGKIEHLKTPEQNV
ELAAAELKADEKSHAVILGDTRYGSEEKGTYHLALFGDRAQEIAGSATVKIGEKVHEIGIAGKQG
SGPDSDRLQQRRVAADIGTGLADALTAPLDHKDKGLKSLTLEDSIPQNGTLTLSAQGAEKTFKAG
DKDNSLNTGKLKNDKISRFDFVQKIEVDGQTITLASGEFQIYKQNHSAVVALQIEKINNPDKTDS
LINQRSFLVSGLGGEHTAFNQLPGGKAEYHGKAFSSDDPNGRLHYSIDFTKKQGYGRIEHLKTLE
QNVELAAAELKADEKSHAVILGDTRYGSEEKGTYHLALFGDRAQEIAGSATVKIGEKVHEIGIAG
KQGSGGGGVAADIGAGLADALTAPLDHKDKGLQSLTLDQSVRKNEKLKLAAQGAEKTYGNGDSLN
TGKLKNDKVSRFDFIRQIEVDGQLITLESGEFQVYKQSHSALTAFQTEQIQDSEHSGKMVAKRQF
RIGDIAGEHTSFDKLPEGGRATYRGTAFGSDDAGGKLTYTIDFAAKQGNGKIEHLKSPELNVDLA
AADIKPDGKRHAVISGSVLYNQAEKGSYSLGIFGGKAQEVAGSAEVKTVNGIRHIGLAAKQ
```

A more preferred fusion polypeptide for use with the invention comprises SEQ ID NO: 29. According to the above formula, in SEQ ID NO: 29 -A- is SEQ ID NO: 26, $X_1$ is a v2 fHbp sequence (SEQ ID NO: 8), -$L_1$- is SEQ ID NO: 22, $X_2$ is a v3 fHbp sequence (SEQ ID NO: 9), -$L_2$- is SEQ ID NO: 22, $X_3$ is a v1 fHbp sequence (SEQ ID NO: 7), and $L_3$ and B are absent. The three fHbp sequences in SEQ ID NO: 29 are underlined below:

```
MGPDSDRLQQRRVAADIGAGLADALTAPLDHKDKSLQSLTLDQSVRKNEKLKLAAQGAEKTYGNG
DSLNTGKLKNDKVSRFDFIRQIEVDGQLITLESGEFQIYKQDHSAVVALQIEKINNPDKIDSLIN
QRSFLVSGLGGEHTAFNQLPDGKAEYHGKAFSSDDAGGKLTYTIDFAAKQGHGKIEHLKTPEQNV
ELAAAELKADEKSHAVILGDTRYGSEEKGTYHLALFGDRAQEIAGSATVKIGEKVHEIGIAGKQG
SGGGGVAADIGTGLADALTAPLDHKDKGLKSLTLEDSIPQNGTLTLSAQGAEKTFKAGDKDNSLN
TGKLKNDKISRFDFVQKIEVDGQTITLASGEFQIYKQNHSAVVALQIEKINNPDKTDSLINQRSF
```

-continued

```
LVSGLGGEHTAFNQLPGGKAEYHGKAFSSDDPNGRLHYSIDFTKKQGYGRIEHLKTLEQNVELAA

AELKADEKSHAVILGDTRYGSEEKGTYHLALFGDRAQEIAGSATVKIGEKVHEIGIAGKQGSGGG

GVAADIGAGLADALTAPLDHKDKGLQSLTLDQSVRKNEKLKLAAQGAEKTYGNGDSLNTGKLKND

KVSRFDFIRQIEVDGQLITLESGEFQVYKQSHSALTAFQTEQIQDSEHSGKMVAKRQFRIGDIAG

EHTSFDKLPEGGRATYRGTAFGSDDAGGKLTYTIDFAAKQGNGKIEHLKSPELNVDLAAADIKPD

GKRHAVISGSVLYNQAEKGSYSLGIFGGKAQEVAGSAEVKTVNGIRHIGLAAKQ
```

Thus the invention ideally utilises a polypeptide having amino acid sequence SEQ ID NO: 10 or SEQ ID NO: 29, but the invention can also use a polypeptide comprising SEQ ID NO: 10 or SEQ ID NO: 29, but modified by up to 10 single amino acid changes (i.e. 1, 2, 3, 4, 5, 6, 7, 8, 9, or 10 single amino acid substitutions, deletions and/or insertions), provided that the polypeptide can elicit antibodies which can recognise all three of a wild-type meningococcal polypeptides of SEQ ID NOs: 4-6, as discussed above. Furthermore, SEQ ID NO: 10 or SEQ ID NO: 29 can be modified to change their -A- moiety (e.g. to use an alternative to SEQ ID NO: 26), so a polypeptide used with the invention can comprise SEQ ID NO: 30, optionally modified by up to 10 single amino acid changes (as discussed above).

For instance, SEQ ID NO: 30 can be modified to introduce point mutations which disrupt the ability of each fHbp to interact with fH. For example, SEQ ID NO: 30 can be mutated at residues E240, E496, and R543, thereby giving SEQ ID NO: 31 (comprising mutations E240X, E496X and R543X, where X is any amino acid other than the recited amino acid, i.e., E240X refers to any amino acid other than E at residue 240). A preferred embodiment of SEQ ID NO: 31 is SEQ ID NO: 32 (comprising the mutations E240A, E496A, R543S). The invention can use SEQ ID NO: 31 (e.g. SEQ ID NO: 32), optionally modified by up to single amino acid changes (as discussed above), provided that residues E240, E496, and R543 are not present.

Furthermore, SEQ ID NO: 30 can be modified to introduce point mutations which increase the stability of a fHbp. For example, SEQ ID NO: 30 can be mutated at residues S32, L123, S285, and L379, thereby giving SEQ ID NO: 33 (comprising mutations S32X, L123X, S285X and L379X). A preferred embodiment of SEQ ID NO: 33 is SEQ ID NO: 34 (comprising mutations S32V, L123R, S285V, L379R). The invention can use SEQ ID NO: 33 (e.g. SEQ ID NO: 34), optionally modified by up to 5 single amino acid changes (as discussed above), provided that residues S32, L123, S285, and L379 are not present. One such polypeptide is SEQ ID NO: 35, in which the v1 sequence has been modified to include a mutation as reported in ref 22 e.g. the 'R41S' mutation (SEQ ID NO: 36). SEQ ID NO:35 comprises mutations S32X, L123X, S285X, L379X and R543X, and SEQ ID NO:36 comprises mutations S32V, L123R, S285V, L379R and R543S. The 'R41S' nomenclature is numbered relative to the mature v1 polypeptide (SEQ ID NO:4), thus, e.g., it is present in the SEQ ID NO:35 fusion polypeptide as R543X and in SEQ ID NO:36 as R543S.

These various approaches can be combined, so the invention can utilise a polypeptide comprising SEQ ID NO: 37 (e.g. a polypeptide having amino acid sequence SEQ ID NO: 38). SEQ ID NO: 37 and SEQ ID NO: 38 comprise mutations S32V, L123R, E240A, S285V, L379R, E496A and R543S. SEQ ID NO:38 further comprises SEQ ID NO:26 at the N-terminal In a further embodiment, the invention can use SEQ ID NO: 39 (comprising mutations L123X and L379X) e.g. SEQ ID NO: 40 (comprising mutations L123R and L379R). The invention can similarly use SEQ ID NO: 39 (e.g. SEQ ID NO: 40), optionally modified by up to 5 single amino acid changes (as discussed above), provided that residues L123 and L379 are not present (e.g. see SEQ ID NO: 34, which differs from SEQ ID NO: 40 by including two S/V substitutions as noted above). One such polypeptide is SEQ ID NO: 41, in which the v1 sequence has been modified to include the 'R41S' mutation, and thus comprises L123R, L379R and R543S. In further embodiments, when such fusion proteins are present in compositions of the invention, OMVs may be present at concentrations of between 2.5 µg/ml and 12.5 µg/ml.

The amino acid residues noted for mutation above are defined relative to specific starting sequences. The corresponding amino acid residues in any other fHbp sequence can be readily identified by sequence alignment e.g. being the amino acid which, when aligned using a pairwise alignment algorithm (e.g. the Needleman-Wunsch global alignment algorithm, as detailed below), aligns with the amino acid mentioned herein. Often the amino acid will be the same, but the alignment will easily identify if this is not the case.

The fHbp is naturally a lipoprotein in *N. meningitidis*. It has also been found to be lipidated when expressed in *E. coli* with its native leader sequence or with heterologous leader sequences. Polypeptides of the invention may have a N-terminus cysteine residue, which may be lipidated e.g. comprising a palmitoyl group, usually forming tripalmitoyl-S-glyceryl-cysteine. In usual embodiments, however, the fusion polypeptide of the invention is not lipidated (typically because the N-terminal -A- moiety does not direct lipidation) in the expression host.

Neisserial Heparin Binding Antigen (NHBA)

A composition of the invention may include an immunogenic NHBA polypeptide. The NHBA antigen was included in the published genome sequence for meningococcal serogroup B strain MC58 as gene NMB2132 (GenBank accession number GI:7227388; SEQ ID NO: 11 herein). The sequences of NHBA antigen from many strains have been published since then. For example, allelic forms of NHBA can be seen in FIGS. 5 and 15 of reference 24, and in example 13 and FIG. 21 of reference 2 (SEQ IDs 3179 to 3184 therein). Various immunogenic fragments of the NHBA antigen have also been reported, including the 'ΔG' fragment of SEQ ID NO: 12. Preferred NHBA antigens for use with the invention comprise an amino acid sequence: (a) having 60% or more identity (e.g. 65%, 70%, 75%, 80%, 85%, 90%, 91%, 92%, 93%, 94%, 95%, 96%, 97%, 98%, 99%, 99.5% or more) to SEQ ID NO: 12; and/or (b) comprising a fragment of at least 'n' consecutive amino acids of SEQ ID NO: 12, wherein 'n' is 7 or more (e.g. 8, 10, 12, 14, 16, 18, 20, 25, 30, 35, 40, 50, 60, 70, 80, 90, 100, 150, 200, 250 or more). Preferred fragments of (b) comprise an epitope from SEQ ID NO: 12.

The most useful NHBA antigens of the invention can elicit antibodies which, after administration to a suitable host mammal (such as a mouse or a human), can bind to a meningococcal polypeptide consisting of amino acid sequence SEQ ID NO: 13. Advantageous NHBA antigens for use with the invention can elicit bactericidal anti-meningococcal antibodies after administration to a mammalian subject.

A particularly preferred NHBA polypeptide for use with the invention comprises SEQ ID NO: 12, optionally modified by up to 3 single amino acid changes (i.e. 1, 2, or 3 single amino acid substitutions, deletions and/or insertions), provided that the polypeptide can elicit antibodies which can bind to SEQ ID NO: 13, as discussed above.

As seen in the BEXSERO™ product, the NHBA polypeptide can usefully be present as a fusion polypeptide e.g. fused to a NMB1030 polypeptide. In such fusion polypeptides NMB1030 is preferably downstream of NHBA. NMB1030 from strain MC58 has GenBank accession number GI:7226269 (SEQ ID NO: 14 herein). A NMB1030 sequence for use with the invention can comprise an amino acid sequence: (a) having 60% or more identity (e.g. 65%, 70%, 75%, 80%, 85%, 90%, 91%, 92%, 93%, 94%, 95%, 96%, 97%, 98%, 99%, 99.5% or more) to SEQ ID NO: 14; and/or (b) comprising a fragment of at least 'n' consecutive amino acids of SEQ ID NO: 14, wherein 'n' is 30 or more. One useful NMB1030 fragment is SEQ ID NO: 15.

One such NHBA-NMB1030 fusion polypeptide has amino acid sequence SEQ ID NO: 16. Thus the invention can use SEQ ID NO: 16, optionally modified by up to 3 single amino acid changes (i.e. 1, 2, or 3 single amino acid substitutions, deletions and/or insertions), provided that the polypeptide can elicit antibodies which can bind to SEQ ID NO: 13, as discussed above.

Neisserial Adhesin A (NadA)

A composition of the invention may include an immunogenic NadA polypeptide. The NadA antigen was included in the published genome sequence for meningococcal serogroup B strain MC58 as gene NMB1994 (GenBank accession number GI:7227256; SEQ ID NO: 17 herein). The sequences of NadA antigen from many strains have been published since then, and the protein's activity as a Neisserial adhesin has been well documented. Various immunogenic fragments of NadA have also been reported. Preferred NadA antigens for use with the invention comprise an amino acid sequence: (a) having 60% or more identity (e.g. 65%, 70%, 75%, 80%, 85%, 90%, 91%, 92%, 93%, 94%, 95%, 96%, 97%, 98%, 99%, 99.5% or more) to SEQ ID NO: 17; and/or (b) comprising a fragment of at least 'n' consecutive amino acids of SEQ ID NO: 17, wherein 'n' is 7 or more (e.g. 8, 10, 12, 14, 16, 18, 20, 25, 30, 35, 40, 50, 60, 70, 80, 90, 100, 150, 200, 250 or more). Preferred fragments of (b) comprise an epitope from SEQ ID NO: 17.

The most useful NadA antigens of the invention can elicit antibodies which, after administration to a host mammal, can bind to a meningococcal polypeptide consisting of amino acid sequence SEQ ID NO: 18. Advantageous NadA antigens for use with the invention can elicit bactericidal anti-meningococcal antibodies after administration to a host mammal.

A particularly preferred NadA polypeptide for use with the invention has SEQ ID NO: 19, optionally modified by up to 3 single amino acid changes (i.e. 1, 2, or 3 single amino acid substitutions, deletions and/or insertions), provided that the polypeptide can elicit antibodies which can bind to SEQ ID NO: 18, as discussed above.

Meningococcal Outer Membrane Vesicles (OMVs)

Compositions of the invention include meningococcal OMVs i.e. any proteoliposomic vesicle obtained by disruption of or blebbing from a meningococcal outer membrane to form vesicles therefrom that retain protein components of the outer membrane (e.g. PorA, PorB, RmpM, Opa, Opc, Omp85, FetA/FrpB, NspA, etc.), having a diameter in the range of 50-200 nm. Thus the term can include OMVs (sometimes referred to as 'blebs') as well as the vesicles referred to as microvesicles (MVs [25]) or 'native OMVs' ('NOMVs' [26]). See also references 27 to 33. Typical outer membrane vesicles are prepared artificially from bacteria, and may be prepared using detergent treatment (e.g. with deoxycholate), or by non-detergent means (e.g. see reference 37). Techniques for forming OMVs include treating bacteria with a bile acid salt detergent (e.g. salts of lithocholic acid, chenodeoxycholic acid, ursodeoxycholic acid, deoxycholic acid, cholic acid, ursocholic acid, etc., with sodium deoxycholate [34 & 35] being preferred for treating *Neisseria*) at a pH sufficiently high not to precipitate the detergent [36]. Other techniques may be performed substantially in the absence of detergent [37,38] using techniques such as sonication, homogenisation, microfluidisation, cavitation, osmotic shock, grinding, French press, blending, etc. Methods using no or low detergent can retain useful antigens such as NspA and fHbp [37]. Thus OMVs used with the invention may be prepared using an OMV extraction buffer having about 0.5% deoxycholate or lower e.g. about 0.2%, about 0.1%, <0.05% or even zero.

The vesicles known as MVs and NOMVs are naturally-occurring membrane vesicles that form spontaneously during bacterial growth and are released into culture medium. MVs can be obtained by culturing *Neisseria* in broth culture medium, separating whole cells from the smaller MVs in the broth culture medium (e.g. by filtration or by low-speed centrifugation to pellet only the cells and not the smaller vesicles), and then collecting the MVs from the cell-depleted medium (e.g. by filtration, by differential precipitation or aggregation of MVs, by high-speed centrifugation to pellet the MVs). Strains for use in production of MVs can generally be selected on the basis of the amount of MVs produced in culture e.g. refs. 45 & 46 describe *Neisseria* with high MV production.

Vesicles may be prepared from bacteria which have been genetically manipulated [39-42] e.g. to increase immunogenicity (e.g. hyper-express immunogens), to reduce toxicity, to inhibit capsular polysaccharide synthesis, to down-regulate PorA expression, etc. They may be prepared from hyperblebbing strains [43-46]. Vesicles from bacteria with different class I outer membrane protein subtypes may be used e.g. six different subtypes [47,48] using two different genetically-engineered vesicle populations each displaying three subtypes, or nine different subtypes using three different genetically-engineered vesicle populations each displaying three subtypes, etc. Useful subtypes include: P1.7,16; P1.5-1,2-2; P1.19,15-1; P1.5-2,10; P1.12-1,13; P1.7-2,4; P1.22,14; P1.7-1,1; P1.18-1,3,6. In general, however, it is preferred for the present invention to prepare OMVs from a wild-type meningococcus strain.

Vesicles for use with the invention can thus be prepared from any wild-type meningococcal strain. The vesicles will usually be from a serogroup B strain, but it is possible to prepare them from serogroups other than B (e.g. reference 36 discloses a process for serogroup A), such as A, C, W135 or Y. The strain may be of any serotype (e.g. 1, 2a, 2b, 4, 14, 15, 16, etc.), any serosubtype (e.g. P1.4), and any immunotype (e.g. L1; L2; L3; L3,7; L3,7,9; L10; etc.). The meningococci may be from any suitable lineage, including hyperinvasive and hypervirulent lineages e.g. any of the following seven hypervirulent lineages: subgroup I; subgroup III; subgroup IV-1; ET-5 complex; ET-37 complex; A4 cluster; lineage 3. Most preferably, OMVs are prepared from the strain NZ98/254, or another strain with the P1.4 PorA serosubtype. The invention advantageously uses the same OMVs which are used in the BEXSERO™ and MENZB™ products, prepared from the strain NZ98/254.

Vesicles will generally include meningococcal LOS (also known as LPS), but the pyrogenic effect of LOS in OMVs is much lower than seen with the same amount of purified LOS, and adsorption of OMVs to aluminium hydroxide further reduces pyrogenicity. LOS levels are expressed in International Units (IU) of endotoxin and can be tested by the LAL assay (limulus amebocyte lysate). Preferably, LOS is present at less than 2000 IU per µg of OMV protein.

When LOS is present in a vesicle it is possible to treat the vesicle so as to link its LOS and protein components ("intra-bleb" conjugation [49]).

A useful process for OMV purification is described in reference 50 and involves ultrafiltration on crude OMVs, rather than instead of high speed centrifugation. The process may involve a step of ultracentrifugation after the ultrafiltration takes place. OMVs can also be purified using the two stage size filtration process described in ref 51. OMVs can usefully be suspended in a sucrose solution after they have been prepared.

Combinations

A composition of the invention can include each of (a) a fusion polypeptide comprising all three of v1, v2 and v3 meningococcal fHbp (b) a NHBA polypeptide (c) a NadA polypeptide and (d) OMVs.

In such combinations: (a) the fHbp fusion polypeptide ideally comprises amino acid sequence SEQ ID NO: 10, but optionally modified by up to 10 single amino acid changes, as discussed above; (b) the NHBA polypeptide ideally comprises amino acid sequence SEQ ID NO: 12, but optionally modified by up to 3 single amino acid changes, as discussed above; and (c) the NadA polypeptide ideally comprises amino acid sequence SEQ ID NO: 19, but optionally modified by up to 3 single amino acid changes, as discussed above.

More preferably: (a) the fHbp fusion polypeptide has amino acid sequence SEQ ID NO: (b) the NHBA polypeptide comprises amino acid sequence SEQ ID NO: 12; and (c) the NadA polypeptide has amino acid sequence SEQ ID NO: 19.

Even more preferably: (a) the fHbp fusion polypeptide has amino acid sequence SEQ ID NO: 10; (b) the NHBA polypeptide has amino acid sequence SEQ ID NO: 16; and (c) the NadA polypeptide has amino acid sequence SEQ ID NO: 19.

The polypeptides in compositions of the invention can be present at any concentration which results in an effective immunological response in a host. This dosing can be established through routine testing, particularly in view of the guidance provided by the BEXSERO™ product, which has fHbp, NHBA and NadA polypeptides each present at 100 µg/ml. Thus fHbp, NHBA and/or NadA polypeptides may each be present in a composition of the invention at a concentration of between 20 µg/ml and 400 µg/ml e.g. between 50-150 µg/ml, between 80-120 µg/ml, or about 100 µg/ml. Antigen concentrations are easily quantified by standard protein assays.

Similarly, OMVs in compositions of the invention can be present at any concentration which results in an effective immunological response in a host. This dosing can be established through routine testing, particularly in view of the guidance provided by the BEXSERO™ product, in which OMVs are present at 50 µg/ml. Thus, according to the first embodiment of the invention, OMVs may be present in a composition at a concentration of between 20 µg/ml and 100 µg/ml e.g. between 30-75 µg/ml, between 40-60 µg/ml, or ideally about 50 µg/ml. In the second embodiment of the invention, however, OMVs are present at a lower concentration, namely between 5 µg/ml and 30 µg/ml e.g. between 10 µg/ml and 15 µg/ml, or ideally about 12.5 µg/ml. In certain embodiments, OMVs are present at lower concentrations of between 2.5 µg/ml and 12.5 µg/ml, for example at 2.5 µg/ml, 3.0 µg/ml, 3.5 µg/ml, 4.0 µg/ml, 4.5 µg/ml, 5.0 µg/ml, 5.5 µg/ml, 6.0 µg/ml, 6.5 µg/ml, 7.0 µg/ml, 7.5 µg/ml, 8.0 µg/ml, 8.5 µg/ml, 9.0 µg/ml, 9.5 µg/ml and 10 µg/ml.

OMV quantities and concentrations in compositions of the invention are defined in the same manner as in the BEXSERO™ product, namely by reference to their total protein content. This can be assessed using various assays e.g. ref 29 discloses use of the Folin-Lowry assay. Total protein can be assayed according to the European Pharmacopoeia, Ph. Eur. Assay 2.5.33, using any of the seven pharmacopeial methods. Method 2 provides the Lowry test, which is preferred. Thus a composition of the second embodiment of the invention includes OMVs with 5-30 µg/ml total protein.

Polypeptides

Polypeptides of the invention can be prepared by various means e.g. by chemical synthesis (at least in part), by digesting longer polypeptides using proteases, by translation from RNA, by purification from cell culture (e.g. from recombinant expression or from *N. meningitidis* culture), etc. Heterologous expression in an *E. coli* host is a preferred expression route.

Polypeptides of the invention are ideally at least 100 amino acids long e.g. 150aa, 175aa, 200aa, 225aa, or longer. For instance, a fHbp fusion polypeptide will usually be at least 500aa long, a NHBA polypeptide will usually be at least 400aa long, and a NadA polypeptide will usually be at least 250aa long.

Polypeptides are preferably prepared in substantially pure or substantially isolated form (i.e. substantially free from other Neisserial or host cell polypeptides). In general, the polypeptides are provided in a non-naturally occurring environment e.g. they are separated from their naturally-occurring environment. In certain embodiments, the polypeptide is present in a composition that is enriched for the polypeptide as compared to a starting material. Thus purified polypeptide is provided, whereby purified means that the polypeptide is present in a composition that is substantially free of other expressed polypeptides, whereby substantially free is meant that more than 50% (e.g. ≥75%, ≥80%, ≥90%, ≥95%, or ≥99%) of total polypeptide in the composition is a polypeptide of the invention.

Polypeptides can take various forms (e.g. native, fusions, non-glycosylated, lipidated, disulfide bridges, etc.).

Sequences such as SEQ ID NO: 19 do not include a N-terminus methionine. If a polypeptide of the invention is produced by translation in a biological host then a start codon is required, which will provide a N-terminus methionine in most hosts. Thus a polypeptide of the invention will, at least at a nascent stage, include a methionine residue upstream of said SEQ ID NO sequence.

In some embodiments a polypeptide in a composition of the invention can include a N-terminal sequence upstream of (as appropriate) the fHbp, NHBA or NadA polypeptide sequence. In some embodiments the polypeptide has a single methionine at the N-terminus immediately followed by the relevant immunogen's amino acid sequence; in other embodiments a longer upstream sequence may be used. Such an upstream sequence may be short (e.g. 40 or fewer amino acids i.e. 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1). Examples include leader sequences to direct protein trafficking, or short peptide sequences which facilitate cloning or purification (e.g. a histidine tag i.e. $His_n$ where n=4, 5, 6, 7, 8, 9, 10 or more).

A polypeptide of the invention may also include amino acids downstream of the final amino acid of the fHbp, NHBA or NadA (as appropriate) amino acid sequence. Such C-terminal extensions may be short (e.g. 40 or fewer amino acids i.e. 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1). Examples include sequences to direct protein trafficking, short peptide sequences which facilitate cloning or purification (e.g. comprising a histidine tag i.e. $His_n$ where n=4, 5, 6, 7, 8, 9, 10 or more), or sequences which enhance polypeptide stability. Other suitable C-terminal amino acid sequences will be apparent to those skilled in the art.

The term "polypeptide" refers to amino acid polymers of any length. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art. Polypeptides can occur as single chains or associated chains.

Polypeptides of the invention are preferably expressed recombinantly in a heterologous host (for example, in *E. coli*), then purified, and then combined and formulated with OMVs to give a composition of the invention.

In some embodiments, a polypeptide comprises an amino acid sequence as described above, except that up to 10 amino acids (i.e. 1, 2, 3, 4, 5, 6, 7, 8, 9 or 10) at the N-terminus and/or up to 10 amino acids (i.e. 1, 2, 3, 4, 5, 6, 7, 8, 9 or 10) at the C-terminus are deleted.

Bactericidal Responses

As mentioned above, preferred polypeptides and compositions of the invention can elicit antibody responses that are bactericidal against meningococci. Bactericidal antibody responses are conveniently measured after immunisation of mice and are a standard indicator of vaccine efficacy (e.g. see end-note 14 of ref 52; also ref 53). Thus the antibodies will be bactericidal against a test strain in a suitable serum bactericidal assay (SBA).

A fusion fHbp polypeptide can preferably elicit an antibody response which is bactericidal against a meningococcal strain which expresses a v1 fHbp, a meningococcal strain which expresses a v2 fHbp, and also a meningococcal strain which expresses a v3 fHbp. A suitable v1 strain for a SBA test is MC58, which is widely available (e.g. ATCC BAA-335) and was the strain sequenced in reference 23. A suitable v2 strain for a SBA test is M2091 (ATCC 13091). A suitable v3 strain for a SBA test is M01-240355, which is a *Neisseria* MLST reference strains (id 19265 in ref 54) that has been fully sequenced (see EMBL ID CP002422 [55])

Thus preferred fHbp fusion polypeptides can elicit antibodies in a mouse which are bactericidal against each of strains MC58, M2091, and M01-240355 in a serum bactericidal assay. For example, a composition of the invention can provide a serum bactericidal titer of ≥1:4 using the Goldschneider assay with human complement [56-58], and/or providing a serum bactericidal titer of ≥1:128 using baby rabbit complement.

Immunisation

Polypeptides as discussed above may be used as the active ingredient(s) of immunogenic compositions, and so the invention provides an immunogenic composition (e.g. a vaccine) of the invention comprising polypeptides as discussed above.

The invention also provides a method for raising an antibody response in a mammal, such as a mouse or a human, comprising administering an immunogenic composition of the invention to the mammal. The antibody response is preferably a protective and/or bactericidal antibody response. The invention also provides compositions of the invention for use in such methods.

The invention also provides a method for protecting a mammal, such as a mouse or a human, against a Neisserial (e.g. meningococcal) infection, comprising administering to the mammal an immunogenic composition of the invention.

The invention provides compositions of the invention for use as medicaments (e.g. as immunogenic compositions or as vaccines). In one embodiment, it also provides the use of a fusion polypeptide comprising all three of v1, v2 and v3 meningococcal fHbp, and one or more of (i) a NHBA polypeptide (ii) a NadA polypeptide and/or (iii) meningococcal outer membrane vesicles, in the manufacture of a medicament for preventing Neisserial (e.g. meningococcal) infection in a mammal. In another embodiment, the invention provides the use of meningococcal outer membrane vesicles and one or more of (i) a NHBA polypeptide (ii) a NadA polypeptide and/or (iii) a fusion polypeptide comprising all three of v1, v2 and v3 meningococcal fHbp, in the manufacture of a medicament for preventing Neisserial (e.g. meningococcal) infection in a mammal, wherein the concentration of outer membrane vesicles in the medicament is between 5-30 μg/ml.

The mammal is preferably a human. The human may be an adult or, preferably, a child. Where the vaccine is for prophylactic use, the human is preferably a child (e.g. a toddler or infant); where the vaccine is for therapeutic use, the human is preferably an adult. A vaccine intended for children may also be administered to adults e.g. to assess safety, dosage, immunogenicity, etc.

The uses and methods are particularly useful for preventing/treating diseases including, but not limited to, meningitis (particularly bacterial, such as meningococcal, meningitis) and bacteremia. For instance, they are suitable for active immunisation of individuals against invasive meningococcal disease caused by *N. meningitidis* (for example in serogroup B).

Efficacy of therapeutic treatment can be tested by monitoring Neisserial infection after administration of the composition of the invention. Efficacy of prophylactic treatment can be tested by monitoring immune responses against fHbp, NHBA, NadA and PorA (as appropriate) after administration of the composition. Immunogenicity of compositions of the invention can be determined by administering them to test subjects (e.g. children 12-16 months age, or animal models) and then determining standard parameters including serum bactericidal antibodies (SBA) and ELISA titres (GMT). These immune responses will generally be determined around 4 weeks after administration of the composition, and compared to values determined before administration of the composition. A SBA increase of at least 4-fold or 8-fold is preferred. Where more than one dose of the composition is administered, more than one post-administration determination may be made.

Preferred compositions of the invention can confer an antibody titre in a patient that is superior to the criterion for seroprotection for each antigenic component for an acceptable percentage of human subjects. Antigens with an associated antibody titre above which a host is considered to be seroconverted against the antigen are well known, and such titres are published by organisations such as WHO. Preferably more than 80% of a statistically significant sample of subjects is seroconverted, more preferably more than 90%, still more preferably more than 93% and most preferably 96-100%.

The invention may be used to elicit systemic and/or mucosal immunity.

Compositions of the invention will generally be administered directly to a patient. Direct delivery may be accomplished by parenteral injection (e.g. subcutaneously, intraperitoneally, intravenously, intramuscularly, or to the interstitial space of a tissue), or by rectal, oral, vaginal, topical, transdermal, intranasal, ocular, aural, pulmonary or other mucosal administration. Intramuscular administration to the thigh or the upper arm is preferred. Injection may be via a needle (e.g. a hypodermic needle), but needle-free injection may alternatively be used. A typical intramuscular dose is about 0.5 ml (e.g. as seen in the BEXSERO™ product).

Dosage treatment can be a single dose schedule or a multiple dose schedule. Multiple doses may be used in a primary immunisation schedule and/or in a booster immunisation schedule. A primary dose schedule may be followed by a booster dose schedule. Suitable timing between priming doses (e.g. between 4-16 weeks), and between priming and boosting, can be routinely determined. For instance, the BEXSERO™ product is administered as two or three doses given note less than 1 month or not less than 2 months apart, depending on the subject (e.g. infants or others).

The immunogenic composition of the invention will generally include a pharmaceutically acceptable carrier, which can be any substance that does not itself induce the production of antibodies harmful to the patient receiving the composition, and which can be administered without undue toxicity. Pharmaceutically acceptable carriers can include liquids such as water, saline, glycerol and ethanol. Auxiliary substances, such as wetting or emulsifying agents, pH buffering substances, and the like, can also be present in such vehicles. A thorough discussion of suitable carriers is available in ref 59. For example, the BEXSERO™ product includes sodium chloride, histidine, sucrose, aluminium hydroxide, and water for injections.

Neisserial infections affect various areas of the body and so the compositions of the invention may be prepared in various forms. For example, the compositions may be prepared as injectables, either as liquid solutions or suspensions. Solid forms suitable for solution in, or suspension in, liquid vehicles prior to injection can also be prepared. Compositions suitable for parenteral injection (e.g. to the muscle) are most preferred.

The composition is preferably sterile. It is preferably pyrogen-free. It is preferably buffered e.g. at between pH 6 and pH 8, generally around pH 7. Where a composition comprises an aluminium hydroxide salt, it is preferred to use a histidine buffer [60]. Compositions of the invention may be isotonic with respect to humans.

Immunogenic compositions comprise an immunologically effective amount of immunogen, as well as any other of other specified components, as needed. By 'immunologically effective amount', it is meant that the administration of that amount to an individual, either in a single dose or as part of a series, is effective for treatment or prevention. This amount varies depending upon the health and physical condition of the individual to be treated, age, the taxonomic group of individual to be treated (e.g. non-human primate, primate, etc.), the capacity of the individual's immune system to synthesise antibodies, the degree of protection desired, the formulation of the vaccine, the treating doctor's assessment of the medical situation, and other relevant factors. It is expected that the amount will fall in a relatively broad range that can be determined through routine trials. Dosage treatment may be a single dose schedule or a multiple dose schedule (e.g. including booster doses). The composition may be administered in conjunction with other immunoregulatory agents.

Adjuvants which may be used in compositions of the invention include, but are not limited to insoluble metal salts, oil-in-water emulsions (e.g. MF59 or AS03, both containing squalene), saponins, non-toxic derivatives of LPS (such as monophosphoryl lipid A or 3-O-deacylated MPL), immunostimulatory oligonucleotides, detoxified bacterial ADP-ribosylating toxins, microparticles, liposomes, imidazoquinolones, or mixtures thereof. Other substances that act as immunostimulating agents are disclosed in chapter 7 of ref 61.

The use of an aluminium hydroxide and/or aluminium phosphate adjuvant is particularly preferred, and polypeptides are generally adsorbed to these salts. These salts include oxyhydroxides and hydroxyphosphates (e.g. see chapters 8 & 9 of ref 61). The salts can take any suitable form (e.g. gel, crystalline, amorphous, etc.). $Al^{+++}$ should be present at <1 mg/dose.

The most preferred adjuvant is aluminium hydroxide, as used in the BEXSERO™ product. Polypeptides and OMVs in a composition of the invention can be adsorbed to this adjuvant, as seen in the BEXSERO™ product. Aluminium hydroxide can be included at about 1 mg/ml $Al^{+++}$ (i.e. 0.5 mg per 0.5 ml dose)

Further Antigenic Components

A composition of the invention can include further meningococcal polypeptide immunogens in addition to fHbp, NHBA, NadA and/or OMVs. For instance, it might include one or more of NspA, App, NhhA, HmbR, etc.

A composition of the invention can also include a '936' antigen. The 936 antigen was included in the published genome sequence for meningococcal serogroup B strain MC58 [23] as gene NMB2091 (SEQ ID NO: 20 herein). Preferred 936 antigens for use with the invention comprise an amino acid sequence: (a) having 50% or more identity (e.g. 60%, 65%, 70%, 75%, 80%, 85%, 90%, 91%, 92%, 93%, 94%, 95%, 96%, 97%, 98%, 99%, 99.5% or more) to SEQ ID NO: 21; and/or (b) comprising a fragment of at least 'n' consecutive amino acids of SEQ ID NO: 21, wherein 'n' is 7 or more (e.g. 8, 10, 12, 14, 16, 18, 20, 25, 30, 35, 40, 50, 60, 70, 80, 90, 100, 150, 200, 250 or more). Preferred fragments of (b) comprise an epitope from SEQ ID NO: 21. The most useful 936 antigens of the invention can elicit antibodies which, after administration to a host mammal, can bind to a meningococcal polypeptide consisting of amino acid sequence SEQ ID NO: 20. The 936 antigen is a good fusion partner for fHbp (e.g. see references 62 & 63).

In addition to meningococcal polypeptide antigens, the composition may include antigens for immunising against other diseases or infections. For example, the composition may include one or more of the following further antigens:
- a saccharide antigen from *N. meningitidis* serogroup A, C, W135 and/or Y, such as the saccharide disclosed in ref 64 from serogroup C (see also ref 65) or in ref 66.
- a saccharide antigen from *Streptococcus pneumoniae* [e.g. 67, 68, 69].
- an antigen from hepatitis A virus, such as inactivated virus [e.g. 70, 71].
- an antigen from hepatitis B virus, such as the surface and/or core antigens [e.g. 71, 72].
- a diphtheria antigen, such as a diphtheria toxoid [e.g. chapter 3 of ref 73] e.g. the $CRM_{197}$ mutant [e.g. 74].
- a tetanus antigen, such as a tetanus toxoid (e.g. chapter 4 of ref 73).
- an antigen from *Bordetella pertussis*, such as pertussis holotoxin (PT) and filamentous haemagluttinin (FHA) from *B. pertussis*, optionally also in combination with pertactin and/or agglutinogens 2 and 3 (e.g. refs. 75 & 76).
- a saccharide antigen from *Haemophilus influenzae* B [e.g. 65].
- polio antigen(s) [e.g. 77, 78] such as IPV.
- measles, mumps and/or rubella antigens (e.g. chapters 9, 10 & 11 of ref 73).
- influenza antigen(s) (e.g. chapter 19 of ref 73), such as the haemagluttinin and/or neuraminidase surface proteins.
- an antigen from *Moraxella catarrhalis* [e.g. 79].
- an protein antigen from *Streptococcus agalactiae* (group B *Streptococcus*) [e.g. 80, 81].
- a saccharide antigen from *Streptococcus agalactiae* (group B *Streptococcus*).
- an antigen from *Streptococcus pyogenes* (group A *Streptococcus*) [e.g. 81, 82, 83].
- an antigen from *Staphylococcus aureus* [e.g. 84].

The composition may comprise one or more of these further antigens.

Toxic protein antigens may be detoxified where necessary (e.g. detoxification of pertussis toxin by chemical and/or genetic means [76]).

Where a diphtheria antigen is included in the composition it is preferred also to include tetanus antigen and pertussis antigens. Similarly, where a tetanus antigen is included it is preferred also to include diphtheria and pertussis antigens. Similarly, where a pertussis antigen is included it is preferred also to include diphtheria and tetanus antigens. DTP combinations are thus preferred.

Saccharide antigens are preferably in the form of conjugates. Carrier proteins for the conjugates are discussed in more detail below.

Antigens in the composition will typically be present at a concentration of at least 1 µg/ml each. In general, the concentration of any given antigen will be sufficient to elicit an immune response against that antigen.

Immunogenic compositions of the invention may be used therapeutically (i.e. to treat an existing infection) or prophylactically (i.e. to prevent future infection).

As an alternative to using proteins antigens in the immunogenic compositions of the invention, nucleic acid (which could be RNA, such as a self-replicating RNA, or DNA, such as a plasmid) encoding the antigen may be used.

In some embodiments a composition of the invention comprises conjugated capsular saccharide antigens from 1, 2, 3 or 4 of meningococcus serogroups A, C, W135 and Y. In other embodiments a composition of the invention comprises at least one conjugated pneumococcal capsular saccharide antigen.

Meningococcus Serogroups Y, W135, C and A

Current serogroup C vaccines (MENJUGATE™ [64,85], MENINGITEC™ and NEISVAC-C™) include conjugated saccharides. MENJUGATE™ and MeningitecMENINGITEC™ have oligosaccharide antigens conjugated to a $CRM_{197}$ carrier, whereas NEISVAC-C™ uses the complete polysaccharide (de-O-acetylated) conjugated to a tetanus toxoid carrier. The MENACTRA™ vaccine contains conjugated capsular saccharide antigens from each of serogroups Y, W135, C and A.

Compositions of the present invention may include capsular saccharide antigens from one or more of meningococcus serogroups Y, W135, C and A, wherein the antigens are conjugated to carrier protein(s) and/or are oligosaccharides. For example, the composition may include a capsular saccharide antigen from: serogroup C; serogroups A and C; serogroups A, C and W135; serogroups A, C and Y; serogroups C, W135 and Y; or from all four of serogroups A, C, W135 and Y.

A typical quantity of each meningococcal saccharide antigen per dose is between 1 µg and 20 µg e.g. about 1 µg, about 2.5 µg, about 4 µg, about 5 µg, or about 10 µg (expressed as saccharide).

Where a mixture comprises capsular saccharides from both serogroups A and C, the ratio (w/w) of MenA saccharide:MenC saccharide may be greater than 1 (e.g. 2:1, 3:1, 4:1, 5:1, or higher). Where a mixture comprises capsular saccharides from serogroup Y and one or both of serogroups C and W135, the ratio (w/w) of MenY saccharide:MenW135 saccharide may be greater than 1 (e.g. 2:1, 3:1, 4:1, 5:1, 10:1 or higher) and/or that the ratio (w/w) of MenY saccharide:MenC saccharide may be less than 1 (e.g. 1:2, 1:3, 1:4, 1:5, or lower). Preferred ratios (w/w) for saccharides from serogroups A:C:W135:Y are: 1:1:1:1; 1:1:1:2; 2:1:1:1; 4:2:1:1; 8:4:2:1; 4:2:1:2; 8:4:1:2; 4:2:2:1; 2:2:1:1; 4:4:2:1; 2:2:1:2; 4:4:1:2; and 2:2:2:1. Preferred ratios (w/w) for saccharides from serogroups C:W135:Y are: 1:1:1; 1:1:2; 1:1:1; 2:1:1; 4:2:1; 2:1:2; 4:1:2; 2:2:1; and 2:1:1. Using a substantially equal mass of each saccharide is preferred.

Capsular saccharides may be used in the form of oligosaccharides. These are conveniently formed by fragmentation of purified capsular polysaccharide (e.g. by hydrolysis), which will usually be followed by purification of the fragments of the desired size.

Fragmentation of polysaccharides is preferably performed to give a final average degree of polymerisation (DP) in the oligosaccharide of less than 30 (e.g. between 10 and 20, preferably around 10 for serogroup A; between 15 and 25 for serogroups W135 and Y, preferably around 15-20; between 12 and 22 for serogroup C; etc.). DP can conveniently be measured by ion exchange chromatography or by colorimetric assays [86].

If hydrolysis is performed, the hydrolysate will generally be sized in order to remove short-length oligosaccharides [65]. This can be achieved in various ways, such as ultrafiltration followed by ion-exchange chromatography. Oligosaccharides with a degree of polymerisation of less than or equal to about 6 are preferably removed for serogroup A, and those less than around 4 are preferably removed for serogroups W135 and Y.

Preferred MenC saccharide antigens are disclosed in reference 85, as used in MENJUGATE™.

Covalent Conjugation

Capsular saccharides in compositions of the invention will usually be conjugated to carrier protein(s). In general, conjugation enhances the immunogenicity of saccharides as it converts them from T-independent antigens to T-dependent antigens, thus allowing priming for immunological memory. Conjugation is particularly useful for paediatric vaccines and is a well known technique.

Typical carrier proteins are bacterial toxins, such as diphtheria or tetanus toxins, or toxoids or mutants thereof. The $CRM_{197}$ diphtheria toxin mutant is useful, and is the carrier in the PREVNAR™ product. Other suitable carrier proteins include the N. meningitidis outer membrane protein complex [88], synthetic peptides [89,90], heat shock proteins [91,92], pertussis proteins [93,94], cytokines [95], lymphokines [95], hormones [95], growth factors [95], artificial proteins comprising multiple human CD4+ T cell epitopes from various pathogen-derived antigens such as N19 [97], protein D from H. influenzae [98-100], pneumolysin [101] or its non-toxic derivatives [102], pneumococcal surface protein PspA [103], iron-uptake proteins [104], toxin A or B from C. difficile [105], recombinant P. aeruginosa exoprotein A (rEPA) [106], etc.

Any suitable conjugation reaction can be used, with any suitable linker where necessary.

The saccharide will typically be activated or functionalised prior to conjugation. Activation may involve, for example, cyanylating reagents such as CDAP (e.g. 1-cyano-4-dimethylamino pyridinium tetrafluoroborate [107,108, etc.]). Other suitable techniques use carbodiimides, hydrazides, active esters, norbornane, p-nitrobenzoic acid, N-hydroxysuccinimide, S-NHS, EDC, TSTU, etc.

Linkages via a linker group may be made using any known procedure, for example, the procedures described in references 109 and 110. One type of linkage involves reductive amination of the polysaccharide, coupling the resulting amino group with one end of an adipic acid linker group, and then coupling a protein to the other end of the adipic acid linker group [111,112]. Other linkers include B-propionamido [113], nitrophenyl-ethylamine [114], haloacyl halides [115], glycosidic linkages [116], 6-aminocaproic acid [117], ADH [118], $C_4$ to $C_{12}$ moieties [119] etc. As an alternative to using a linker, direct linkage can be used. Direct linkages to the protein may comprise oxidation of the polysaccharide followed by reductive amination with the protein, as described in, for example, references 120 and 121.

A process involving the introduction of amino groups into the saccharide (e.g. by replacing terminal =O groups with —$NH_2$) followed by derivatisation with an adipic diester (e.g. adipic acid N-hydroxysuccinimido diester) and reaction with carrier protein is preferred. Another preferred reaction uses CDAP activation with a protein D carrier e.g. for MenA or MenC.

General

The term "comprising" encompasses "including" as well as "consisting" e.g. a composition "comprising" X may consist exclusively of X or may include something additional e.g. X+Y. References to "comprising" (or "comprises", etc.) may optionally be replaced by references to "consisting of" (or "consists of", etc.).

The term "about" in relation to a numerical value x is optional and means, for example, x±10%.

The word "substantially" does not exclude "completely" e.g. a composition which is "substantially free" from Y may be completely free from Y. Where necessary, the word "substantially" may be omitted from the definition of the invention.

"Sequence identity" is preferably determined by the Needleman-Wunsch global alignment algorithm [122], using default parameters (e.g. with Gap opening penalty=10.0, and with Gap extension penalty=0.5, using the EBLOSUM62 scoring matrix). This algorithm is conveniently implemented in the needle tool in the EMBOSS package [123]. Where the application refers to sequence identity to a particular SEQ ID, the identity should be calculated over the entire length of that SEQ ID.

After serogroup, meningococcal classification includes serotype, serosubtype and then immunotype, and the standard nomenclature lists serogroup, serotype, serosubtype, and immunotype, each separated by a colon e.g. B:4:P1.15:L3,7,9. Within serogroup B, some lineages cause disease often (hyperinvasive), some lineages cause more severe forms of disease than others (hypervirulent), and others rarely cause disease at all. Seven hypervirulent lineages are recognised, namely subgroups I, III and IV-1, ET-5 complex, ET-37 complex, A4 cluster and lineage 3. These have been defined by multilocus enzyme electrophoresis (MLEE), but multilocus sequence typing (MLST) has also been used to classify meningococci. The four main hypervirulent clusters are ST32, ST44, ST8 and ST11 complexes.

EXAMPLES

Example 1: The BEXSERO™ Vaccine (for Reference)

The BEXSERO™ product is safe and effective and has been authorised for human use in Europe and elsewhere. It has the following immunogenic ingredients per 0.5 ml dose:

| Immunogen | Quantity | Notes |
| --- | --- | --- |
| fHbp | 50 µg | Fusion polypeptide with NMB2091 at N-terminus |
| NHBA | 50 µg | Fusion polypeptide with NMB1030 at C-terminus |
| NadA | 50 µg | — |
| OMV | 25 µg (total protein) | Strain NZ98/254 (B:4:P1.7-2,4,L1,3) |

These immunogens are adsorbed to an aluminium hydroxide adjuvant (0.5 mg $Al^{+++}$ per dose). The composition also includes NaCl, a histidine buffer, and sucrose.

Example 2: Stabilised and Stabilised Non-Binding Fusion Polypeptides

The inventors have studied two different types of mutation in v2 and v3: firstly, they have identified residues within SEQ ID NO: 2 and SEQ ID NO: 3 which can be modified to increase the polypeptide's stability. Secondly, they have identified residues which decrease binding to human factor H (fH). Mutant fHbp polypeptides comprising both types of mutation, have enhanced properties. Specifically, fHbp mutants that do not bind factor H but which retain immunogenicity are advantageous because the resultant antibody responses are directed towards epitopes in or near the fH-binding site. Following vaccination using wild-type fHbp vaccine antigens, such epitopes may be obscured by factor H binding. The amino acids of most interest are as follows, numbered according to the full-length sequences (SEQ ID NOs: 1 & 3) and also according to the AG sequences (SEQ ID NOs: 8 & 9):

|    |            | Stability** | fH binding |         |
|----|------------|-------------|------------|---------|
| v2 | SEQ ID NO: 1 | Ser-58    | Leu-149    | Glu-266 |
|    | SEQ ID NO: 8 | Ser-32    | Leu-123    | Glu-240 |
| v3 | SEQ ID NO: 3 | Ser-63    | Leu-157    | Glu-274 |
|    | SEQ ID NO: 9 | Ser-32    | Leu-126    | Glu-243 |

**Where only one of these residues is mutated, it is preferably the leucine

Figure 2:
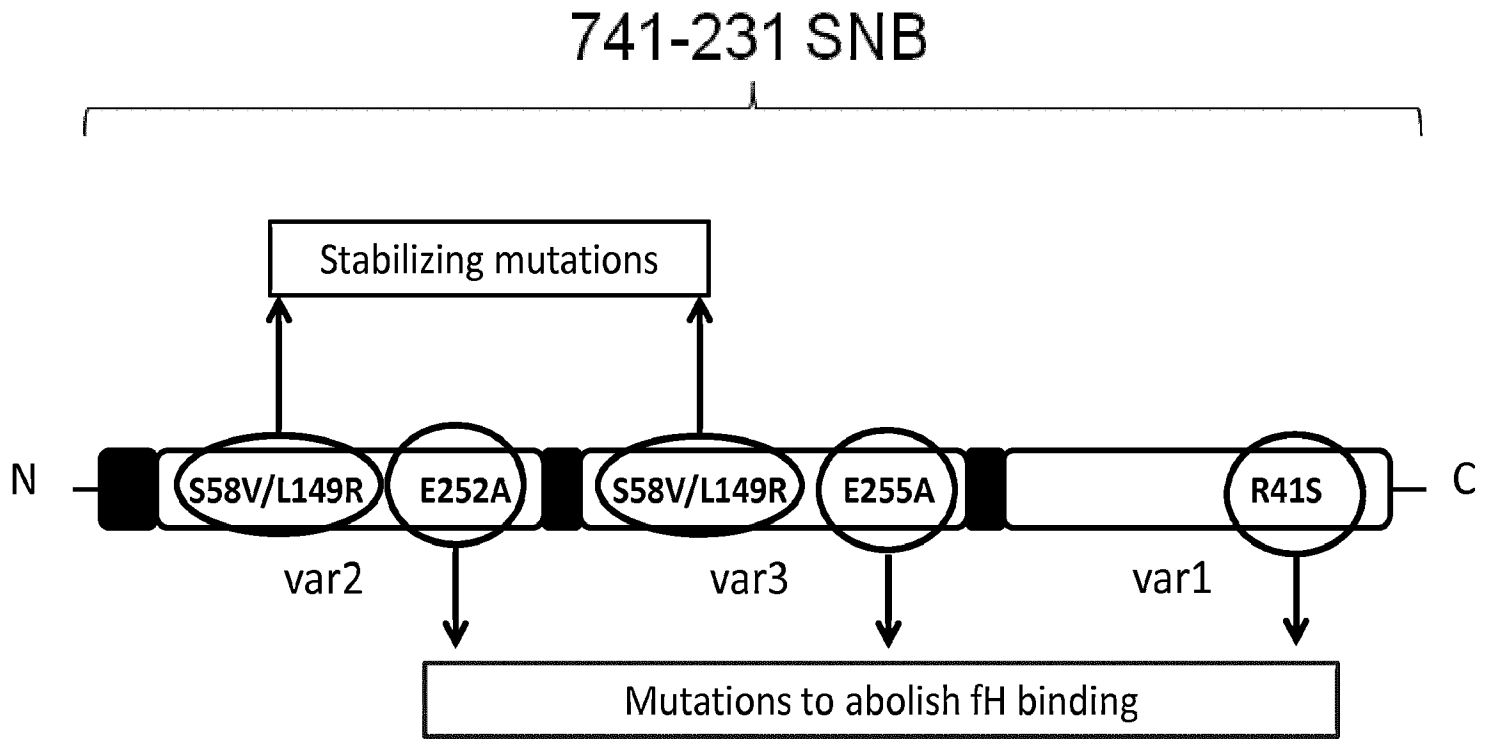

The mutations for stability and fHbp binding were combined into mutant forms of v2 and v3 and fused with a mutant v1 sequence comprising the R41S mutation. Mutants were fused in the order v2-v3-v1 and were joined using linkers, to give 731 SNB (SEQ ID NO: 38). Compared to the three wild-type sequences, this fusion polypeptide includes a total of 7 point mutations (FIG. 2).

Separately, the mutations for stability in v2 and v3 were fused with the 'R41S' mutant v1 sequence in the order v2-v3-v1 and were joined using linkers, to give 731 S (SEQ ID NO: 40). Thus, compared to the three wild-type sequences, this fusion polypeptide includes a total of 5 point mutations (FIG. 2).

The ability of non-fH binding forms of fHbp to elicits SBA titers was tested in transgenic (Tg) mice:

|              | rSBA titers obtained against prototypic strains | | |
|--------------|---------|----------|----------|
| Antigen      | Var 1.1 | Var 2.16 | Var 3.42 |
| fHbp fusion SEQ ID NO: 10 | 1024* | 4096 | 8192 |
| fHbp fusion SEQ ID NO: 38 | 16384 | 32768 | >32768 |

These data indicate that non-binding forms of fHbp may be more immunogenic.

Example 3: Substitution of NMB2091-fHbp Fusion

The BEXSERO™ product was modified by replacing the NMB2091-fHbp fusion polypeptide with a "triple fusion" polypeptide of fHbp variants, with v2-v3-v1 from N- to C-terminus. This fusion polypeptide has the amino acid sequence SEQ ID NO: 10. In addition, the OMV component was removed. The two vaccines were compared in mice immunised at days 0, 21 and 35, with sera being assessed at days 34 and 49 against a panel of 15 serogroup B strains in various clonal complexes, MLST, and ET classifications. Antigens were administered at 20n/dose, using the adjuvant at 3 mg/ml.

The proportion of strains with SBA titers above various thresholds were as follows:

| Threshold | Original vaccine | Modified vaccine |
|-----------|------------------|------------------|
| ≥128      | 100%             | 100%             |
| ≥1024     | 93%              | 80%              |
| >4096     | 53%              | 60%              |

Use of the v2-v3-v1 fusion polypeptide can thus provide cover against a higher proportion of the panel (60% vs. 53%) at a high anti-MenB SBA titer (>4096).

Example 4: 4-Fold Reduction of OMV Dosage

The BEXSERO™ product was modified by replacing the NMB2091-fHbp fusion polypeptide with the "triple fusion" fHbp v2-v3-v1 polypeptide (SEQ ID NO:10) but also by either (i) reducing the OMV dosage 4-fold to 12.5 µg/ml or (ii) removing the OMV component. Thus three compositions were prepared:

| Group | Protein immunogens | | | OMVs |
|-------|--------------------|--|--|------|
| M     | NMB2091-fHbp | NHBA-NMB1030 | NadA | 50 µg/ml |
| C     | fHbp-v2-v3-v1 | NHBA-NMB1030 | NadA | 12.5 µg/ml |
| S     | fHbp-v2-v3-v1 | NHBA-NMB1030 | NadA | — |

To assess immunogenicity of these three vaccines human subjects received three doses at monthly intervals (months 0,1,2). Sera were taken at months 0, 1, 2 and 3, and then 6 months after the third dose (month 8), for assessment against a panel of relevant strains. Titers (GMT) were as follows:

|           | M    | C    | S    |
|-----------|------|------|------|
| Strain H44/76 | | | |
| Time zero | 1.36 | 2.16 | 1.55 |
| 1 month   | 30   | 52   | 15   |
| 2 months  | 97   | 91   | 48   |
| 3 months  | 102  | 99   | 59   |
| 8 months  | 25   | 33   | 12   |
| Strain 5/99 | | | |
| Time zero | 2.47 | 3.01 | 2.17 |
| 1 month   | 70   | 75   | 56   |
| 2 months  | 173  | 140  | 157  |
| 3 months  | 237  | 236  | 365  |
| 8 months  | 77   | 83   | 106  |
| Strain NZ98/254 | | | |
| Time zero | 1.21 | 2.04 | 1.73 |
| 1 month   | 9.45 | 29   | 3.19 |
| 2 months  | 13   | 12   | 4.4  |
| 3 months  | 16   | 24   | 6.49 |
| 8 months  | 3.55 | 8.02 | 3.55 |
| Strain M14459 | | | |
| Time zero | 1.86 | 2.48 | 2.16 |
| 2 months  | 30   | 24   | 16   |
| 3 months  | 34   | 31   | 19   |
| Strain UK364 | | | |
| Time zero | 1.35 | 1.97 | 2.07 |
| 2 months  | 37   | 72   | 70   |
| 3 months  | 56   | 113  | 112  |

Pooled patient sera were used to assess coverage of a panel of 7 MenB strains which express a v1 fHbp. A similar number of strains was adequately covered in each group, but titers (GMT) were highest in group C:

|           | M    | C    | S    |
|-----------|------|------|------|
| Time zero | <10  | <10  | <10  |
| 3 months  | 70   | 140  | 40   |
| 8 months  | 15   | 50   | 10   |

Single patient sera were tested against a panel of 6 MenB strains which express a v2 or v3 fHbp (one strain was tested twice). Again, titers (GMT) were highest in group C:

|  | M | C | S |
|---|---|---|---|
| Strain M14549 (v2) | | | |
| Time zero | 1.4 | 1.5 | 1.1 |
| 2 months | 3.8 | 15.0 | 6.2 |
| 3 months | 3.6 | 21.4 | 6.6 |
| Strain M12566 (v2) | | | |
| Time zero | 6.0 | 10.7 | 14.8 |
| 2 months | 40.4 | 80.0 | 60.1 |
| 3 months | 47.1 | 94.8 | 69.7 |
| Strain UK355 (v3) | | | |
| Time zero | 2.7 | 4.0 | 5.0 |
| 2 months | 22.1 | 43.7 | 38/4 |
| 3 months | 21.3 | 55.0 | 41.7 |
| Strain M1239 (v3) | | | |
| Time zero | 2.3 | 3.0 | 2.1 |
| 2 months | 5.0 | 15.7 | 5.9 |
| 3 months | 5.7 | 21.9 | 5.9 |
| Strain M1239 (v3) | | | |
| Time zero | 1.2 | 1.6 | 1.1 |
| 2 months | 5.9 | 18.4 | 2.8 |
| 8 months | 1.9 | 4.1 | 1.6 |
| Strain UK293 (v2) | | | |
| Time zero | 1.6 | 2.7 | 2.2 |
| 2 months | 9.2 | 52.0 | 7.0 |
| 8 months | 4.3 | 11.7 | 5.9 |
| Strain UK414 (v2) | | | |
| Time zero | 1.4 | 2.1 | 1.6 |
| 2 months | 5.1 | 22.6 | 8.3 |
| 8 months | 3.1 | 10.9 | 6.3 |

Furthermore, the proportion of immunised subjects with a SBA titer above 1:8 was generally higher in group C compared to groups M and S e.g. 80% or more for strain M1239 after 3 doses compared to 50% or less in the other two groups.

RCD curves (reverse cumulative distribution) of SBA titers also showed a better profile e.g. FIG. 1 shows a curve for 3 month sera against strain UK293, with group C being clearly above the others.

Pooled patient sera were used to assess coverage of a panel of 26 MenB strains which express a v2 or v3 fHbp. Again, titers (GMT) were highest in group C:

|  | M | C | S |
|---|---|---|---|
| 3 months | 23 | 91 | 25 |
| 8 months | 7 | 43 | 9 |

These data thus show that vaccine 'C', in which the fHbp immunogen has been replaced and the OMV dosage was reduced 4-fold, is not inferior to the BEXSERO™ vaccine. Indeed, single-subject and pooled sera both show better seroresponse rates, higher GMTs, and increased strain coverage for vaccine 'C' when compared to the BEXSERO™ vaccine.

Example 5: Antibody Avidity

Avidity of antibodies from patients in groups 'C' and 'S' was compared using a Gyrolab-based system which includes a wash step using a chaotropic agent to detach low affinity antibodies from antigen, giving in 'Avidity Index' as the percentage of high affinity anti-v1.fHbp antibodies out of total v1.fHbp-specific antibodies. Twenty separate sera were assessed 1 month after the first dose and 1 month after the third dose. In addition, SBA titres were assessed against strain H44/76, and correlations between avidity index and SBA titre (log 2) were determined.

Results (R and p by Pearson correlation) were as follows:

|  | 1 month post-1 | | 1 month post-3 | |
|---|---|---|---|---|
|  | R | p | R | p |
| C | 0.693 | 0.001 | 0.4667 | 0.0381 |
| S | 0.3565 | 0.1229 | 0.101 | 0.6718 |

Thus there was a significant correlation between SBA titre and avidity index in group 'C' at both time points, but not in group '5'. In subjects who received the vaccine with 12.5 μg/ml OMV the Avidity Index correlates with the SBA titres, which suggests that the presence of OMV has a positive impact on the quality of the induced antibodies. Overall, in subjects who received OMV the trend is that the bactericidal titers are higher and they correlate with the avidity of the antibodies induced by the vaccine formulation.

A subpanel of var⅔ strains was selected for single subject sera testing on the basis of following criteria: (i) Strains not covered by BEXSERO™ in previous clinical trials, (ii) Strains belong to relevant clonal complexes, (iii) Strains express epidemiologically relevant fHbp subvariants, (iv) Level of fHbp expression is medium, (v) Strains are specifically killed by 741-231 (competitive hSBA). Results are shown in FIGS. 3(a) to 3(g) demonstrating that 741-231+¼OMV+alum elicits higher GMT against the 7 strains tested. Thus, hSBA testing indicates that formulations including 741-231 fusion are not inferior to BEXSERO™. In fact, both single subject sera and pooled sera analysis on var⅔ strains show better seroresponse rates, higher GMT titers and increased strain coverage for formulation including 741-231+¼OMV+alum.

Example 6: Reduction of OMV Dosage and Use of 731 'S' and 731 'SNB'

The BEXSERO™ product was modified by replacing the NMB2091-fHbp fusion polypeptide with the "triple fusion" stabilised or stabilised non-binding fHbp v2-v3-v1 polypeptides (SEQ ID NOs:40 and 38 respectively) but also by reducing the OMV dosage to 10 μg/ml or 2.5 μg/ml:

| Group | Protein immunogens | | OMVs | |
|---|---|---|---|---|
| 1 | NMB2091-fHbp | NHBA-NMB1030 | NadA | 10 μg/ml |
| 2 | fHbp-v2-v3-v1 SNB | NHBA-NMB1030 | NadA | 2.5 μg/ml |
| 3 | fHbp-v2-v3-v1 S | NHBA-NMB1030 | NadA | 2.5 μg/ml |

To prepare mice antisera, 20 μg of NadA, NHBA-NMB1030 and either NMB2091-fHbp, fHbp 231S or fHbp 231SNB with 10 μg or 2.5 ug of OMV derived from strain NZ98/254 were used to immunize 6-week-old CD1 female mice (Charles River). Eight mice per group were used. The antigens were administered intraperitoneally together with aluminium hydroxide (3 mg/ml) on days 0, 21 and 35.Sera were collected 2 weeks after the final bleed and heat-inactivated for 30 min at 56° C. before testing.

Serum Bactericidal Assay with Animal Sera and Human Complement

Serum bactericidal activity against Nm strains was evaluated as previously described. Human serum or plasma from a healthy adult (with no intrinsic bactericidal activity when tested at a final concentration of 25 or 50%) was used as a complement source. Serum bactericidal titers were defined as the serum dilution resulting in 50% decrease in colony forming units (CFU) per ml after 60 min incubation of bacteria with reaction mixture, compared to control CFU per ml at time 0.

The lowest dilution tested for each sera was 1:16 (limit of detection). Titers below the limit of detection were set to half that limit for the purposes of analysis and positive threshold was defined as a 4 fold rise compared to this value (i.e 32). Pooled serum derived from mice immunized with BEXSERO™ formulation were under the positive threshold for 14 strains among the 34 strain tested, while pooled sera derived from 2n d generation formulation were under the limit of detection for only 1 strain in case of vaccine formulation containing fHbp 231SNB and for 1 strains in case of formulation containing fHbp 231S.

hSBA data reported in the below table showed an increase of coverage elicited by the vaccine formulations containing fHbp 231S or fHbp 231SNB compare to BEXSERO™ in the panel of 34 strains tested:

|  | MenB strains | | hSBA results with different formulations | | |
| --- | --- | --- | --- | --- | --- |
| | ID | fHbp subvariant | Bexsero | 741-231 SNB + 961c + 287- 953 + ¼ OMV | 741-231 S + 961c + 287- 953 + ¼ OMV |
| Bexsero reference strains | NVD000007 | 2.23 | >8192 | >8192 | >8192 |
| | NVD000005 | 2.16 | 2048 | 4096 | 2048 |
| | NVD000023 | 3.31 | 4096 | 4096 | 8192 |
| | NVD002240 | 2.553 | 32 | 512 | 128 |
| | NVD000025 | 1.1 | >8192 | >8192 | >8192 |
| | NVD001491 | 1.180 | 1024 | 1024 | 512 |
| | NVD000049 | 1.14 | 4096 | 4096 | 2048 |
| MenB strains carrying var1 fHbp | NVD001706 | 1.1 | 4096 | 4096 | 4096 |
| | NVD001889 | 1.4 | 1024 | 2048 | 2048 |
| | NVD001402 | 1.4 | 512 | 1024 | 1024 |
| | NVD001908 | 1.13 | 512 | 1024 | 1024 |
| | NVD001244 | 1.14 | 2048 | 2048 | 2048 |
| | NVD003213 | 1.15 | 2048 | 1024 | 2048 |
| | NVD001080 | 1.15 | 512 | 512 | 512 |
| | NVD000185 | 1.15 | 512 | 512 | 512 |
| | NVD000758 | 1.256 | <16 | 64 | <16 |
| MenB strains carrying var2 fHbp | NVD002368 | 2.16 | 64 | 1024 | 512 |
| | NVD002500 | 2.16 | <16 | 512 | 512 |
| | NVD000926 | 2.16 | 8192 | >8192 | 4096 |
| | NVD002552 | 2.19 | 16 | 512 | 1024 |
| | NVD001277 | 2.19 | <16 | 1024 | 2048 |
| | NVD001057 | 2.19 | 32 | 1024 | 512 |
| | NVD001342 | 2.19 | 64 | 2048 | 1024 |
| | NVD001391 | 2.19 | <16 | 512 | 512 |
| | NVD001288 | 2.21 | <16 | 512 | 512 |
| | NVD002690 | 2.24 | <16 | 256 | 256 |
| | NVD001287 | 2.24 | 16 | 128 | 256 |
| MenB strains carrying var3 fHbp | NVD000038 | 3.28 | <16 | 64 | 64 |
| | NVD000084 | 3.30 | <16 | 1024 | 2048 |
| | NVD003212 | 3.31 | <16 | 512 | 256 |
| | NVD003364 | 3.42 | <16 | 2048 | 2048 |
| | NVD002424 | 3.42 | <16 | 1024 | 1024 |
| | NVD003727 | 3.42 | <16 | <16 | <16 |

It will be understood that the invention is described above by way of example only and modifications may be made whilst remaining within the scope and spirit of the invention

REFERENCES

[1] Carter (2013) *BioDrugs* 27:263-74.
[2] WO99/57280.
[3] Masignani et al. (2003) *J Exp Med* 197:789-799.
[4] Welsch et al. (2004) *J Immunol* 172:5605-15.
[5] Hou et al. (2005) *J Infect Dis* 192(4):580-90.
[6] WO03/063766.
[7] Fletcher et al. (2004) *Infect Immun* 72:2088-2100.
[8] Zhu et al. (2005) *Infect Immun* 73(10):6838-45.
[9] Cendron et al. (2011) *Acta Crystallogr Sect F Struct Biol Cryst Commun.* 67:531-5.
[10] Mascioni et al. (2009) *J Biol Chem* 284:8738-46.
[11] Pizza et al. (2008) *Vaccine* 26 Suppl 8:146-8.
[12] Malito et al. (2013) *PNAS USA* 110:3304-9.
[13] Marshall et al. (2012) *Pediatr Infect Dis J* 31:1061-8.
[14] McNeil et al. (2013) *Microbiol Mol Biol Rev* 77:234-52.
[15] Serruto et al. (2012) *Vaccine* 30 Suppl 2: B87-97.
[16] Scarselli et al. (2011) *Sci Transl Med* 3:91ra62.
[17] Beernink et al. (2008) *Infect Immun* 76:4232-40.
[18] Scarselli et al. (2009) *J Mol Biol* 386:97-108.
[19] Giuntini et al. (2012) *PLoS One* 7:e34272.
[20] Vu et al. (2012) *Sci Rep* 2:341.
[21] Faleri et al. (2013) *FASEB J* fj 0.13-239012.
[22] Beernink et al. (2011) *J Immunol* 186:3606-14.
[23] Tettelin et al. (2000) *Science* 287:1809-1815.
[24] WO00/66741.
[25] WO02/09643.
[26] Katial et al. (2002) *Infect Immun* 70:702-707.
[27] WO01/52885.
[28] European patent 0301992.

[29] Frasch et al. (2001) chapter 7 of *Methods in Molecular Medicine*, volume 66 ('*Meningococcal Vaccines: Methods and Protocols*', eds. Pollard & Maiden).
[30] Bjune et al. (1991) *Lancet* 338(8775):1093-1096.
[31] Fukasawa et al. (1999) *Vaccine* 17:2951-2958.
[32] WO02/09746.
[33] Rosenqvist et al. (1998) *Dev. Biol. Stand.* 92:323-333.
[34] European patent 0011243.
[35] Fredriksen et al. (1991) *NIPH Ann.* 14(2):67-80.
[36] WO01/91788.
[37] WO2004/019977.
[38] U.S. Pat. No. 6,558,677.
[39] WO01/09350.
[40] European patent 0449958.
[41] EP-A-0996712.
[42] EP-A-0680512.
[43] WO02/062378.
[44] WO99/59625.
[45] U.S. Pat. No. 6,180,111.
[46] WO01/34642.
[47] Peeters et al. (1996) *Vaccine* 14:1008-1015.
[48] Vermont et al. (2003) *Infect Immun* 71:1650-1655.
[49] WO2004/014417.
[50] WO2005/004908.
[51] WO2011/036562.
[52] Pizza et al. (2000) *Science* 287:1816-1820.
[53] WO2007/028408.
[54] (hypertext transfer protocol)://pubmlstorg/neisseria/
[55] Budroni et al. (2011) *PNAS USA* 108:4494-99.
[56] Goldschneider et al. (1969) *J. Exp. Med.* 129:1307-26.
[57] Santos et al. (2001) *Clinical and Diagnostic Laboratory Immunology* 8:616-23.
[58] Frasch et al. (2009) *Vaccine* 27S:B112-6.
[59] Gennaro (2000) *Remington: The Science and Practice of Pharmacy*. 20th edition, ISBN: 0683306472.
[60] WO03/009869.
[61] *Vaccine Design* . . . (1995) eds. Powell & Newman. ISBN: 030644867X. Plenum.
[62] Giuliani et al. (2006) *Proc Natl Acad Sci USA.* 103:10834-9.
[63] WO2004/032958.
[64] Costantino et al. (1992) *Vaccine* 10:691-698.
[65] Costantino et al. (1999) *Vaccine* 17:1251-1263.
[66] WO03/007985.
[67] Watson (2000) *Pediatr Infect Dis J* 19:331-332.
[68] Rubin (2000) *Pediatr Clin North Am* 47:269-285, v.
[69] Jedrzejas (2001) *Microbiol Mol Biol Rev* 65:187-207.
[70] Bell (2000) *Pediatr Infect Dis J* 19:1187-1188.
[71] Iwarson (1995) *APMIS* 103:321-326.
[72] Gerlich et al. (1990) *Vaccine* 8 Suppl: S63-68 & 79-80.
[73] *Vaccines* (1988) eds. Plotkin & Mortimer. ISBN 0-7216-1946-0.
[74] Del Guidice et al. (1998) *Molecular Aspects of Medicine* 19:1-70.
[75] Gustafsson et al. (1996) *N. Engl. J Med.* 334:349-355.
[76] Rappuoli et al. (1991) *TIBTECH* 9:232-238.
[77] Sutter et al. (2000) *Pediatr Clin North Am* 47:287-308.
[78] Zimmerman & Spann (1999) *Am Fam Physician* 59:113-118, 125-126.
[79] McMichael (2000) *Vaccine* 19 Suppl 1:S101-107.
[80] Schuchat (1999) *Lancet* 353(9146):51-6.
[81] WO02/34771.
[82] Dale (1999) *Infect Dis Clin North Am* 13:227-43, viii.
[83] Ferretti et al. (2001) *PNAS USA* 98: 4658-4663.
[84] Kuroda et al. (2001) *Lancet* 357(9264):1225-1240; see also pages 1218-1219.
[85] Jones (2001) *Curr Opin Investig Drugs* 2:47-49.
[86] Ravenscroft et al. (1999) *Vaccine* 17:2802-2816.
[87] *Research Disclosure*, 453077 (January 2002).
[88] EP-A-0372501.
[89] EP-A-0378881.
[90] EP-A-0427347.
[91] WO93/17712.
[92] WO94/03208.
[93] WO98/58668.
[94] EP-A-0471177.
[95] WO91/01146.
[96] Falugi et al. (2001) *Eur J Immunol* 31:3816-3824.
[97] Baraldo et al. (2004) *Infect Immun* 72(8):4884-7.
[98] EP-A-0594610.
[99] Ruan et al. (1990) *J Immunol* 145:3379-3384.
[100] WO00/56360.
[101] Kuo et al. (1995) *Infect Immun* 63:2706-13.
[102] Michon et al. (1998) *Vaccine.* 16:1732-41.
[103] WO02/091998.
[104] WO01/72337.
[105] WO00/61761.
[106] WO00/33882
[107] Lees et al. (1996) *Vaccine* 14:190-198.
[108] WO95/08348.
[109] U.S. Pat. No. 4,882,317
[110] U.S. Pat. No. 4,695,624
[111] Porro et al. (1985) *Mol Immunol* 22:907-919.s
[112] EP-A-0208375
[113] WO00/10599
[114] Geyer et al. *Med. Microbiol. Immunol*, 165: 171-288 (1979).
[115] U.S. Pat. No. 4,057,685.
[116] U.S. Pat. Nos. 4,673,574; 4,761,283; 4,808,700.
[117] U.S. Pat. No. 4,459,286.
[118] U.S. Pat. No. 4,965,338
[119] U.S. Pat. No. 4,663,160.
[120] U.S. Pat. No. 4,761,283
[121] U.S. Pat. No. 4,356,170
[122] Needleman & Wunsch (1970) *J. Mol. Biol.* 48, 443-453.
[123] Rice et al. (2000) *Trends Genet* 16:276-277.

SEQUENCE LISTING

```
>SEQ ID NO: 1 [MC58, v1]
MNRTAFCCLSLTTALILTACSSGGGGVAADIGAGLADALTAPLDHKDKGLQSLTLDQSVRKNEKL
KLAAQGAEKTYGNGDSLNTGKLKNDKVSRFDFIRQIEVDGQLITLESGEFQVYKQSHSALTAFQT
EQIQDSEHSGKMVAKRQFRIGDIAGEHTSFDKLPEGGRATYRGTAFGSDDAGGKLTYTIDFAAKQ
GNGKIEHLKSPELNVDLAAADIKPDGKRHAVISGSVLYNQAEKGSYSLGIFGGKAQEVAGSAEVK
TVNGIRHIGLAAKQ
```

SEQUENCE LISTING

```
>SEQ ID NO: 2 [2996, v2]
MNRTAFCCLSLTAALILTACSSGGGGVAADIGAGLADALTAPLDHKDKSLQSLTLDQSVRKNEKL
KLAAQGAEKTYGNGDSLNTGKLKNDKVSRFDFIRQIEVDGQLITLESGEFQIYKQDHSAVVALQI
EKINNPDKIDSLINQRSFLVSGLGGEHTAFNQLPDGKAEYHGKAFSSDDAGGKLTYTIDFAAKQG
HGKIEHLKTPEQNVELAAAELKADEKSHAVILGDTRYGSEEKGTYHLALFGDRAQEIAGSATVKI
GEKVHEIGIAGKQ

>SEQ ID NO: 3 [M1239, v3]
MNRTAFCCLSLTTALILTACSSGGGGSGGGGVAADIGTGLADALTAPLDHKDKGLKSLTLEDSIP
QNGTLTLSAQGAEKTFKAGDKDNSLNTGKLKNDKISRFDFVQKIEVDGQTITLASGEFQIYKQNH
SAVVALQIEKINNPDKTDSLINQRSFLVSGLGGEHTAFNQLPGGKAEYHGKAFSSDDPNGRLHYS
IDFTKKQGYGRIEHLKTLEQNVELAAAELKADEKSHAVILGDTRYGSEEKGTYHLALFGDRAQEI
AGSATVKIGEKVHEIGIAGKQ

>SEQ ID NO: 4 [MC58, v1, mature]
CSSGGGGVAADIGAGLADALTAPLDHKDKGLQSLTLDQSVRKNEKLKLAAQGAEKTYGNGDSLNT
GKLKNDKVSRFDFIRQIEVDGQLITLESGEFQVYKQSHSALTAFQTEQIQDSEHSGKMVAKRQER
IGDIAGEHTSFDKLPEGGRATYRGTAFGSDDAGGKLTYTIDFAAKQGNGKIEHLKSPELNVDLAA
ADIKPDGKRHAVISGSVLYNQAEKGSYSLGIFGGKAQEVAGSAEVKTVNGIRHIGLAAKQ >SEQ ID NO: 5 [2996 mature]
CSSGGGGVAADIGAGLADALTAPLDHKDKSLQSLTLDQSVRKNEKLKLAAQGAEKTYGNGDSLNT
GKLKNDKVSRFDFIRQIEVDGQLITLESGEFQIYKQDHSAVVALQIEKINNPDKIDSLINQRSFL
VSGLGGEHTAFNQLPDGKAEYHGKAFSSDDAGGKLTYTIDFAAKQGHGKIEHLKTPEQNVELAAA
ELKADEKSHAVILGDTRYGSEEKGTYHLALFGDRAQEIAGSATVKIGEKVHEIGIAGKQ >SEQ ID NO: 6 [M1239, mature]
CSSGGGGSGGGGVAADIGTGLADALTAPLDHKDKGLKSLTLEDSIPQNGTLTLSAQGAEKTEKAG
DKDNSLNTGKLKNDKISRFDFVQKIEVDGQTITLASGEFQIYKQNHSAVVALQIEKINNPDKTDS
LINQRSFLVSGLGGEHTAFNQLPGGKAEYHGKAFSSDDPNGRLHYSIDFTKKQGYGRIEHLKTLE
QNVELAAAELKADEKSHAVILGDTRYGSEEKGTYHLALFGDRAQEIAGSATVKIGEKVHEIGIAG
KQ >SEQ ID NO: 7 [MC58, ΔG]
VAADIGAGLADALTAPLDHKDKGLQSLTLDQSVRKNEKLKLAAQGAEKTYGNGDSLNTGKLKNDK
VSRFDFIRQIEVDGQLITLESGEFQVYKQSHSALTAFQTEQIQDSEHSGKMVAKRQFRIGDIAGE
HTSFDKLPEGGRATYRGTAFGSDDAGGKLTYTIDFAAKQGNGKIEHLKSPELNVDLAAADIKPDG
KRHAVISGSVLYNQAEKGSYSLGIFGGKAQEVAGSAEVKTVNGIRHIGLAAKQ >SEQ ID NO: 8 [2996 ΔG]
VAADIGAGLADALTAPLDHKDKSLQSLTLDQSVRKNEKLKLAAQGAEKTYGNGDSLNTGKLKNDK
VSRFDFIRQIEVDGQLITLESGEFQIYKQDHSAVVALQIEKINNPDKIDSLINQRSFLVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHEIGIAGKQ >SEQ ID NO: 9 [M1239, ΔG]
VAADIGTGLADALTAPLDHKDKGLKSLTLEDSIPQNGTLTLSAQGAEKTFKAGDKDNSLNTGKLK
NDKISRFDFVQKIEVDGQTITLASGEFQIYKQNHSAVVALQIEKINNPDKTDSLINQRSFLVSGL
GGEHTAFNQLPGGKAEYHGKAFSSDDPNGRLHYSIDFTKKQGYGRIEHLKTLEQNVELAAAELKA
DEKSHAVILGDTRYGSEEKGTYHLALFGDRAQEIAGSATVKIGEKVHEIGIAGKQ >SEQ ID NO: 10 [fHbp fusion polypeptide]
MGPDSDRLQQRRVAADIGAGLADALTAPLDHKDKSLQSLTLDQSVRKNEKLKLAAQGAEKTYGNG
DSLNTGKLKNDKVSRFDFIRQIEVDGQLITLESGEFQIYKQDHSAVVALQIEKINNPDKIDSLIN
QRSFLVSGLGGEHTAFNQLPDGKAEYHGKAFSSDDAGGKLTYTIDFAAKQGHGKIEHLKTPEQNV
ELAAAELKADEKSHAVILGDTRYGSEEKGTYHLALFGDRAQEIAGSATVKIGEKVHEIGIAGKQG
SGPDSDRLQQRRVAADIGTGLADALTAPLDHKDKGLKSLTLEDSIPQNGTLTLSAQGAEKTFKAG
DKDNSLNTGKLKNDKISRFDFVQKIEVDGQTITLASGEFQIYKQNHSAVVALQIEKINNPDKTDS
LINQRSFLVSGLGGEHTAFNQLPGGKAEYHGKAFSSDDPNGRLHYSIDFTKKQGYGRIEHLKTLE
QNVELAAAELKADEKSHAVILGDTRYGSEEKGTYHLALFGDRAQEIAGSATVKIGEKVHEIGIAG
KQGSGGGGVAADIGAGLADALTAPLDHKDKGLQSLTLDQSVRKNEKLKLAAQGAEKTYGNGDSLN
TGKLKNDKVSRFDFIRQIEVDGQLITLESGEFQVYKQSHSALTAFQTEQIQDSEHSGKMVAKRQF
RIGDIAGEHTSFDKLPEGGRATYRGTAFGSDDAGGKLTYTIDFAAKQGNGKIEHLKSPELNVDLA
AADIKPDGKRHAVISGSVLYNQAEKGSYSLGIFGGKAQEVAGSAEVKTVNGIRHIGLAAKQ >SEQ ID NO: 11 [NHBA, MC58]
MFKRSVIAMACIFALSACGGGGGGSPDVKSADTLSKPAAPVVSEKETEAKEDAPQAGSQGQGAPS
AQGSQDMAAVSEENTGNGGAVTADNPKNEDEVAQNDMPQNAAGTDSSTPNHTPDPNMLAGNMENQ
ATDAGESSQPANQPDMANAADGMQGDDPSAGGQNAGNTAAQGANQAGNNQAAGSSDPIPASNPAP
ANGGSNFGRVDLANGVLIDGPSQNITLTHCKGDSCSGNNFLDEEVQLKSEFEKLSDADKISNYKK
DGKNDKFVGLVADSVQMKGINQYIIFYKPKPTSFARFRRSARSRRSLPAEMPLIPVNQADTLIVD
GEAVSLTGHSGNIFAPEGNYRYLTYGAEKLPGGSYALRVQGEPAKGEMLAGAAVYNGEVLHPHTE
NGRPYPTRGRFAAKVDFGSKSVDGIIDSGDDLHMGTQKFKAAIDGNGFKGTWTENGSGDVSGKFY
GPAGEEVAGKYSYRPTDAEKGGFGVFAGKKEQD
```

SEQUENCE LISTING

```
>SEQ ID NO: 12 [NHBA fragment]
SPDVKSADTLSKPAAPVVSEKETEAKEDAPQAGSQGQGAPSAQGSQDMAAVSEENTGNGGAVTAD
NPKNEDEVAQNDMPQNAAGTDSSTPNHTPDPNMLAGNMENQATDAGESSQPANQPDMANAADGMQ
GDDPSAGGQNAGNTAAQGANQAGNNQAAGSSDPIPASNPAPANGGSNFGRVDLANGVLIDGPSQN
ITLTHCKGDSCSGNNFLDEEVQLKSEFEKLSDADKISNYKKDGKNDKFVGLVADSVQMKGINQYI
IFYKPKPTSFARFRRSARSRRSLPAEMPLIPVNQADTLIVDGEAVSLTGHSGNIFAPEGNYRYLT
YGAEKLPGGSYALRVQGEPAKGEMLAGAAVYNGEVLHFHTENGRPYPTRGRFAAKVDFGSKSVDG
IIDSGDDLHMGTQKFKAAIDGNGFKGTWTENGSGDVSGKFYGPAGEEVAGKYSYRPTDAEKGGFG
VFAGKKEQD >SEQ ID NO: 13 [NHBA mature]
CGGGGGGSPDVKSADTLSKPAAPVVSEKETEAKEDAPQAGSQGQGAPSAQGSQDMAAVSEENTGN
GGAVTADNPKNEDEVAQNDMPQNAAGTDSSTPNHTPDPNMLAGNMENQATDAGESSQPANQPDMA
NAADGMQGDDPSAGGQNAGNTAAQGANQAGNNQAAGSSDPIPASNPAPANGGSNFGRVDLANGVL
IDGPSQNITLTHCKGDSCSGNNFLDEEVQLKSEFEKLSDADKISNYKKDGKNDKFVGLVADSVQM
KGINQYIIFYKPKPTSFARFRRSARSRRSLPAEMPLIPVNQADTLIVDGEAVSLTGHSGNIFAPE
GNYRYLTYGAEKLPGGSYALRVQGEPAKGEMLAGAAVYNGEVLHFHTENGRPYPTRGRFAAKVDE
GSKSVDGIIDSGDDLHMGTQKFKAAIDGNGFKGTWTENGSGDVSGKFYGPAGEEVAGKYSYRPTD
AEKGGFGVFAGKKEQD >SEQ ID NO: 14 [NMB1030, MC58]
MKKIIFAALAAAAISTASAATYKVDEYHANARFAIDHENTSTNVGGFYGLTGSVEFDQAKRDGKI
DITIPIANLQSGSQHFTDHLKSADIFDAAQYPDIRFVSTKFNFNGKKLVSVDGNLTMHGKTAPVK
LKAEKFNCYQSPMEKTEVCGGDFSTTIDRTKWGMDYLVNVGMTKSVRIDIQIEAAKQ >SEQ ID NO: 15 [NMB1030 fragment]
ATYKVDEYHANARFAIDHFNTSTNVGGFYGLTGSVEFDQAKRDGKIDITIPIANLQSGSQHFTDH
LKSADIFDAAQYPDIRFVSTKFNFNGKKLVSVDGNLTMHGKTAPVKLKAEKENCYQSPMEKTEVC
GGDFSTTIDRTKWGMDYLVNVGMTKSVRIDIQIEAAKQ >SEQ ID NO: 16 [NHBA fusion]
MASPDVKSADTLSKPAAPVVSEKETEAKEDAPQAGSQGQGAPSAQGGQDMAAVSEENTGNGGAAA
TDKPKNEDEGAQNDMPQNAADTDSLTPNHTPASNMPAGNMENQAPDAGESEQPANQPDMANTADG
MQGDDPSAGGENAGNTAAQGTNQAENNQTAGSQNPASSTNPSATNSGGDFGRTNVGNSVVIDGPS
QNITLTHCKGDSCSGNNFLDEEVQLKSEFEKLSDADKISNYKKDGKNDKFVGLVADSVQMK
GINQYIIFYKPKPTSFARFRRSARSRRSLPAEMPLIPVNQADTLIVDGEAVSLTGHSGNIFAPEG
NYRYLTYGAEKLPGGSYALRVQGEPSKGEMLAGTAVYNGEVLHFHTENGRPSPSRGRFAAKVDFG
SKSVDGIIDSGDGLHMGTQKFKAAIDGNGFKGTWTENGGGDVSGKFYGPAGEEVAGKYSYRPTDA
EKGGFGVFAGKKEQDGSGGGGATYKVDEYHANARFAIDHFNTSTNVGGFYGLTGSVEFDQAKRDG
KIDITIPVANLQSGSQHFTDHLKSADIFDAAQYPDIRFVSTKFNFNGKKLVSVDGNLTMHGKTAP
VKLKAEKFNCYQSPMAKTEVCGGDFSTTIDRTKWGVDYLVNVGMTKSVRIDIQIEAAKQ >SEQ ID NO: 17 [NadA, MC58]
MSMKHFPSKVLTTAILATFCSGALAATSDDDVKKAATVAIVAAYNNGQEINGFKAGETIYDIGED
GTITQKDATAADVEADDFKGLGLKKVVTNLTKTVNENKQNVDAKVKAAESEIEKLTTKLADTDAA
LADTDAALDETTNALNKLGENITTFAEETKTNIVKIDEKLEAVADTVDKHAEAFNDIADSLDETN
TKADEAVKTANEAKQTAEETKQNVDAKVKAAETAAGKAEAAAGTANTAADKAEAVAAKVTDIKAD
IATNKADIAKNSARIDSLDKNVANLRKETRQGLAEQAALSGLFQPYNVGRFNVTAAVGGYKSESA
VAIGTGFRFTENFAAKAGVAVGTSSGSSAAYHVGVNYEW >SEQ ID NO: 18 [NadA]
LAATSDDDVKKAATVAIVAAYNNGQEINGFKAGETIYDIGEDGTITQKDATAADVEADDEKGLGL
KKVVTNLTKTVNENKQNVDAKVKAAESEIEKLTTKLADTDAALADTDAALDETTNALNKLGENIT
TFAEETKTNIVKIDEKLEAVADTVDKHAEAFNDIADSLDETNTKADEAVKTANEAKQTAEETKQN
VDAKVKAAETAAGKAEAAAGTANTAADKAEAVAAKVTDIKADIATNKADIAKNSARIDSLDKNVA
NLRKETRQGLAEQAALSGLFQPYNVGRENVTAAVGGYKSESAVAIGTGFRFTENFAAKAGVAVGT
SSGSSAAYHVGVNYEW >SEQ ID NO: 19 [NadA fragment]
ATNDDDVKKAATVAIAAAYNNGQEINGFKAGETIYDIDEDGTITKKDATAADVEADDFKGLGLKK
VVTNLTKTVNENKQNVDAKVKAAESEIEKLTTKLADTDAALADTDAALDATTNALNKLGENITTF
AEETKTNIVKIDEKLEAVADTVDKHAEAFNDIADSLDETNTKADEAVKTANEAKQTAEETKQNVD
AKVKAAETAAGKAEAAAGTANTAADKAEAVAAKVTDIKADIATNKDNIAKKANSADVYTREESDS
KFVRIDGLNATTEKLDTRLASAEKSIADHDTRLNGLDKTVSDLRKETRQGLAEQAALSGLFQPYN
VG >SEQ ID NO: 20 [NMB2091, MC58]
MKPKPHTVRTLIAAIFSLALSGCVSAVIGSAAVGAKSAVDRRTTGAQTDDNVMALRIETTARSYL
RQNNQTKGYTPQISVVGYNRHLLLLGQVATEGEKQFVGQIARSEQAAEGVYNYITVASLPRTAGD
IAGDTWNTSKVRATLLGISPATQARVKIVTYGNVTYVMGILTPEEQAQITQKVSTTVGVQKVITL
YQNYVQR >SEQ ID NO: 21 [NMB2091]
SAVIGSAAVGAKSAVDRRTTGAQTDDNVMALRIETTARSYLRQNNQTKGYTPQISVVGYDRHLLL
LGQVATEGEKQFVGQIARSEQAAEGVYNYITVASLPRTAGDIAGDTWNTSKVRATLLGISPATRA
RVKIVTYGNVTYVMGILTPEEQAQITQKVSTTVGVQKVITLYQNYVQR
```

-continued

SEQUENCE LISTING

>SEQ ID NO: 22 [linker]
GSGGGG

>SEQ ID NO: 23 [linker]
GPDSDRLQQRR

>SEQ ID NO: 24 [linker]
GSGPDSDRLQQRR

>SEQ ID NO: 25 [linker]
GKGPDSDRLQQRR

>SEQ ID NO: 26 [N-terminal sequence]
MGPDSDRLQQRR

>SEQ ID NO: 27 [N-terminal sequence]
MAS

>SEQ ID NO: 28 [linker]
LEHHHHHH

>SEQ ID NO: 29 [fHbp fusion polypeptide]
MGPDSDRLQQRRVAADIGAGLADALTAPLDHKDKSLQSLTLDQSVRKNEKLKLAAQGAEKTYGNG
DSLNTGKLKNDKVSRFDFIRQIEVDGQLITLESGEFQIYKQDHSAVVALQIEKINNPDKIDSLIN
QRSFLVSGLGGEHTAFNQLPDGKAEYHGKAFSSDDAGGKLTYTIDFAAKQGHGKIEHLKTPEQNV
ELAAAELKADEKSHAVILGDTRYGSEEKGTYHLALFGDRAQEIAGSATVKIGEKVHEIGIAGKQG
SGGGGVAADIGTGLADALTAPLDHKDKGLKSLTLEDSIPQNGTLTLSAQGAEKTFKAGDKDNSLN
TGKLKNDKISRFDFVQKIEVDGQTITLASGEFQIYKQNHSAVVALQIEKINNPDKTDSLINQRSF
LVSGLGGEHTAFNQLPGGKAEYHGKAFSSDDPNGRLHYSIDFTKKQGYGRIEHLKTLEQNVELAA
AELKADEKSHAVILGDTRYGSEEKGTYHLALFGDRAQEIAGSATVKIGEKVHEIGIAGKQGSGGG
GVAADIGAGLADALTAPLDHKDKGLQSLTLDQSVRKNEKLKLAAQGAEKTYGNGDSLNTGKLKND
KVSRFDFIRQIEVDGQLITLESGEFQVYKQSHSALTAFQTEQIQDSEHSGKMVAKRQFRIGDIAG
EHTSFDKLPEGGRATYRGTAFGSDDAGGKLTYTIDFAAKQGNGKIEHLKSPELNVDLAAADIKPD
GKRHAVISGSVLYNQAEKGSYSLGIFGGKAQEVAGSAEVKTVNGIRHIGLAAKQ >SEQ ID NO: 30 [fHbp fusion polypeptide]
VAADIGAGLADALTAPLDHKDKSLQSLTLDQSVRKNEKLKLAAQGAEKTYGNGDSLNTGKLKNDK
VSRFDFIRQIEVDGQLITLESGEFQIYKQDHSAVVALQIEKINNPDKIDSLINQRSFLVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHEIGIAGKQGSGGGGVAADIGT
GLADALTAPLDHKDKGLKSLTLEDSIPQNGTLTLSAQGAEKTFKAGDKDNSLNTGKLKNDKISRF
DFVQKIEVDGQTITLASGEFQIYKQNHSAVVALQIEKINNPDKTDSLINQRSFLVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHEIGIAGKQGSGGGGVAADIGAGLAD
ALTAPLDHKDKGLQSLTLDQSVRKNEKLKLAAQGAEKTYGNGDSLNTGKLKNDKVSREDFIRQIE
VDGQLITLESGEFQVYKQSHSALTAFQTEQIQDSEHSGKMVAKRQFRIGDIAGEHTSFDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ >SEQ ID NO: 31 [fHbp fusion polypeptide, fH binding disrupted]
Where X at residue 240 is any amino acid other than E, X at residue 496 is any amino acid other than E, and X at residue 543 is any amino acid other than R.
VAADIGAGLADALTAPLDHKDKSLQSLTLDQSVRKNEKLKLAAQGAEKTYGNGDSLNTGKLKNDK
VSRFDFIRQIEVDGQLITLESGEFQIYKQDHSAVVALQIEKINNPDKIDSLINQRSFLVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHXIGIAGKQGSGGGGVAADIGT
GLADALTAPLDHKDKGLKSLTLEDSIPQNGTLTLSAQGAEKTFKAGDKDNSLNTGKLKNDKISRF
DFVQKIEVDGQTITLASGEFQIYKQNHSAVVALQIEKINNPDKTDSLINQRSFLVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHXIGIAGKQGSGGGGVAADIGAGLAD
ALTAPLDHKDKGLQSLTLDQSVXKNEKLKLAAQGAEKTYGNGDSLNTGKLKNDKVSRFDFIRQIE
VDGQLITLESGEFQVYKQSHSALTAFQTEQIQDSEHSGKMVAKRQFRIGDIAGEHTSEDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ >SEQ ID NO: 32 [fHbp fusion polypeptide, fH binding disrupted]
VAADIGAGLADALTAPLDHKDKSLQSLTLDQSVRKNEKLKLAAQGAEKTYGNGDSLNTGKLKNDK
VSRFDFIRQIEVDGQLITLESGEFQIYKQDHSAVVALQIEKINNPDKIDSLINQRSFLVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHAIGIAGKQGSGGGGVAADIGT
GLADALTAPLDHKDKGLKSLTLEDSIPQNGTLTLSAQGAEKTFKAGDKDNSLNTGKLKNDKISRF
DFVQKIEVDGQTITLASGEFQIYKQNHSAVVALQIEKINNPDKTDSLINQRSFLVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHAIGIAGKQGSGGGGVAADIGAGLAD
ALTAPLDHKDKGLQSLTLDQSVSKNEKLKLAAQGAEKTYGNGDSLNTGKLKNDKVSREDFIRQIE -continued

SEQUENCE LISTING

VDGQLITLESGEFQVYKQSHSALTAFQTEQIQDSEHSGKMVAKRQFRIGDIAGEHTSFDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ

>SEQ ID NO: 33 [fHbp fusion polypeptide, stabilised]
Where X at residue 32 is any amino acid other than S, X at residue 123 is any amino acid other than L, X at residue 285 is any amino acid other than S, and X at residue 379 is any amino acid other than L.
VAADIGAGLADALTAPLDHKDKSLQSLTLDQXVRKNEKLKLAAQGAEKTYGNGDSLNTGKLKNDK
VSRFDFIRQIEVDGQLITLESGEFQIYKQDHSAVVALQIEKINNPDKIDSLINQRSFXVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHEIGIAGKQGSGGGGVAADIGT
GLADALTAPLDHKDKGLKSLTLEDXIPQNGTLTLSAQGAEKTFKAGDKDNSLNTGKLKNDKISRF
DFVQKIEVDGQTITLASGEFQIYKQNHSAVVALQIEKINNPDKTDSLINQRSFXVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHEIGIAGKQGSGGGGVAADIGAGLAD
ALTAPLDHKDKGLQSLTLDQSVRKNEKLKLAAQGAEKTYGNGDSLNTGKLKNDKVSREDFIRQIE
VDGQLITLESGEFQVYKQSHSALTAFQTEQIQDSEHSGKMVAKRQFRIGDIAGEHTSFDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ >SEQ ID NO: 34 [fHbp fusion polypeptide, stabilised]
VAADIGAGLADALTAPLDHKDKSLQSLTLDQVVRKNEKLKLAAQGAEKTYGNGDSLNTGKLKNDK
VSRFDFIRQIEVDGQLITLESGEFQIYKQDHSAVVALQIEKINNPDKIDSLINQRSFRVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHEIGIAGKQGSGGGGVAADIGT
GLADALTAPLDHKDKGLKSLTLEDVIPQNGTLTLSAQGAEKTFKAGDKDNSLNTGKLKNDKISRF
DFVQKIEVDGQTITLASGEFQIYKQNHSAVVALQIEKINNPDKTDSLINQRSFRVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHEIGIAGKQGSGGGGVAADIGAGLAD
ALTAPLDHKDKGLQSLTLDQSVRKNEKLKLAAQGAEKTYGNGDSLNTGKLKNDKVSREDFIRQIE
VDGQLITLESGEFQVYKQSHSALTAFQTEQIQDSEHSGKMVAKRQFRIGDIAGEHTSFDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ >SEQ ID NO: 35 [fHbp fusion polypeptide, stabilised & R41]
Where X at residue 32 is any amino acid other thanS , X at residue 123 is any amino acid other than L, X at residue 285 is any amino acid other than S, X at residue 379 is any amino acid other than L, and X at residue 543 is any amino acid other than R.
VAADIGAGLADALTAPLDHKDKSLQSLTLDQXVRKNEKLKLAAQGAEKTYGNGDSLNTGKLKNDK
VSRFDFIRQIEVDGQLITLESGEFQIYKQDHSAVVALQIEKINNPDKIDSLINQRSFXVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHEIGIAGKQGSGGGGVAADIGT
GLADALTAPLDHKDKGLKSLTLEDXIPQNGTLTLSAQGAEKTFKAGDKDNSLNTGKLKNDKISRF
DFVQKIEVDGQTITLASGEFQIYKQNHSAVVALQIEKINNPDKTDSLINQRSFXVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHEIGIAGKQGSGGGGVAADIGAGLAD
ALTAPLDHKDKGLQSLTLDQSVXKNEKLKLAAQGAEKTYGNGDSLNTGKLKNDKVSREDFIRQIE
VDGQLITLESGEFQVYKQSHSALTAFQTEQIQDSEHSGKMVAKRQFRIGDIAGEHTSFDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ >SEQ ID NO: 36 [fHbp fusion polypeptide, stabilised & R41S]
VAADIGAGLADALTAPLDHKDKSLQSLTLDQVVRKNEKLKLAAQGAEKTYGNGDSLNTGKLKNDK
VSRFDFIRQIEVDGQLITLESGEFQIYKQDHSAVVALQIEKINNPDKIDSLINQRSFRVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHEIGIAGKQGSGGGGVAADIGT
GLADALTAPLDHKDKGLKSLTLEDVIPQNGTLTLSAQGAEKTFKAGDKDNSLNTGKLKNDKISRF
DFVQKIEVDGQTITLASGEFQIYKQNHSAVVALQIEKINNPDKTDSLINQRSFRVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHEIGIAGKQGSGGGGVAADIGAGLAD
ALTAPLDHKDKGLQSLTLDQSVSKNEKLKLAAQGAEKTYGNGDSLNTGKLKNDKVSREDFIRQIE
VDGQLITLESGEFQVYKQSHSALTAFQTEQIQDSEHSGKMVAKRQFRIGDIAGEHTSFDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ >SEQ ID NO: 37 [fHbp fusion polypeptide, stabilised, fH binding disrupted, & R41]
VAADIGAGLADALTAPLDHKDKSLQSLTLDQVVRKNEKLKLAAQGAEKTYGNGDSLNTGKLKNDK
VSRFDFIRQIEVDGQLITLESGEFQIYKQDHSAVVALQIEKINNPDKIDSLINQRSFRVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHAIGIAGKQGSGGGGVAADIGT
GLADALTAPLDHKDKGLKSLTLEDVIPQNGTLTLSAQGAEKTFKAGDKDNSLNTGKLKNDKISRF
DFVQKIEVDGQTITLASGEFQIYKQNHSAVVALQIEKINNPDKTDSLINQRSFRVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHAIGIAGKQGSGGGGVAADIGAGLAD -continued

SEQUENCE LISTING

ALTAPLDHKDKGLQSLTLDQSVSKNEKLKLAAQGAEKTYGNGDSLNTGKLKNDKVSRFDFIRQIE
VDGQLITLESGEFQVYKQSHSALTAFQTEQIQDSEHSGKMVAKRQFRIGDIAGEHTSFDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ

>SEQ ID NO: 38 [fHbp fusion polypeptide, stabilised, fH binding disrupted, & R41]
MGPDSDRLQQRRVAADIGAGLADALTAPLDHKDKSLQSLTLDQVVRKNEKLKLAAQGAEKTYGNG
DSLNTGKLKNDKVSRFDFIRQIEVDGQLITLESGEFQIYKQDHSAVVALQIEKINNPDKIDSLIN
QRSFRVSGLGGEHTAFNQLPDGKAEYHGKAFSSDDAGGKLTYTIDFAAKQGHGKIEHLKTPEQNV
ELAAAELKADEKSHAVILGDTRYGSEEKGTYHLALFGDRAQEIAGSATVKIGEKVHAIGIAGKQG
SGGGGVAADIGTGLADALTAPLDHKDKGLKSLTLEDVIPQNGTLTLSAQGAEKTFKAGDKDNSLN
TGKLKNDKISRFDFVQKIEVDGQTITLASGEFQIYKQNHSAVVALQIEKINNPDKTDSLINQRSF
RVSGLGGEHTAFNQLPGGKAEYHGKAFSSDDPNGRLHYSIDFTKKQGYGRIEHLKTLEQNVELAA
AELKADEKSHAVILGDTRYGSEEKGTYHLALFGDRAQEIAGSATVKIGEKVHAIGIAGKQGSGGG
GVAADIGAGLADALTAPLDHKDKGLQSLTLDQSVSKNEKLKLAAQGAEKTYGNGDSLNTGKLKND
KVSRFDFIRQIEVDGQLITLESGEFQVYKQSHSALTAFQTEQIQDSEHSGKMVAKRQFRIGDIAG
EHTSFDKLPEGGRATYRGTAFGSDDAGGKLTYTIDFAAKQGNGKIEHLKSPELNVDLAAADIKPD
GKRHAVISGSVLYNQAEKGSYSLGIFGGKAQEVAGSAEVKTVNGIRHIGLAAKQ >SEQ ID NO: 39 [fHbp fusion polypeptide, stabilised]
Where X at residue 123 is any amino acid other than L and X at residue 379 is any amino acid other than L.
VAADIGAGLADALTAPLDHKDKSLQSLTLDQSVRKNEKLKLAAQGAEKTYGNGDSLNTGKLKNDK
VSRFDFIRQIEVDGQLITLESGEFQIYKQDHSAVVALQIEKINNPDKIDSLINQRSFXVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHEIGIAGKQGSGGGGVAADIGT
GLADALTAPLDHKDKGLKSLTLEDSIPQNGTLTLSAQGAEKTFKAGDKDNSLNTGKLKNDKISRF
DFVQKIEVDGQTITLASGEFQIYKQNHSAVVALQIEKINNPDKTDSLINQRSFXVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHEIGIAGKQGSGGGGVAADIGAGLAD
ALTAPLDHKDKGLQSLTLDQSVRKNEKLKLAAQGAEKTYGNGDSLNTGKLKNDKVSREDFIRQIE
VDGQLITLESGEFQVYKQSHSALTAFQTEQIQDSEHSGKMVAKRQFRIGDIAGEHTSFDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ >SEQ ID NO: 40 [fHbp fusion polypeptide, stabilised]
VAADIGAGLADALTAPLDHKDKSLQSLTLDQSVRKNEKLKLAAQGAEKTYGNGDSLNTGKLKNDK
VSRFDFIRQIEVDGQLITLESGEFQIYKQDHSAVVALQIEKINNPDKIDSLINQRSFRVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHEIGIAGKQGSGGGGVAADIGT
GLADALTAPLDHKDKGLKSLTLEDSIPQNGTLTLSAQGAEKTFKAGDKDNSLNTGKLKNDKISRF
DFVQKIEVDGQTITLASGEFQIYKQNHSAVVALQIEKINNPDKTDSLINQRSFRVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHEIGIAGKQGSGGGGVAADIGAGLAD
ALTAPLDHKDKGLQSLTLDQSVRKNEKLKLAAQGAEKTYGNGDSLNTGKLKNDKVSRFDFIRQIE
VDGQLITLESGEFQVYKQSHSALTAFQTEQIQDSEHSGKMVAKRQFRIGDIAGEHTSFDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ >SEQ ID NO: 41 [fHIbp fusion polypeptide, stabilised, R41S]
VAADIGAGLADALTAPLDHKDKSLQSLTLDQSVRKNEKLKLAAQGAEKTYGNGDSLNTGKLKNDK
VSRFDFIRQIEVDGQLITLESGEFQIYKQDHSAVVALQIEKINNPDKIDSLINQRSFRVSGLGGE
HTAFNQLPDGKAEYHGKAFSSDDAGGKLTYTIDFAAKQGHGKIEHLKTPEQNVELAAAELKADEK
SHAVILGDTRYGSEEKGTYHLALFGDRAQEIAGSATVKIGEKVHEIGIAGKQGSGGGGVAADIGT
GLADALTAPLDHKDKGLKSLTLEDSIPQNGTLTLSAQGAEKTFKAGDKDNSLNTGKLKNDKISRF
DFVQKIEVDGQTITLASGEFQIYKQNHSAVVALQIEKINNPDKTDSLINQRSFRVSGLGGEHTAF
NQLPGGKAEYHGKAFSSDDPNGRLHYSIDFTKKQGYGRIEHLKTLEQNVELAAAELKADEKSHAV
ILGDTRYGSEEKGTYHLALFGDRAQEIAGSATVKIGEKVHEIGIAGKQGSGGGGVAADIGAGLAD
ALTAPLDHKDKGLQSLTLDQSVSKNEKLKLAAQGAEKTYGNGDSLNTGKLKNDKVSREDFIRQIE
VDGQLITLESGEFQVYKQSHSALTAFQTEQIQDSEHSGKMVAKRQFRIGDIAGEHTSFDKLPEGG
RATYRGTAFGSDDAGGKLTYTIDFAAKQGNGKIEHLKSPELNVDLAAADIKPDGKRHAVISGSVL
YNQAEKGSYSLGIFGGKAQEVAGSAEVKTVNGIRHIGLAAKQ

The invention claimed is:

1. A method of eliciting a protective antibody response against *Neisseria meningitidis* in a mammal comprising administering to the mammal an immunogenic composition comprising a fusion polypeptide, wherein the fusion polypeptide comprises all three of v1, v2 and v3 meningococcal factor H binging proteins (fHbp) in combination with
   (i) a purified, immunogenic meningococcal NHBA polypeptide,
   (ii) a purified, immunogenic meningococcal NadA polypeptide and
   (iii) meningococcal outer membrane vesicles (OMVs) prepared from the meningococcal strain NZ98/254,
   wherein the fHbp fusion polypeptide has an amino acid sequence of formula $NH_2$-A-$[-X-L]_3$-B—COOH, wherein L is an optional linker amino acid sequence, A is an optional N terminal amino acid sequence, and B is an optional C terminal amino acid sequence and wherein X1, X2 and X3 are the three of the meningococcal fHbp sequences in the order v2-v3-v1 from the N- to C-terminus,
   wherein the v1 fHbp sequence comprises a sequence with at least 90% sequence identity to SEQ ID NO: 7,
   wherein the v2 fHbp sequence comprises a sequence with at least 90% sequence identity to SEQ ID NO: 8 and is modified to introduce a stabilizing substitution at position S32 that is an amino acid that is not serine, and a stabilizing substitution at position L123 that is an amino acid that is not leucine, and
   wherein the v3 fHbp sequence comprises a sequence with at least 90% sequence identity to SEQ ID NO: 9 and is modified to introduce a stabilizing substitution at S32 position that is an amino acid that is not serine, and a stabilizing substitution at L126 that is an amino acid that is not leucine.

2. The method of claim 1, wherein the stabilizing substitution at position S32 of the v2 fHbp sequence is S32V and the stabilizing substitution at position L123 of the v2fHbp sequence is L123R.

3. The method of claim 1, wherein the stabilizing substitution at position S32 of the v3 fHbp sequence is S32V and the stabilizing substitution at position L126 of the v3 fHbp sequence is L126R.

4. The method of claim 1, wherein the meningococcal NHBA polypeptide comprises an amino acid sequence having 90% or more sequence identity to SEQ ID NO: 12 and/or the meningococcal NadA polypeptide comprises an amino acid sequence having 90% or more sequence identity to SEQ ID NO: 17.

5. The method according to claim 1, wherein said mammal is a human.

6. The method according to claim 1, wherein the immunogenic composition comprises the meningococcal OMVs at a concentration between 5 μg/ml and 30 μg/ml.

7. The method according to claim 6, wherein the OMVs are present at a concentration between 10 μg/ml and 15 μg/ml.

8. The method according to claim 1, wherein the fHbp, the NHBA and the NadA polypeptides are present at a concentration between 50 μg/ml and 150 μg/ml.

9. The method according to claim 1, wherein the immunogenic composition further comprises an aluminum hydroxide adjuvant.

* * * * *

SEQUENCE LISTING

Sequence total quantity: 44
SEQ ID NO: 1 moltype = AA length = 274
FEATURE Location/Qualifiers
source 1..274
mol_type = protein
organism = Neisseria meningitidis
SEQUENCE: 1

```
                                          -continued

MNRTAFCCLS LTTALILTAC SSGGGGVAAD IGAGLADALT APLDHKDKGL QSLTLDQSVR    60
KNEKLKLAAQ GAEKTYGNGD SLNTGKLKND KVSRFDFIRQ IEVDGQLITL ESGEFQVYKQ   120
SHSALTAFQT EQIQDSEHSG KMVAKRQFRI GDIAGEHTSF DKLPEGGRAT YRGTAFGSDD   180
AGGKLTYTID FAAKQGNGKI EHLKSPELNV DLAAADIKPD GKRHAVISGS VLYNQAEKGS   240
YSLGIFGGKA QEVAGSAEVK TVNGIRHIGL AAKQ                              274

SEQ ID NO: 2            moltype = AA  length = 273
FEATURE                 Location/Qualifiers
source                  1..273
                        mol_type = protein
                        organism = Neisseria meningitidis
SEQUENCE: 2
MNRTAFCCLS LTAALILTAC SSGGGGVAAD IGAGLADALT APLDHKDKSL QSLTLDQSVR    60
KNEKLKLAAQ GAEKTYGNGD SLNTGKLKND KVSRFDFIRQ IEVDGQLITL ESGEFQIYKQ   120
DHSAVVALQI EKINNPDKID SLINQRSFLV SGLGGEHTAF NQLPDGKAEY HGKAFSSDDA   180
GGKLTYTIDF AAKQGHGKIE HLKTPEQNVE LAAAELKADE KSHAVILGDT RYGSEEKGTY   240
HLALFGDRAQ EIAGSATVKI GEKVHEIGIA GKQ                               273

SEQ ID NO: 3            moltype = AA  length = 281
FEATURE                 Location/Qualifiers
source                  1..281
                        mol_type = protein
                        organism = Neisseria meningitidis
SEQUENCE: 3
MNRTAFCCLS LTTALILTAC SSGGGGSGGG GVAADIGTGL ADALTAPLDH KDKGLKSLTL    60
EDSIPQNGTL TLSAQGAEKT FKAGDKDNSL NTGKLKNDKV SRFDFVQKIE VDGQTITLAS   120
GEFQIYKQNH SAVVALQIEK INNPDKTDSL INQRSFLVSG LGGEHTAFNQ LPGGKAEYHG   180
KAFSSDDPNG RLHYSIDFTK KQGYGRIEHL KTLEQNVELA AAELKADEKS HAVILGDTRY   240
GSEEKGTYHL ALFGDRAQEI AGSATVKIGE KVHEIGIAGK Q                      281

SEQ ID NO: 4            moltype = AA  length = 255
FEATURE                 Location/Qualifiers
source                  1..255
                        mol_type = protein
                        organism = Neisseria meningitidis
SEQUENCE: 4
CSSGGGVAA DIGAGLADAL TAPLDHKDKG LQSLTLDQSV RKNEKLKLAA QGAEKTYGNG    60
DSLNTGKLKN DKVSRFDFIR QIEVDGQLIT LESGEFQVYK QSHSALTAFQ TEQIQDSEHS   120
GKMVAKRQFR IGDIAGEHTS FDKLPEGGRA TYRGTAFGSD DAGGKLTYTI DFAAKQGNGK   180
IEHLKSPELN VDLAAADIKP DGKRHAVISG SVLYNQAEKG SYSLGIFGGK AQEVAGSAEV   240
KTVNGIRHIG LAAKQ                                                   255

SEQ ID NO: 5            moltype = AA  length = 254
FEATURE                 Location/Qualifiers
source                  1..254
                        mol_type = protein
                        organism = Neisseria meningitidis
SEQUENCE: 5
CSSGGGVAA DIGAGLADAL TAPLDHKDKS LQSLTLDQSV RKNEKLKLAA QGAEKTYGNG    60
DSLNTGKLKN DKVSRFDFIR QIEVDGQLIT LESGEFQIYK QDHSAVVALQ IEKINNPDKI   120
DSLINQRSFL VSGLGGEHTA FNQLPDGKAE YHGKAFSSDD AGGKLTYTID FAAKQGHGKI   180
EHLKTPEQNV ELAAAELKAD EKSHAVILGD TRYGSEEKGT YHLALFGDRA QEIAGSATVK   240
IGEKVHEIGI AGKQ                                                    254

SEQ ID NO: 6            moltype = AA  length = 262
FEATURE                 Location/Qualifiers
source                  1..262
                        mol_type = protein
                        organism = Neisseria meningitidis
SEQUENCE: 6
CSSGGGGSGG GGVAADIGTG LADALTAPLD HKDKGLKSLT LEDSIPQNGT LTLSAQGAEK    60
TFKAGDKDNS LNTGKLKNDK ISRFDFVQKI EVDGQTITLA SGEFQIYKQN HSAVVALQIE   120
KINNPDKTDS LINQRSFLVS GLGGEHTAFN QLPGGKAEYH GKAFSSDDPN GRLHYSIDFT   180
KKQGYGRIEH LKTLEQNVEL AAAELKADEK SHAVILGDTR YGSEEKGTYH LALFGDRAQE   240
IAGSATVKIG EKVHEIGIAG KQ                                           262

SEQ ID NO: 7            moltype = AA  length = 248
FEATURE                 Location/Qualifiers
source                  1..248
                        mol_type = protein
                        organism = Neisseria meningitidis
SEQUENCE: 7
VAADIGAGLA DALTAPLDHK DKGLQSLTLD QSVRKNEKLK LAAQGAEKTY GNGDSLNTGK    60
LKNDKVSRFD FIRQIEVDGQ LITLESGEFQ VYKQSHSALT AFQTEQIQDS EHSGKMVAKR   120
QFRIGDIAGE HTSFDKLPEG GRATYRGTAF GSDDAGGKLT YTIDFAAKQG NGKIEHLKSP   180
ELNVDLAAAD IKPDGKRHAV ISGSVLYNQA EKGSYSLGIF GGKAQEVAGS AEVKTVNGIR   240
HIGLAAKQ                                                           248

SEQ ID NO: 8            moltype = AA  length = 247
```

```
FEATURE                 Location/Qualifiers
source                  1..247
                        mol_type = protein
                        organism = Neisseria meningitidis
SEQUENCE: 8
VAADIGAGLA DALTAPLDHK DKSLQSLTLD QSVRKNEKLK LAAQGAEKTY GNGDSLNTGK    60
LKNDKVSRFD FIRQIEVDGQ LITLESGEFQ IYKQDHSAVV ALQIEKINNP DKIDSLINQR   120
SFLVSGLGGE HTAFNQLPDG KAEYHGKAFS SDDAGGKLTY TIDFAAKQGH GKIEHLKTPE   180
QNVELAAAEL KADEKSHAVI LGDTRYGSEE KGTYHLALFG DRAQEIAGSA TVKIGEKVHE   240
IGIAGKQ                                                             247

SEQ ID NO: 9            moltype = AA  length = 250
FEATURE                 Location/Qualifiers
source                  1..250
                        mol_type = protein
                        organism = Neisseria meningitidis
SEQUENCE: 9
VAADIGTGLA DALTAPLDHK DKGLKSLTLE DSIPQNGTLT LSAQGAEKTF KAGDKDNSLN    60
TGKLKNDKIS RFDFVQKIEV DGQTITLASG EFQIYKQNHS AVVALQIEKI NNPDKTDSLI   120
NQRSFLVSGL GGEHTAFNQL PGGKAEYHGK AFSSDDPNGR LHYSIDFTKK QGYGRIEHLK   180
TLEQNVELAA AELKADEKSH AVILGDTRYG SEEKGTYHLA LFGDRAQEIA GSATVKIGEK   240
VHEIGIAGKQ                                                          250

SEQ ID NO: 10           moltype = AA  length = 776
FEATURE                 Location/Qualifiers
REGION                  1..776
                        note = source = /note="Description of Artificial Sequence:
                        Synthetic polypeptide"
source                  1..776
                        mol_type = protein
                        organism = synthetic construct
SEQUENCE: 10
MGPDSDRLQQ RRVAADIGAG LADALTAPLD HKDKSLQSLT LDQSVRKNEK LKLAAQGAEK    60
TYGNGDSLNT GKLKNDKVSR FDFIRQIEVD GQLITLESGE FQIYKQDHSA VVALQIEKIN   120
NPDKIDSLIN QRSFLVSGLG GEHTAFNQLP DGKAEYHGKA FSSDDAGGKL TYTIDFAAKQ   180
GHGKIEHLKT PEQNVELAAA ELKADEKSHA VILGDTRYGS EEKGTYHLAL FGDRAQEIAG   240
SATVKIGEKV HEIGIAGKQG SGPDSDRLQQ RRVAADIGTG LADALTAPLD HKDKGLKSLT   300
LEDSIPQNGT LTLSAQGAEK TFKAGDKDNS LNTGKLKNDK ISRFDFVQKI EVDGQTITLA   360
SGEFQIYKQN HSAVVALQIE KINNPDKTDS LINQRSFLVS GLGGEHTAFN QLPGGKAEYH   420
GKAFSSDDPN GRLHYSIDFT KKQGYGRIEH LKTLEQNVEL AAAELKADEK SHAVILGDTR   480
YGSEEKGTYH LALFGDRAQE IAGSATVKIG EKVHEIGIAG KQGSGGGGVA ADIGAGLADA   540
LTAPLDHKDK GLQSLTLDQS VRKNEKLKLA AQGAEKTYGN GDSLNTGKLK NDKVSRFDFI   600
RQIEVDGQLI TLESGEFQVY KQSHSALTAF QTEQIQDSEH SGKMVAKRQF RIGDIAGEHT   660
SFDKLPEGGR ATYRGTAFGS DDAGGKLTYT IDFAAKQGNG KIEHLKSPEL NVDLAAADIK   720
PDGKRHAVIS GSVLYNQAEK GSYSLGIFGG KAQEVAGSAE VKTVNGIRHI GLAAKQ       776

SEQ ID NO: 11           moltype = AA  length = 488
FEATURE                 Location/Qualifiers
source                  1..488
                        mol_type = protein
                        organism = Neisseria meningitidis
SEQUENCE: 11
MFKRSVIAMA CIFALSACGG GGGGSPDVKS ADTLSKPAAP VVSEKETEAK EDAPQAGSQG    60
QGAPSAQGSQ DMAAVSEENT GNGGAVTADN PKNEDEVAQN DMPQNAAGTD SSTPNHTPDP   120
NMLAGNMENQ ATDAGESSQP ANQPDMANAA DGMQGDDPSA GGQNAGNTAA QGANQAGNNQ   180
AAGSSDPIPA SNPAPANGGS NFGRVDLANG VLIDGPSQNI TLTHCKGDSC SGNNFLDEEV   240
QLKSEFEKLS DADKISNYKK DGKNDKFVGL VADSVQMKGI NQYIIFYKPK PTSFARFRRS   300
ARSRRSLPAE MPLIPVNQAD TLIVDGEAVS LTGHSGNIFA PEGNYRYLTY GAEKLPGGSY   360
ALRVQGEPAK GEMLAGAAVY NGEVLHFHTE NGRPYPTRGR FAAKVDFGSK SVDGIIDSGD   420
DLHMGTQKFK AAIDNGFKG TWTENGSGDV SGKFYGPAGE EVAGKYSYRP TDAEKGGFGV   480
FAGKKEQD                                                            488

SEQ ID NO: 12           moltype = AA  length = 464
FEATURE                 Location/Qualifiers
source                  1..464
                        mol_type = protein
                        organism = Neisseria meningitidis
SEQUENCE: 12
SPDVKSADTL SKPAAPVVSE KETEAKEDAP QAGSQGQGAP SAQGSQDMAA VSEENTGNGG    60
AVTADNPKNE DEVAQNDMPQ NAAGTDSSTP NHTPDPNMLA GNMENQATDA GESSQPANQP   120
DMANAADGMQ GDDPSAGGQN AGNTAAQGAN QAGNNQAAGS SDPIPASNPA PANGGSNFGR   180
VDLANGVLID GPSQNITLTH CKGDSCSGNN FLDEEVQLKS EFEKLSDADK ISNYKKDGKN   240
DKFVGLVADS VQMKGINQYI IFYKPKPTSF ARFRRSARSR RSLPAEMPLI PVNQADTLIV   300
DGEAVSLTGH SGNIFAPEGN YRYLTYGAEK LPGGSYALRV QGEPAKGEML AGAAVYNGEV   360
LHFHTENGRP YPTRGRFAAK VDFGSKSVDG IIDSGDDLHM GTQKFKAAID NGFKGTWTE   420
NGSGDVSGKF YGPAGEEVAG KYSYRPTDAE KGGFGVFAGK KEQD                    464

SEQ ID NO: 13           moltype = AA  length = 471
FEATURE                 Location/Qualifiers
```

```
source                  1..471
                        mol_type = protein
                        organism = Neisseria meningitidis
SEQUENCE: 13
CGGGGGGSPD VKSADTLSKP AAPVVSEKET EAKEDAPQAG SQGQGAPSAQ GSQDMAAVSE    60
ENTGNGGAVT ADNPKNEDEV AQNDMPQNAA GTDSSTPNHT PDPNMLAGNM ENQATDAGES   120
SQPANQPDMA NAADGMQGDD PSAGGQNAGN TAAQGANQAG NNQAAGSSDP IPASNPAPAN   180
GGSNFGRVDL ANGVLIDGPS QNITLTHCKG DSCSGNNFLD EEVQLKSEFE KLSDADKISN   240
YKKDGKNDKF VGLVADSVQM KGINQYIIFY KPKPTSFARF RRSARSRRSL PAEMPLIPVN   300
QADTLIVDGE AVSLTGHSGN IFAPEGNYRY LTYGAEKLPG GSYALRVQGE PAKGEMLAGA   360
AVYNGEVLHF HTENGRPYPT RGRFAAKVDF GSKSVDGIID SGDDLHMGTQ KFKAAIDGNG   420
FKGTWTENGS GDVSGKFYGP AGEEVAGKYS YRPTDAEKGG FGVFAGKKEQ D            471

SEQ ID NO: 14           moltype = AA   length = 187
FEATURE                 Location/Qualifiers
source                  1..187
                        mol_type = protein
                        organism = Neisseria meningitidis
SEQUENCE: 14
MKKIIFAALA AAAISTASAA TYKVDEYHAN ARFAIDHFNT STNVGGFYGL TGSVEFDQAK    60
RDGKIDITIP IANLQSGSQH FTDHLKSADI FDAAQYPDIR FVSTKFNFNG KKLVSVDGNL   120
TMHGKTAPVK LKAEKFNCYQ SPMEKTEVCG GDFSTTIDRT KWGMDYLVNV GMTKSVRIDI   180
QIEAAKQ                                                             187

SEQ ID NO: 15           moltype = AA   length = 168
FEATURE                 Location/Qualifiers
source                  1..168
                        mol_type = protein
                        organism = Neisseria meningitidis
SEQUENCE: 15
ATYKVDEYHA NARFAIDHFN TSTNVGGFYG LTGSVEFDQA KRDGKIDITI PIANLQSGSQ    60
HFTDHLKSAD IFDAAQYPDI RFVSTKFNFN GKKLVSVDGN LTMHGKTAPV KLKAEKFNCY   120
QSPMEKTEVC GGDFSTTIDR TKWGMDYLVN VGMTKSVRID IQIEAAKQ                168

SEQ ID NO: 16           moltype = AA   length = 644
FEATURE                 Location/Qualifiers
REGION                  1..644
                        note = source = /note="Description of Artificial Sequence:
                         Synthetic polypeptide"
source                  1..644
                        mol_type = protein
                        organism = synthetic construct
SEQUENCE: 16
MASPDVKSAD TLSKPAAPVV SEKETEAKED APQAGSQGQG APSAQGGQDM AAVSEENTGN    60
GGAAATDKPK NEDEGAQNDM PQNAADTDSL TPNHTPASNM PAGNMENQAP DAGESEQPAN   120
QPDMANTADG MQGDDPSAGG ENAGNTAAQG TNQAENNQTA GSQNPASSTN PSATNSGGDF   180
GRTNVGSVV IDGPSQNITL THCKGDSCSG NNFLDEEVQL KSEFEKLSDA DKISNYKKDG   240
KNDGKNDKFV GLVADSVQMK GINQYIIFYK PKPTSFARFR RSARSRRSLP AEMPLIPVNQ   300
ADTLIVDGEA VSLTGHSGNI FAPEGNYRYL TYGAEKLPGG SYALRVQGEP SKGEMLAGTA   360
VYNGEVLHFH TENGRPSPSR GRFAAKVDFG SKSVDGIIDS GDGLHMGTQK FKAAIDGNGF   420
KGTWTENGGG DVSGKFYGPA GEEVAGKYSY RPTDAEKGGF GVFAGKKEQD GSGGGGATYK   480
VDEYHANARF AIDHFNTSTN VGGFYGLTGS VEFDQAKRDG KIDITIPVAN LQSGSQHFTD   540
HLKSADIFDA AQYPDIRFVS TKFNFNGKKL VSVDGNLTMH GKTAPVKLKA EKFNCYQSPM   600
AKTEVCGGDF STTIDRTKWG VDYLVNVGMT KSVRIDIQIE AAKQ                    644

SEQ ID NO: 17           moltype = AA   length = 364
FEATURE                 Location/Qualifiers
source                  1..364
                        mol_type = protein
                        organism = Neisseria meningitidis
SEQUENCE: 17
MSMKHFPSKV LTTAILATFC SGALAATSDD DVKKAATVAI VAAYNNGQEI NGFKAGETIY    60
DIGEDGTITQ KDATAADVEA DDFKGLGLKK VVTNLTKTVN ENKQNVDAKV KAAESEIEKL   120
TTKLADTDAA LADTDAALDE TTNALNKLGE NITTFAEETK TNIVKIDEKL EAVADTVDKH   180
AEAFNDIADS LDETNTKADE AVKTANEAKQ TAEETKQNVD AKVKAAETAA GKAEAAAGTA   240
NTAADKAEAV AAKVTDIKAD IATNKADIAK NSARIDSLDK NVANLRKETR QGLAEQAALS   300
GLFQPYNVGR FNVTAAVGGY KSESAVAIGT GFRFTENFAA KAGVAVGTSS GSSAAYHVGV   360
NYEW                                                                364

SEQ ID NO: 18           moltype = AA   length = 341
FEATURE                 Location/Qualifiers
source                  1..341
                        mol_type = protein
                        organism = Neisseria meningitidis
SEQUENCE: 18
LAATSDDDVK KAATVAIVAA YNNGQEINGF KAGETIYDIG EDGTITQKDA TAADVEADDF    60
KGLGLKKVVT NLTKTVNENK QNVDAKVKAA ESEIEKLTTK LADTDAALAD TDAALDETTN   120
ALNKLGENIT TFAEETKTNI VKIDEKLEAV ADTVDKHAEA FNDIADSLDE TNTKADEAVK   180
TANEAKQTAE ETKQNVDAKV KAAETAAGKA EAAAGTANTA ADKAEAVAAK VTDIKADIAT   240
```

```
NKADIAKNSA RIDSLDKNVA NLRKETRQGL AEQAALSGLF QPYNVGRFNV TAAVGGYKSE    300
SAVAIGTGFR FTENFAAKAG VAVGTSSGSS AAYHVGVNYE W                       341

SEQ ID NO: 19           moltype = AA  length = 327
FEATURE                 Location/Qualifiers
source                  1..327
                        mol_type = protein
                        organism = Neisseria meningitidis
SEQUENCE: 19
ATNDDDVKKA ATVAIAAAYN NGQEINGFKA GETIYDIDED GTITKKDATA ADVEADDFKG    60
LGLKKVVTNL TKTVNENKQN VDAKVKAAES EIEKLTTKLA DTDAALADTD AALDATTNAL   120
NKLGENITTF AEETKTNIVK IDEKLEAVAD TVDKHAEAFN DIADSLDETN TKADEAVKTA   180
NEAKQTAEET KQNVDAKVKA AETAAGKAEA AAGTANTAAD KAEAVAAKVT DIKADIATNK   240
DNIAKKANSA DVYTREESDS KFVRIDGLNA TTEKLDTRLA SAEKSIADHD TRLNGLDKTV   300
SDLRKETRQG LAEQAALSGL FQPYNVG                                       327

SEQ ID NO: 20           moltype = AA  length = 202
FEATURE                 Location/Qualifiers
source                  1..202
                        mol_type = protein
                        organism = Neisseria meningitidis
SEQUENCE: 20
MKPKPHTVRT LIAAIFSLAL SGCVSAVIGS AAVGAKSAVD RRTTGAQTDD NVMALRIETT    60
ARSYLRQNNQ TKGYTPQISV VGYNRHLLLL GQVATEGEKQ FVGQIARSEQ AAEGVYNYIT   120
VASLPRTAGD IAGDTWNTSK VRATLLGISP ATQARVKIVT YGNVTYVMGI LTPEEQAQIT   180
QKVSTTVGVQ KVITLYQNYV QR                                            202

SEQ ID NO: 21           moltype = AA  length = 178
FEATURE                 Location/Qualifiers
source                  1..178
                        mol_type = protein
                        organism = Neisseria meningitidis
SEQUENCE: 21
SAVIGSAAVG AKSAVDRRTT GAQTDDNVMA LRIETTARSY LRQNNQTKGY TPQISVVGYD    60
RHLLLLGQVA TEGEKQFVGQ IARSEQAAEG VYNYITVASL PRTAGDIAGD TWNTSKVRAT   120
LLGISPATRA RVKIVTYGNV TYVMGILTPE EQAQITQKVS TTVGVQKVIT LYQNYVQR     178

SEQ ID NO: 22           moltype = AA  length = 6
FEATURE                 Location/Qualifiers
REGION                  1..6
                        note = source = /note="Description of Artificial Sequence:
                          Synthetic peptide"
source                  1..6
                        mol_type = protein
                        organism = synthetic construct
SEQUENCE: 22
GSGGGG                                                                6

SEQ ID NO: 23           moltype = AA  length = 11
FEATURE                 Location/Qualifiers
REGION                  1..11
                        note = source = /note="Description of Artificial Sequence:
                          Synthetic peptide"
source                  1..11
                        mol_type = protein
                        organism = synthetic construct
SEQUENCE: 23
GPDSDRLQQR R                                                         11

SEQ ID NO: 24           moltype = AA  length = 13
FEATURE                 Location/Qualifiers
REGION                  1..13
                        note = source = /note="Description of Artificial Sequence:
                          Synthetic peptide"
source                  1..13
                        mol_type = protein
                        organism = synthetic construct
SEQUENCE: 24
GSGPDSDRLQ QRR                                                       13

SEQ ID NO: 25           moltype = AA  length = 13
FEATURE                 Location/Qualifiers
REGION                  1..13
                        note = source = /note="Description of Artificial Sequence:
                          Synthetic peptide"
source                  1..13
                        mol_type = protein
                        organism = synthetic construct
SEQUENCE: 25
```

```
                                    GKGPDSDRLQ QRR                                                  13

SEQ ID NO: 26           moltype = AA  length = 12
FEATURE                 Location/Qualifiers
REGION                  1..12
                        note = source = /note="Description of Artificial Sequence:
                         Synthetic peptide"
source                  1..12
                        mol_type = protein
                        organism = synthetic construct
SEQUENCE: 26
MGPDSDRLQQ RR                                                                                       12

SEQ ID NO: 27           moltype =   length =
SEQUENCE: 27
000

SEQ ID NO: 28           moltype = AA  length = 8
FEATURE                 Location/Qualifiers
REGION                  1..8
                        note = source = /note="Description of Artificial Sequence:
                         Synthetic peptide"
source                  1..8
                        mol_type = protein
                        organism = synthetic construct
SEQUENCE: 28
LEHHHHHH                                                                                             8

SEQ ID NO: 29           moltype = AA  length = 769
FEATURE                 Location/Qualifiers
REGION                  1..769
                        note = source = /note="Description of Artificial Sequence:
                         Synthetic polypeptide"
source                  1..769
                        mol_type = protein
                        organism = synthetic construct
SEQUENCE: 29
MGPDSDRLQQ RRVAADIGAG LADALTAPLD HKDKSLQSLT LDQSVRKNEK LKLAAQGAEK    60
TYGNGDSLNT GKLKNDKVSR FDFIRQIEVD GQLITLESGE FQIYKQDHSA VVALQIEKIN   120
NPDKIDSLIN QRSFLVSGLG GEHTAFNQLP DGKAEYHGKA FSSDDAGGKL TYTIDFAAKQ   180
GHGKIEHLKT PEQNVELAAA ELKADEKSHA VILGDTRYGS EEKGTYHLAL FGDRAQEIAG   240
SATVKIGEKV HEIGIAGKQG SGGGGVAADI GTGLADALTA PLDHKDKGLK SLTLEDSIPQ   300
NGTLTLSAQG AEKTFKAGDK DNSLNTGKLK NDKISRFDFV QKIEVDGQTI TLASGEFQIY   360
KQNHSAVVAL QIEKINNPDK TDSLINQRSF LVSGLGGEHT AFNQLPGGKA EYHGKAFSSD   420
DPNGRLHYSI DFTKKQGYGR IEHLKTLEQN VELAAAELKA DEKSHAVILG DTRYGSEEKG   480
TYHLALFGDR AQEIAGSATV KIGEKVHEIG IAGKQGSGGG GVAADIGAGL ADALTAPLDH   540
KDKGLQSLTL DQSVRKNEKL KLAAQGAEKT YGNGDSLNTG KLKNDKVSRF DFIRQIEVDG   600
QLITLESGEF QVYKQSHSAL TAFQTEQIQD SEHSGKMVAK RQFRIGDIAG EHTSFDKLPE   660
GGRATYRGTA FGSDDAGGKL TYTIDFAAKQ GNGKIEHLKS PELNVDLAAA DIKPDGKRHA   720
VISGSVLYNQ AEKGSYSLGI FGGKAQEVAG SAEVKTVNGI RHIGLAAKQ                769

SEQ ID NO: 30           moltype = AA  length = 757
FEATURE                 Location/Qualifiers
REGION                  1..757
                        note = source = /note="Description of Artificial Sequence:
                         Synthetic polypeptide"
source                  1..757
                        mol_type = protein
                        organism = synthetic construct
SEQUENCE: 30
VAADIGAGLA DALTAPLDHK DKSLQSLTLD QSVRKNEKLK LAAQGAEKTY GNGDSLNTGK    60
LKNDKVSRFD FIRQIEVDGQ LITLESGEFQ IYKQDHSAVV ALQIEKINNP DKIDSLINQR   120
SFLVSGLGGE HTAFNQLPDG KAEYHGKAFS SDDAGGKLTY TIDFAAKQGH GKIEHLKTPE   180
QNVELAAAEL KADEKSHAVI LGDTRYGSEE KGTYHLALFG DRAQEIAGSA TVKIGEKVHE   240
IGIAGKQGSG GGGVAADIGT GLADALTAPL DHKDKGLKSL TLEDSIPQNG TLTLSAQGAE   300
KTFKAGDKDN SLNTGKLKND KISRFDFVQK IEVDGQTITL ASGEFQIYKQ NHSAVVALQI   360
EKINNPDKTD SLINQRSFLV SGLGGEHTAF NQLPGGKAEY HGKAFSSDDP NGRLHYSIDF   420
TKKQGYGRIE HLKTLEQNVE LAAAELKADE KSHAVILGDT RYGSEEKGTY HLALFGDRAQ   480
EIAGSATVKI GEKVHEIGIA GKQGSGGGGV AADIGAGLAD ALTAPLDHKD KGLQSLTLDQ   540
SVRKNEKLKL AAQGAEKTYG NGDSLNTGKL KNDKVSRFDF IRQIEVDGQL ITLESGEFQV   600
YKQSHSALTA FQTEQIQDSE HSGKMVAKRQ FRIGDIAGEH TSFDKLPEGG RATYRGTAFG   660
SDDAGGKLTY TIDFAAKQGN GKIEHLKSPE LNVDLAAADI KPDGKRHAVI SGSVLYNQAE   720
KGSYSLGIFG GKAQEVAGSA EVKTVNGIRH IGLAAKQ                             757

SEQ ID NO: 31           moltype = AA  length = 757
FEATURE                 Location/Qualifiers
VAR_SEQ                 240
VAR_SEQ                 496
VAR_SEQ                 543
```

```
REGION                          1..757
                                note = source = /note="Description of Artificial Sequence:
                                Synthetic polypeptide"
source                          1..757
                                mol_type = protein
                                organism = synthetic construct
SEQUENCE: 31
VAADIGAGLA DALTAPLDHK DKSLQSLTLD QSVRKNEKLK LAAQGAEKTY GNGDSLNTGK    60
LKNDKVSRFD FIRQIEVDGQ LITLESGEFQ IYKQDHSAVV ALQIEKINNP DKIDSLINQR   120
SFLVSGLGGE HTAFNQLPDG KAEYHGKAFS SDDAGGKLTY TIDFAAKQGH GKIEHLKTPE   180
QNVELAAAEL KADEKSHAVI LGDTRYGSEE KGTYHLALFG DRAQEIAGSA TVKIGEKVHX   240
IGIAGKQGSG GGGVAADIGT GLADALTAPL DHKDKGLKSL TLEDSIPQNG TLTLSAQGAE   300
KTFKAGDKDN SLNTGKLKND KISRFDFVQK IEVDGQTITL ASGEFQIYKQ NHSAVVALQI   360
EKINNPDKTD SLINQRSFLV SGLGGEHTAF NQLPGGKAEY HGKAFSSDDP NGRLHYSIDF   420
TKKQGYGRIE HLKTLEQNVE LAAAELKADE KSHAVILGDT RYGSEEKGTY HLALFGDRAQ   480
EIAGSATVKI GEKVHXIGIA GKQGSGGGGV AADIGAGLAD ALTAPLDHKD KGLQSLTLDQ   540
SVXKNEKLKL AAQGAEKTYG NGDSLNTGKL KNDKVSRFDF IRQIEVDGQL ITLESGEFQV   600
YKQSHSALTA FQTEQIQDSE HSGKMVAKRQ FRIGDIAGEH TSFDKLPEGG RATYRGTAFG   660
SDDAGGKLTY TIDFAAKQGN GKIEHLKSPE LNVDLAAADI KPDGKRHAVI SGSVLYNQAE   720
KGSYSLGIFG GKAQEVAGSA EVKTVNGIRH IGLAAKQ                            757

SEQ ID NO: 32           moltype = AA   length = 757
FEATURE                 Location/Qualifiers
REGION                          1..757
                                note = source = /note="Description of Artificial Sequence:
                                Synthetic polypeptide"
source                          1..757
                                mol_type = protein
                                organism = synthetic construct
SEQUENCE: 32
VAADIGAGLA DALTAPLDHK DKSLQSLTLD QSVRKNEKLK LAAQGAEKTY GNGDSLNTGK    60
LKNDKVSRFD FIRQIEVDGQ LITLESGEFQ IYKQDHSAVV ALQIEKINNP DKIDSLINQR   120
SFLVSGLGGE HTAFNQLPDG KAEYHGKAFS SDDAGGKLTY TIDFAAKQGH GKIEHLKTPE   180
QNVELAAAEL KADEKSHAVI LGDTRYGSEE KGTYHLALFG DRAQEIAGSA TVKIGEKVHA   240
IGIAGKQGSG GGGVAADIGT GLADALTAPL DHKDKGLKSL TLEDSIPQNG TLTLSAQGAE   300
KTFKAGDKDN SLNTGKLKND KISRFDFVQK IEVDGQTITL ASGEFQIYKQ NHSAVVALQI   360
EKINNPDKTD SLINQRSFLV SGLGGEHTAF NQLPGGKAEY HGKAFSSDDP NGRLHYSIDF   420
TKKQGYGRIE HLKTLEQNVE LAAAELKADE KSHAVILGDT RYGSEEKGTY HLALFGDRAQ   480
EIAGSATVKI GEKVHAIGIA GKQGSGGGGV AADIGAGLAD ALTAPLDHKD KGLQSLTLDQ   540
SVSKNEKLKL AAQGAEKTYG NGDSLNTGKL KNDKVSRFDF IRQIEVDGQL ITLESGEFQV   600
YKQSHSALTA FQTEQIQDSE HSGKMVAKRQ FRIGDIAGEH TSFDKLPEGG RATYRGTAFG   660
SDDAGGKLTY TIDFAAKQGN GKIEHLKSPE LNVDLAAADI KPDGKRHAVI SGSVLYNQAE   720
KGSYSLGIFG GKAQEVAGSA EVKTVNGIRH IGLAAKQ                            757

SEQ ID NO: 33           moltype = AA   length = 757
FEATURE                 Location/Qualifiers
VAR_SEQ                         32
VAR_SEQ                         123
VAR_SEQ                         285
VAR_SEQ                         379
REGION                          1..757
                                note = source = /note="Description of Artificial Sequence:
                                Synthetic polypeptide"
source                          1..757
                                mol_type = protein
                                organism = synthetic construct
SEQUENCE: 33
VAADIGAGLA DALTAPLDHK DKSLQSLTLD QXVRKNEKLK LAAQGAEKTY GNGDSLNTGK    60
LKNDKVSRFD FIRQIEVDGQ LITLESGEFQ IYKQDHSAVV ALQIEKINNP DKIDSLINQR   120
SFXVSGLGGE HTAFNQLPDG KAEYHGKAFS SDDAGGKLTY TIDFAAKQGH GKIEHLKTPE   180
QNVELAAAEL KADEKSHAVI LGDTRYGSEE KGTYHLALFG DRAQEIAGSA TVKIGEKVHE   240
IGIAGKQGSG GGGVAADIGT GLADALTAPL DHKDKGLKSL TLEDXIPQNG TLTLSAQGAE   300
KTFKAGDKDN SLNTGKLKND KISRFDFVQK IEVDGQTITL ASGEFQIYKQ NHSAVVALQI   360
EKINNPDKTD SLINQRSFXV SGLGGEHTAF NQLPGGKAEY HGKAFSSDDP NGRLHYSIDF   420
TKKQGYGRIE HLKTLEQNVE LAAAELKADE KSHAVILGDT RYGSEEKGTY HLALFGDRAQ   480
EIAGSATVKI GEKVHEIGIA GKQGSGGGGV AADIGAGLAD ALTAPLDHKD KGLQSLTLDQ   540
SVRKNEKLKL AAQGAEKTYG NGDSLNTGKL KNDKVSRFDF IRQIEVDGQL ITLESGEFQV   600
YKQSHSALTA FQTEQIQDSE HSGKMVAKRQ FRIGDIAGEH TSFDKLPEGG RATYRGTAFG   660
SDDAGGKLTY TIDFAAKQGN GKIEHLKSPE LNVDLAAADI KPDGKRHAVI SGSVLYNQAE   720
KGSYSLGIFG GKAQEVAGSA EVKTVNGIRH IGLAAKQ                            757

SEQ ID NO: 34           moltype = AA   length = 757
FEATURE                 Location/Qualifiers
REGION                          1..757
                                note = source = /note="Description of Artificial Sequence:
                                Synthetic polypeptide"
source                          1..757
                                mol_type = protein
                                organism = synthetic construct
```

```
SEQUENCE: 34
VAADIGAGLA DALTAPLDHK DKSLQSLTLD QVVRKNEKLK LAAQGAEKTY GNGDSLNTGK    60
LKNDKVSRFD FIRQIEVDGQ LITLESGEFQ IYKQDHSAVV ALQIEKINNP DKIDSLINQR   120
SFRVSGLGGE HTAFNQLPDG KAEYHGKAFS SDDAGGKLTY TIDFAAKQGH GKIEHLKTPE   180
QNVELAAAEL KADEKSHAVI LGDTRYGSEE KGTYHLALFG DRAQEIAGSA TVKIGEKVHE   240
IGIAGKQGSG GGGVAADIGT GLADALTAPL DHKDKGLKSL TLEDVIPQNG TLTLSAQGAE   300
KTFKAGDKDN SLNTGKLKND KISRFDFVQK IEVDGQTITL ASGEFQIYKQ NHSAVVALQI   360
EKINNPDKTD SLINQRSFRV SGLGGEHTAF NQLPGGKAEY HGKAFSSDDP NGRLHYSIDF   420
TKKQGYGRIE HLKTLEQNVE LAAAELKADE KSHAVILGDT RYGSEEKGTY HLALFGDRAQ   480
EIAGSATVKI GEKVHEIGIA GKQGSGGGGV AADIGAGLAD ALTAPLDHKD KGLQSLTLDQ   540
SVRKNEKLKL AAQGAEKTYG NGDSLNTGKL KNDKVSRFDF IRQIEVDGQL ITLESGEFQV   600
YKQSHSALTA FQTEQIQDSE HSGKMVAKRQ FRIGDIAGEH TSFDKLPEGG RATYRGTAFG   660
SDDAGGKLTY TIDFAAKQGN GKIEHLKSPE LNVDLAAADI KPDGKRHAVI SGSVLYNQAE   720
KGSYSLGIFG GKAQEVAGSA EVKTVNGIRH IGLAAKQ                            757

SEQ ID NO: 35         moltype = AA  length = 757
FEATURE               Location/Qualifiers
VAR_SEQ               32
VAR_SEQ               123
VAR_SEQ               285
VAR_SEQ               379
VAR_SEQ               543
REGION                1..757
                      note = source = /note="Description of Artificial Sequence:
                      Synthetic polypeptide"
source                1..757
                      mol_type = protein
                      organism = synthetic construct
SEQUENCE: 35
VAADIGAGLA DALTAPLDHK DKSLQSLTLD QXVRKNEKLK LAAQGAEKTY GNGDSLNTGK    60
LKNDKVSRFD FIRQIEVDGQ LITLESGEFQ IYKQDHSAVV ALQIEKINNP DKIDSLINQR   120
SFXVSGLGGE HTAFNQLPDG KAEYHGKAFS SDDAGGKLTY TIDFAAKQGH GKIEHLKTPE   180
QNVELAAAEL KADEKSHAVI LGDTRYGSEE KGTYHLALFG DRAQEIAGSA TVKIGEKVHE   240
IGIAGKQGSG GGGVAADIGT GLADALTAPL DHKDKGLKSL TLEDXIPQNG TLTLSAQGAE   300
KTFKAGDKDN SLNTGKLKND KISRFDFVQK IEVDGQTITL ASGEFQIYKQ NHSAVVALQI   360
EKINNPDKTD SLINQRSFXV SGLGGEHTAF NQLPGGKAEY HGKAFSSDDP NGRLHYSIDF   420
TKKQGYGRIE HLKTLEQNVE LAAAELKADE KSHAVILGDT RYGSEEKGTY HLALFGDRAQ   480
EIAGSATVKI GEKVHEIGIA GKQGSGGGGV AADIGAGLAD ALTAPLDHKD KGLQSLTLDQ   540
SVXKNEKLKL AAQGAEKTYG NGDSLNTGKL KNDKVSRFDF IRQIEVDGQL ITLESGEFQV   600
YKQSHSALTA FQTEQIQDSE HSGKMVAKRQ FRIGDIAGEH TSFDKLPEGG RATYRGTAFG   660
SDDAGGKLTY TIDFAAKQGN GKIEHLKSPE LNVDLAAADI KPDGKRHAVI SGSVLYNQAE   720
KGSYSLGIFG GKAQEVAGSA EVKTVNGIRH IGLAAKQ                            757

SEQ ID NO: 36         moltype = AA  length = 757
FEATURE               Location/Qualifiers
REGION                1..757
                      note = source = /note="Description of Artificial Sequence:
                      Synthetic polypeptide"
source                1..757
                      mol_type = protein
                      organism = synthetic construct
SEQUENCE: 36
VAADIGAGLA DALTAPLDHK DKSLQSLTLD QVVRKNEKLK LAAQGAEKTY GNGDSLNTGK    60
LKNDKVSRFD FIRQIEVDGQ LITLESGEFQ IYKQDHSAVV ALQIEKINNP DKIDSLINQR   120
SFRVSGLGGE HTAFNQLPDG KAEYHGKAFS SDDAGGKLTY TIDFAAKQGH GKIEHLKTPE   180
QNVELAAAEL KADEKSHAVI LGDTRYGSEE KGTYHLALFG DRAQEIAGSA TVKIGEKVHE   240
IGIAGKQGSG GGGVAADIGT GLADALTAPL DHKDKGLKSL TLEDVIPQNG TLTLSAQGAE   300
KTFKAGDKDN SLNTGKLKND KISRFDFVQK IEVDGQTITL ASGEFQIYKQ NHSAVVALQI   360
EKINNPDKTD SLINQRSFRV SGLGGEHTAF NQLPGGKAEY HGKAFSSDDP NGRLHYSIDF   420
TKKQGYGRIE HLKTLEQNVE LAAAELKADE KSHAVILGDT RYGSEEKGTY HLALFGDRAQ   480
EIAGSATVKI GEKVHEIGIA GKQGSGGGGV AADIGAGLAD ALTAPLDHKD KGLQSLTLDQ   540
SVSKNEKLKL AAQGAEKTYG NGDSLNTGKL KNDKVSRFDF IRQIEVDGQL ITLESGEFQV   600
YKQSHSALTA FQTEQIQDSE HSGKMVAKRQ FRIGDIAGEH TSFDKLPEGG RATYRGTAFG   660
SDDAGGKLTY TIDFAAKQGN GKIEHLKSPE LNVDLAAADI KPDGKRHAVI SGSVLYNQAE   720
KGSYSLGIFG GKAQEVAGSA EVKTVNGIRH IGLAAKQ                            757

SEQ ID NO: 37         moltype = AA  length = 757
FEATURE               Location/Qualifiers
REGION                1..757
                      note = source = /note="Description of Artificial Sequence:
                      Synthetic polypeptide"
source                1..757
                      mol_type = protein
                      organism = synthetic construct
SEQUENCE: 37
VAADIGAGLA DALTAPLDHK DKSLQSLTLD QVVRKNEKLK LAAQGAEKTY GNGDSLNTGK    60
LKNDKVSRFD FIRQIEVDGQ LITLESGEFQ IYKQDHSAVV ALQIEKINNP DKIDSLINQR   120
SFRVSGLGGE HTAFNQLPDG KAEYHGKAFS SDDAGGKLTY TIDFAAKQGH GKIEHLKTPE   180
QNVELAAAEL KADEKSHAVI LGDTRYGSEE KGTYHLALFG DRAQEIAGSA TVKIGEKVHA   240
```

```
IGIAGKQGSG GGGVAADIGT GLADALTAPL DHKDKGLKSL TLEDVIPQNG TLTLSAQGAE    300
KTFKAGDKDN SLNTGKLKND KISRFDFVQK IEVDGQTITL ASGEFQIYKQ NHSAVVALQI    360
EKINNPDKTD SLINQRSFRV SGLGGEHTAF NQLPGGKAEY HGKAFSSDDP NGRLHYSIDF    420
TKKQGYGRIE HLKTLEQNVE LAAAELKADE KSHAVILGDT RYGSEEKGTY HLALFGDRAQ    480
EIAGSATVKI GEKVHAIGIA GKQGSGGGGV AADIGAGLAD ALTAPLDHKD KGLQSLTLDQ    540
SVSKNEKLKL AAQGAEKTYG NGDSLNTGKL KNDKVSRFDF IRQIEVDGQL ITLESGEFQV    600
YKQSHSALTA FQTEQIQDSE HSGKMVAKRQ FRIGDIAGEH TSFDKLPEGG RATYRGTAFG    660
SDDAGGKLTY TIDFAAKQGN GKIEHLKSPE LNVDLAAADI KPDGKRHAVI SGSVLYNQAE    720
KGSYSLGIFG GKAQEVAGSA EVKTVNGIRH IGLAAKQ                             757

SEQ ID NO: 38           moltype = AA   length = 769
FEATURE                 Location/Qualifiers
REGION                  1..769
                        note = source = /note="Description of Artificial Sequence:
                         Synthetic polypeptide"
source                  1..769
                        mol_type = protein
                        organism = synthetic construct
SEQUENCE: 38
MGPDSDRLQQ RRVAADIGAG LADALTAPLD HKDKSLQSLT LDQVVRKNEK LKLAAQGAEK    60
TYGNGDSLNT GKLKNDKVSR FDFIRQIEVD GQLITLESGE FQIYKQDHSA VVALQIEKIN    120
NPDKIDSLIN QRSFRVSGLG GEHTAFNQLP DGKAEYHGKA FSSDDAGGKL TYTIDFAAKQ    180
GHGKIEHLKT PEQNVELAAA ELKADEKSHA VILGDTRYGS EEKGTYHLAL FGDRAQEIAG    240
SATVKIGEKV HAIGIAGKQG SGGGGVAADI GTGLADALTA PLDHKDKGLK SLTLEDVIPQ    300
NGTLTLSAQG AEKTFKAGDK DNSLNTGKLK NDKISRFDFV QKIEVDGQTI TLASGEFQIY    360
KQNHSAVVAL QIEKINNPDK TDSLINQRSF RVSGLGGEHT AFNQLPGGKA EYHGKAFSSD    420
DPNGRLHYSI DFTKKQGYGR IEHLKTLEQN VELAAAELKA DEKSHAVILG DTRYGSEEKG    480
TYHLALFGDR AQEIAGSATV KIGEKVHAIG IAGKQGSGGG GVAADIGAGL ADALTAPLDH    540
KDKGLQSLTL DQSVSKNEKL KLAAQGAEKT YGNGDSLNTG KLKNDKVSRF DFIRQIEVDG    600
QLITLESGEF QVYKQSHSAL TAFQTEQIQD SEHSGKMVAK RQFRIGDIAG EHTSFDKLPE    660
GGRATYRGTA FGSDDAGGKL TYTIDFAAKQ GNGKIEHLKS PELNVDLAAA DIKPDGKRHA    720
VISGSVLYNQ AEKGSYSLGI FGGKAQEVAG SAEVKTVNGI RHIGLAAKQ                769

SEQ ID NO: 39           moltype = AA   length = 757
FEATURE                 Location/Qualifiers
VAR_SEQ                 123
                        note = Any amino acid except Leu
VAR_SEQ                 379
                        note = Any amino acid except Leu
REGION                  1..757
                        note = source = /note="Description of Artificial Sequence:
                         Synthetic polypeptide"
source                  1..757
                        mol_type = protein
                        organism = synthetic construct
SEQUENCE: 39
VAADIGAGLA DALTAPLDHK DKSLQSLTLD QSVRKNEKLK LAAQGAEKTY GNGDSLNTGK    60
LKNDKVSRFD FIRQIEVDGQ LITLESGEFQ IYKQDHSAVV ALQIEKINNP DKIDSLINQR    120
SFXVSGLGGE HTAFNQLPDG KAEYHGKAFS SDDAGGKLTY TIDFAAKQGH GKIEHLKTPE    180
QNVELAAAEL KADEKSHAVI LGDTRYGSEE KGTYHLALFG DRAQEIAGSA TVKIGEKVHE    240
IGIAGKQGSG GGGVAADIGT GLADALTAPL DHKDKGLKSL TLEDSIPQNG TLTLSAQGAE    300
KTFKAGDKDN SLNTGKLKND KISRFDFVQK IEVDGQTITL ASGEFQIYKQ NHSAVVALQI    360
EKINNPDKTD SLINQRSFXV SGLGGEHTAF NQLPGGKAEY HGKAFSSDDP NGRLHYSIDF    420
TKKQGYGRIE HLKTLEQNVE LAAAELKADE KSHAVILGDT RYGSEEKGTY HLALFGDRAQ    480
EIAGSATVKI GEKVHEIGIA GKQGSGGGGV AADIGAGLAD ALTAPLDHKD KGLQSLTLDQ    540
SVRKNEKLKL AAQGAEKTYG NGDSLNTGKL KNDKVSRFDF IRQIEVDGQL ITLESGEFQV    600
YKQSHSALTA FQTEQIQDSE HSGKMVAKRQ FRIGDIAGEH TSFDKLPEGG RATYRGTAFG    660
SDDAGGKLTY TIDFAAKQGN GKIEHLKSPE LNVDLAAADI KPDGKRHAVI SGSVLYNQAE    720
KGSYSLGIFG GKAQEVAGSA EVKTVNGIRH IGLAAKQ                             757

SEQ ID NO: 40           moltype = AA   length = 757
FEATURE                 Location/Qualifiers
REGION                  1..757
                        note = source = /note="Description of Artificial Sequence:
                         Synthetic polypeptide"
source                  1..757
                        mol_type = protein
                        organism = synthetic construct
SEQUENCE: 40
VAADIGAGLA DALTAPLDHK DKSLQSLTLD QSVRKNEKLK LAAQGAEKTY GNGDSLNTGK    60
LKNDKVSRFD FIRQIEVDGQ LITLESGEFQ IYKQDHSAVV ALQIEKINNP DKIDSLINQR    120
SFRVSGLGGE HTAFNQLPDG KAEYHGKAFS SDDAGGKLTY TIDFAAKQGH GKIEHLKTPE    180
QNVELAAAEL KADEKSHAVI LGDTRYGSEE KGTYHLALFG DRAQEIAGSA TVKIGEKVHE    240
IGIAGKQGSG GGGVAADIGT GLADALTAPL DHKDKGLKSL TLEDSIPQNG TLTLSAQGAE    300
KTFKAGDKDN SLNTGKLKND KISRFDFVQK IEVDGQTITL ASGEFQIYKQ NHSAVVALQI    360
EKINNPDKTD SLINQRSFRV SGLGGEHTAF NQLPGGKAEY HGKAFSSDDP NGRLHYSIDF    420
TKKQGYGRIE HLKTLEQNVE LAAAELKADE KSHAVILGDT RYGSEEKGTY HLALFGDRAQ    480
EIAGSATVKI GEKVHEIGIA GKQGSGGGGV AADIGAGLAD ALTAPLDHKD KGLQSLTLDQ    540
SVRKNEKLKL AAQGAEKTYG NGDSLNTGKL KNDKVSRFDF IRQIEVDGQL ITLESGEFQV    600
```

```
YKQSHSALTA FQTEQIQDSE HSGKMVAKRQ FRIGDIAGEH TSFDKLPEGG RATYRGTAFG    660
SDDAGGKLTY TIDFAAKQGN GKIEHLKSPE LNVDLAAADI KPDGKRHAVI SGSVLYNQAE    720
KGSYSLGIFG GKAQEVAGSA EVKTVNGIRH IGLAAKQ                             757

SEQ ID NO: 41              moltype = AA  length = 757
FEATURE                    Location/Qualifiers
REGION                     1..757
                           note = source = /note="Description of Artificial Sequence:
                            Synthetic polypeptide"
source                     1..757
                           mol_type = protein
                           organism = synthetic construct
SEQUENCE: 41
VAADIGAGLA DALTAPLDHK DKSLQSLTLD QSVRKNEKLK LAAQGAEKTY GNGDSLNTGK     60
LKNDKVSRFD FIRQIEVDGQ LITLESGEFQ IYKQDHSAVV ALQIEKINNP DKIDSLINQR    120
SFRVSGLGGE HTAFNQLPDG KAEYHGKAFS SDDAGGKLTY TIDFAAKQGH GKIEHLKTPE    180
QNVELAAAEL KADEKSHAVI LGDTRYGSEE KGTYHLALFG DRAQEIAGSA TVKIGEKVHE    240
IGIAGKQGSG GGGVAADIGT GLADALTAPL DHKDKGLKSL TLEDSIPQNG TLTLSAQGAE    300
KTFKAGDKDN SLNTGKLKND KISRFDFVQK IEVDGQTITL ASGEFQIYKQ NHSAVVALQI    360
EKINNPDKTD SLINQRSFRV SGLGGEHTAF NQLPGGKAEY HGKAFSSDDP NGRLHYSIDF    420
TKKQGYGRIE HLKTLEQNVE LAAAELKADE KSHAVILGDT RYGSEEKGTY HLALFGDRAQ    480
EIAGSATVKI GEKVHEIGIA GKQGSGGGGV AADIGAGLAL ALTAPLDHKD KGLQSLTLDQ    540
SVSKNEKLKL AAQGAEKTYG NGDSLNTGKL KNDKVSRFDF IRQIEVDGQL ITLESGEFQV    600
YKQSHSALTA FQTEQIQDSE HSGKMVAKRQ FRIGDIAGEH TSFDKLPEGG RATYRGTAFG    660
SDDAGGKLTY TIDFAAKQGN GKIEHLKSPE LNVDLAAADI KPDGKRHAVI SGSVLYNQAE    720
KGSYSLGIFG GKAQEVAGSA EVKTVNGIRH IGLAAKQ                             757

SEQ ID NO: 42              moltype = AA  length = 10
FEATURE                    Location/Qualifiers
VARIANT                    3..10
                           note = /replace=" "
REGION                     1..10
                           note = misc_feature - /note="Variant residues given in the
                            sequence have no preference with respect to those in the
                            annotations for variant positions"
REGION                     1..10
                           note = source = /note="Description of Artificial Sequence:
                            Synthetic peptide"
source                     1..10
                           mol_type = protein
                           organism = synthetic construct
SEQUENCE: 42
GGGGGGGGGG                                                            10

SEQ ID NO: 43              moltype = AA  length = 10
FEATURE                    Location/Qualifiers
VARIANT                    4..10
                           note = /replace=" "
REGION                     1..10
                           note = misc_feature - /note="Variant residues given in the
                            sequence have no preference with respect to those in the
                            annotations for variant positions"
REGION                     1..10
                           note = source = /note="Description of Artificial Sequence:
                            Synthetic peptide"
source                     1..10
                           mol_type = protein
                           organism = synthetic construct
SEQUENCE: 43
HHHHHHHHHH                                                            10

SEQ ID NO: 44              moltype = AA  length = 10
FEATURE                    Location/Qualifiers
VARIANT                    5..10
                           note = /replace=" "
REGION                     1..10
                           note = misc_feature - /note="Variant residues given in the
                            sequence have no preference with respect to those in the
                            annotations for variant positions"
REGION                     1..10
                           note = source = /note="Description of Artificial Sequence:
                            Synthetic peptide"
source                     1..10
                           mol_type = protein
                           organism = synthetic construct
SEQUENCE: 44
HHHHHHHHHH                                                            10
```